United States Patent
Rarick

(10) Patent No.: US 10,255,041 B2
(45) Date of Patent: *Apr. 9, 2019

(54) UNIFIED MULTIPLY UNIT

(71) Applicant: Imagination Technologies Limited, Kings Langley (GB)

(72) Inventor: Leonard Rarick, San Diego, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,388

(22) Filed: Jun. 13, 2017

(65) Prior Publication Data
US 2017/0277514 A1 Sep. 28, 2017

Related U.S. Application Data

(63) Continuation of application No. 14/584,948, filed on Dec. 29, 2014, now Pat. No. 9,710,228.

(51) Int. Cl.
*G06F 7/533* (2006.01)
*G06F 7/487* (2006.01)

(52) U.S. Cl.
CPC .................................. *G06F 7/487* (2013.01)

(58) Field of Classification Search
None
See application file for complete search history.

(56) References Cited

U.S. PATENT DOCUMENTS

| | | | |
|---|---|---|---|
| 5,675,527 A | 10/1997 | Yano | |
| 5,742,538 A | 4/1998 | Guttag et al. | |
| 5,943,250 A * | 8/1999 | Kim | G06F 7/5338 708/625 |
| 6,249,799 B1 | 6/2001 | Purcell et al. | |
| 6,446,104 B1 | 9/2002 | Tzeng et al. | |
| 7,373,368 B1 * | 5/2008 | Rarick | G06F 7/724 708/492 |
| 7,433,912 B1 | 10/2008 | Jagodik et al. | |
| 7,483,935 B2 | 1/2009 | Hansen et al. | |
| 8,046,399 B1 * | 10/2011 | Inaganti | G06F 7/483 708/501 |

(Continued)

FOREIGN PATENT DOCUMENTS

WO 2010/045378 A2 4/2010

OTHER PUBLICATIONS

Danysh et al; "Architecture and Implementation of a Vector/SIMD Multiply-Accumulate Unit"; IEEE Transaction on Computers; vol. 54; No. 3; Mar. 2005; pp. 284-293.

(Continued)

*Primary Examiner* — David H Malzahn
(74) *Attorney, Agent, or Firm* — Vorys, Sater, Seymour and Pease LLP; Vincent M DeLuca

(57) ABSTRACT

Embodiments disclosed pertain to apparatuses, systems, and methods for performing multi-precision single instruction multiple data (SIMD) operations on integer, fixed point and floating point operands. Disclosed embodiments pertain to a circuit that is capable of performing concurrent multiply, fused multiply-add, rounding, saturation, and dot products on the above operand types. In addition, the circuit may facilitate 64-bit multiplication when Newton-Raphson, divide and square root operations are performed.

20 Claims, 29 Drawing Sheets

(56) References Cited

U.S. PATENT DOCUMENTS

| | | |
|---|---|---|
| 8,918,446 B2 | 12/2014 | Boswell et al. |
| 9,710,228 B2 * | 7/2017 | Rarick .................... G06F 7/487 |
| 2001/0021941 A1 | 9/2001 | Arakawa et al. |
| 2003/0158879 A1 | 8/2003 | Kwon et al. |
| 2004/0255100 A1 | 12/2004 | Kershaw |
| 2007/0046506 A1 * | 3/2007 | Kurd .................... G06F 7/5318 |
| | | 341/51 |
| 2010/0153830 A1 | 6/2010 | Gopal et al. |
| 2013/0346463 A1 * | 12/2013 | Hilker ...................... G06F 7/52 |
| | | 708/620 |
| 2016/0188295 A1 * | 6/2016 | Rarick .................... G06F 7/487 |
| | | 708/501 |
| 2017/0277514 A1 * | 9/2017 | Rarick .................... G06F 7/487 |

OTHER PUBLICATIONS

Bipin et al; "Design and Comparison of Regularize Modified Booth Multiplier Using Different Adders"; 2013 International Conference on Machine Intelligence and Research Advancement; IEEE, 2013; pp. 387-391.

Angel et al; "Low Power Parallel Multipliers"; VLSI Signal Processing IX, IEEE, 1996; pp. 199-208.

* cited by examiner

Booth encoded partial product rows:     for 16x16

FIG. 6

A1  B2  C3  D4  E5  F6  G7  H8
   b    b    b    b    b    b    b
  118  101  84   67   50   33   16 ated, the first CLA may add the intermediate sum result and the intermediate carry result, and the first CLA may comprise, in addition to columns for bits in the intermediate sum result and intermediate carry result, one or more additional columns, wherein each additional column comprises bit values that: prevent carry propagation across the additional column, or propagate carries across the additional column. In some embodiments, a determination to propagate carries, or to prevent carry propagation across each of the one or more additional columns may be based, in part, on a current instruction being executed by the arithmetic unit, a number of concurrent operations specified in the current instruction, and a precision of the current instruction.

UNIFIED MULTIPLY UNIT

CROSS-REFERENCE TO RELATED APPLICATIONS

The application is a continuation of application Ser. No. 14/584,948, filed on Dec. 29, 2014, and issued as U.S. Pat. No. 9,710,228, issued on Jul. 18, 2017. This application is incorporated by reference in its entirety herein, for all purposes.

FIELD

The subject matter disclosed herein relates to processors, in general, and more specifically to arithmetic units.

BACKGROUND

Carry save adders (CSAs) are widely used for multiply operations. In some conventional multiply implementations, either one partial product row for each bit in the multiplicand is produced, or Booth encoding schemes may be used to obtain partial products for each adjacent pair of bits in the multiplicand. The partial products are then added together to obtain a result. For example, multiplier architectures, which may be based on one of the Baugh-Wooley algorithms, Wallace trees, or Dadda multipliers, may add the partial products to obtain a result. To increase efficiencies, conventional CSA designs have often focused on reducing the number of partial product terms to be added. However, these designs limit the flexibility of CSAs. Because CSAs are large structures, which may sometimes take up a large portion of chip area, increasing the flexibility of CSA to perform a variety of operations is desirable.

Therefore, some disclosed embodiments present an efficient flexible CSA.

SUMMARY

Disclosed embodiments pertain to an arithmetic unit, which may comprise a multi-precision Single Instruction Multiple Data (SIMD) multiply unit. The multi-precision SIMD multiply unit may comprise: a carry save adder (CSA) configured to obtain based, in part, on a plurality of partial products of a first multiplier operand and a second modified booth encoded multiplicand operand, a first partial result and a second partial result; and an addition module coupled to the CSA. Further, the addition module may comprise: a full adder to obtain an intermediate sum result and an intermediate carry result by adding the first partial result and second partial result to a third operand, and a first carry lookahead adder (CLA) to operate on integer and fixed point operands and coupled to the full adder. In some embodiments, the first CLA may add the intermediate sum result and the intermediate carry result, and the first CLA may comprise, in addition to columns for bits in the intermediate sum result and intermediate carry result, one or more additional columns, wherein each additional column comprises bit values that: prevent carry propagation across the additional column, or propagate carries across the additional column. In some embodiments, a determination to propagate carries, or to prevent carry propagation across each of the one or more additional columns may be based, in part, on a current instruction being executed by the arithmetic unit, a number of concurrent operations specified in the current instruction, and a precision of the current instruction.

In another aspect, a processor may comprise an Arithmetic Logic Unit (ALU), wherein the ALU may further comprises a multi-precision Single Instruction Multiple Data (SIMD) multiply unit. In some embodiments, the multiply unit may further comprise: a carry save adder (CSA) configured to obtain based, in part, on a plurality of partial products of a first multiplier operand and a second modified booth encoded multiplicand operand, a first partial result and a second partial result; and an addition module coupled to the CSA. Further, the addition module may comprise: a full adder to obtain an intermediate sum result and an intermediate carry result by adding the first partial result and second partial result to a third operand, and a first carry lookahead adder (CLA) to operate on integer and fixed point operands and coupled to the full adder. In some embodiments, the first CLA may add the intermediate sum result and the intermediate carry result, and the first CLA may comprise, in addition to columns for bits in the intermediate sum result and intermediate carry result, one or more additional columns, wherein each additional column comprises bit values that: prevent carry propagation across the additional column, or propagate carries across the additional column. In some embodiments, a determination to propagate carries, or to prevent carry propagation across each of the one or more additional columns may be based, in part, on a current instruction being executed by the arithmetic unit, a number of concurrent operations specified in the current instruction, and a precision of the current instruction.

In another aspect, a non-transitory computer-readable medium may comprise executable instructions to describe a multiply unit comprising: a carry save adder (CSA) configured to obtain based, in part, on a plurality of partial products of a first multiplier operand and a second modified booth encoded multiplicand operand, a first partial result and a second partial result; and an addition module coupled to the CSA. Further, the addition module may comprise: a full adder to obtain an intermediate sum result and an intermediate carry result by adding the first partial result and second partial result to a third operand, and a first carry lookahead adder (CLA) to operate on integer and fixed point operands and coupled to the full adder. In some embodiments, the first CLA may add the intermediate sum result and the intermediate carry result, and the first CLA may comprise, in addition to columns for bits in the intermediate sum result and intermediate carry result, one or more additional columns, wherein each additional column comprises bit values that: prevent carry propagation across the additional column, or propagate carries across the additional column. In some embodiments, a determination to propagate carries, or to prevent carry propagation across each of the one or more additional columns may be based, in part, on a current instruction being executed by the arithmetic unit, a number of concurrent operations specified in the current instruction, and a precision of the current instruction.

The disclosure also pertains to circuits, processors, apparatuses, systems, and computer-readable media embodying instructions that describe the above embodiments.

BRIEF DESCRIPTION OF THE DRAWINGS

FIG. 6 shows typical partial product placement in some conventional CSAs for computation of eight 8 by 8 multiplies.

DETAILED DESCRIPTION

The detailed description set forth below in connection with the appended drawings is intended as a description of some exemplary non-limiting embodiments and various other embodiments may be practiced and are envisaged as would be apparent to one of skill in the art. Embodiments described are provided merely as examples or illustrations of the present disclosure. The detailed description includes specific details for the purpose of providing a thorough understanding of the present disclosure. However, it will be apparent to those skilled in the art that the present disclosure may be practiced without one or more of these specific details. In some instances, well-known structures and devices are not shown in block diagram form in order to avoid obscuring the concepts of the present disclosure. Acronyms and other descriptive terminology may be used merely for convenience and clarity and are not intended to limit the scope of the disclosure. In general, disclosed embodiments may be implemented using some combination of hardware, firmware, and software.

Figure 1:
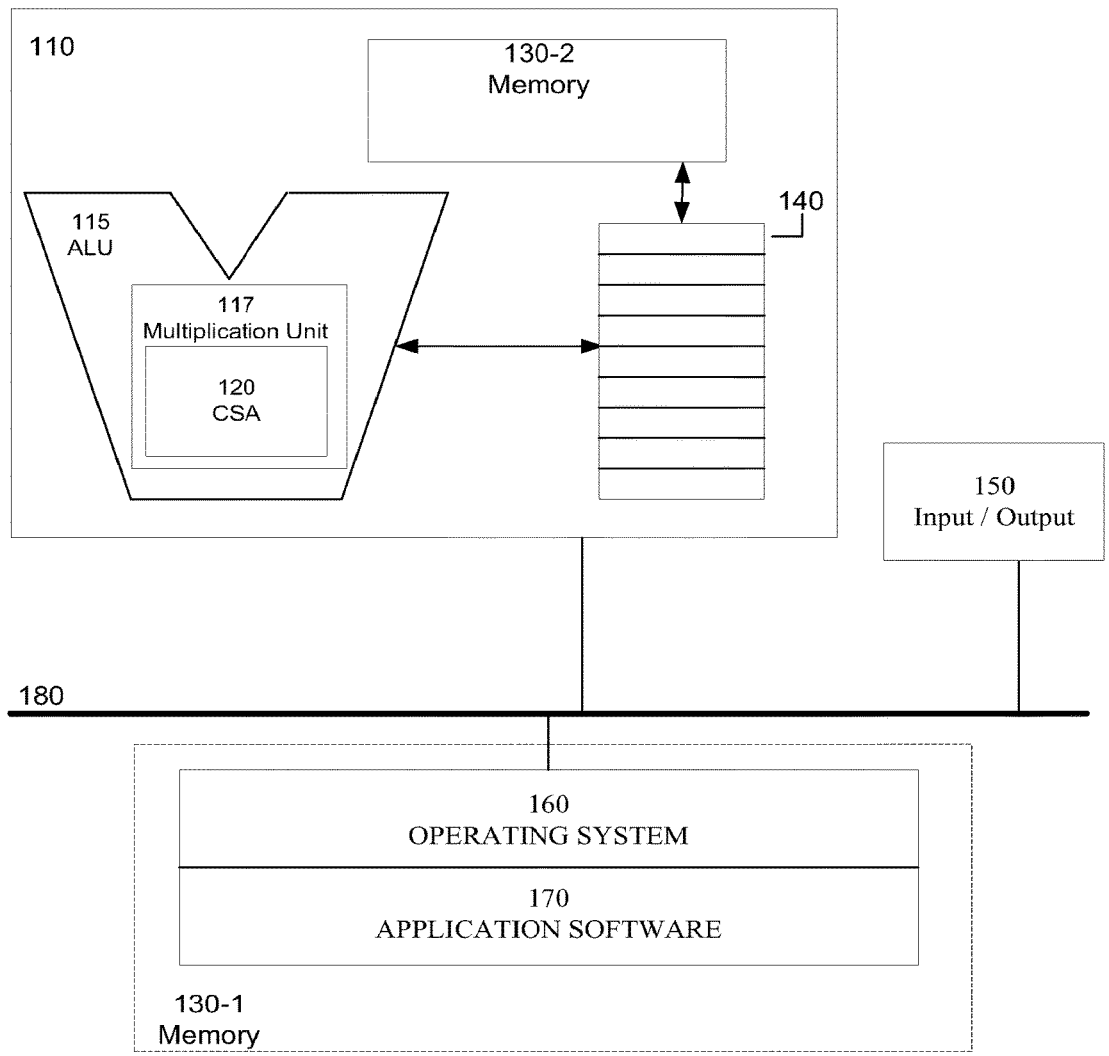
FIG. 1 shows a schematic block diagram illustrating certain exemplary features of a computer system including a processor capable of performing arithmetic operations.

FIG. 1 shows a simplified schematic block diagram illustrating certain exemplary features of a computer system 100 including a processor 110 capable of performing arithmetic operations, including addition/subtraction, multiplication, division, fused multiplication-addition, square root, reciprocals, reciprocal square roots, transcendental functions, etc. As shown in FIG. 1, computer system 100 may further include Input-Output (I/O) devices 150 such as a keyboard, mouse, touchscreens, pens, displays, speakers, sensors, multi-media devices, printers etc. Processor 110, I/O devices 150 and other system components may be coupled using bus 180. Memory 130-1 may also be coupled to the bus 180. Memory 180 may store operating system 160 and application software 170.

In some embodiments, processor 110 may include Arithmetic Logic Unit 115 and register file 140, and memory 130-2. In general, processor 110 may comprise several additional functional units, such as additional ALUs 115, which may include integer units, floating point units, external bus interface units, clock, pipelined execution units, scheduling units, clocks, and/or other support logic. Many of these functional units have been omitted in FIG. 1 merely to simplify discussion. Processor 110 may be incorporated in a variety of electrical, electronic or electro-mechanical devices along with one or more additional components.

Processor 110 may be implemented using a combination of hardware, firmware, and software. In general, processor 110 may represent one or more circuits configurable to perform computations, including floating point operations in a manner consistent with disclosed embodiments. Processor 110 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, integrated circuits, electronic devices, other electronic units designed to perform the functions described herein, or a combination thereof. In some embodiments, portions of techniques disclosed herein may also be implemented using firmware and/or software.

As used herein, the term "memory" is used to refer to any type of long term, short term, volatile, nonvolatile, or other memory and is not to be limited to any particular type of memory or number of memories, or type of physical media upon which memory is stored. In some embodiments, memories 130-1 and 130-2 (collectively referred to as memory 130) may hold instructions and/or data to facilitate operations performed by processor 100. For example, instructions/data may be loaded into register file 140 from memory 130 for use by ALU 115. For example, the instructions received may pertain to a floating point operations, including addition, subtraction, multiplication, division, fused multiply-add, square root, reciprocal and other operations executed by ALU 115 and the results of the operation may be stored in register file 140 and in memory 130-2. In general, memory 130-2 may represent any data storage mechanism.

In some embodiments, memory 130 may include a hierarchy of memories, such as, for example, a primary memory and/or a secondary memory. Primary memory may include, for example, a random access memory, read only memory, etc.

Secondary memory may include, for example, the same or similar type of memory as primary memory and/or one or more data storage devices or systems, such as, for example, flash/USB memory drives, memory card drives, disk drives, optical disc drives, tape drives, solid state memory drives, etc.

Memory 130 may include a hierarchy of cache memories. For example, memory 130 may include an instruction and/or data cache. In some embodiments, memory 130 may also include a Read Only Memory (ROM) or other non-volatile memory, which may be used to store microcode to facilitate performance of one or more operations by processor 110.

In some embodiments, ALU 115 may include a FPU. Further, in some embodiments, ALU 115 and/or an FPU in processor 110 may include multiplier 117 Multiplier 117 may further include CSA 120. Multiplier 117 may be used to perform various signed or unsigned arithmetic operations, which may include integer multiplication, fixed point multiplication, and/or floating point mantissa multiplication. Multiplier 117 may also be used during Newton-Raphson divide and square root operations, fused multiply-add operations, in the computation of dot products, etc. CSA 120 may be used during one or more of the operations outlined above.

In some embodiments, multiplier 117 and CSA 120 may be flexibly configured to perform one or more of the following operations including: 8 bit signed or unsigned integer multiplies, up to 8 concurrent executions; 16 bit signed or unsigned integer multiplies, up to 4 concurrent executions; 32 bit signed or unsigned integer multiplies, up to 2 concurrent execution; 64 bit signed or unsigned integer multiply; 16 bit fixed point multiplies (Q15 format), with up to 4 concurrent executions; 32 bit fixed point multiplies (Q31 format), with up to 2 concurrent executions; 24 bit floating point mantissa multiply, with up to 2 concurrent executions; 53 bit floating point mantissa multiply; and 64 bit multiply support for Newton-Raphson divide and square root operations. Further, multiplier 117 and CSA 120 may facilitate variations of the above operations, including the addition or subtraction of another value from the integer or fixed point multiply product (e.g. fused multiply-add operations), saturation operations, rounding operations, sum of two products (dot products and/or vector operation) etc. Because CSAs are relatively large structures, which may take up considerable chip area, a single CSA that facilitates a plurality of the above operations may be desirable. In some embodiments, CSA 120 may facilitate performance of the plurality of operations described above.

In certain implementations, secondary memory may be operatively receptive of, or otherwise configurable to couple to a computer-readable medium in a removable media drive (not shown in FIG. 1) coupled to processor 110. In some embodiments, the computer-readable medium may comprise instructions that describe a processor and/or ALU 115, and/or a FPU, which may include multiplier 117 or CSA 120 consistent with disclosed embodiments. For example, the descriptions may be provided in a hardware description language such as VHDL, Verilog, or any other hardware description language.

Figure 2:
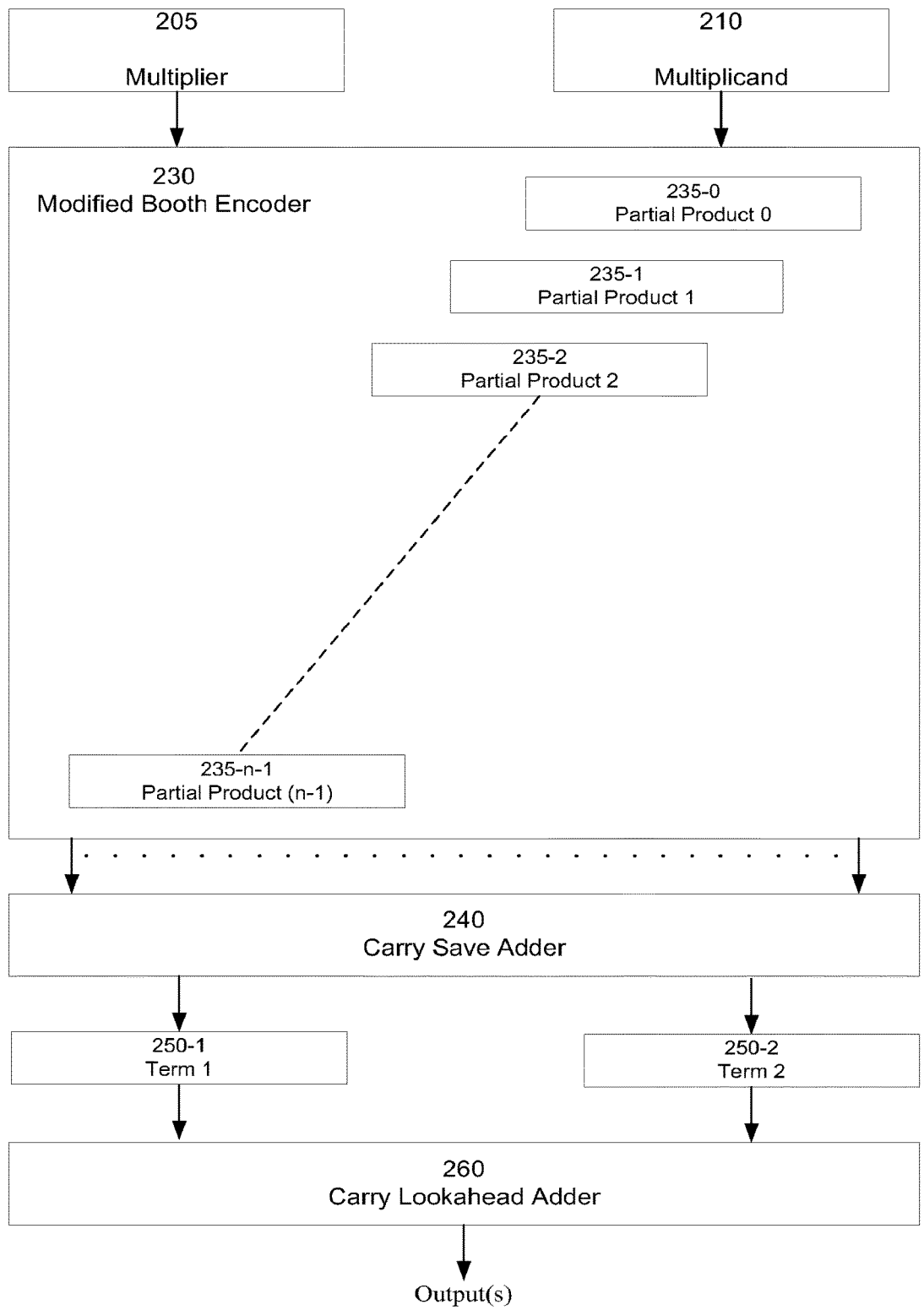
FIG. 2 shows a block diagram of an exemplary multiply unit.

FIG. 2 shows a block diagram of an exemplary multiply unit. Multiplier 205 and multiplicand 210 may be input to modified Booth encoder 230, which may generate partial product 0 235-0, partial product 1 235-1, partial product 235-2 . . . and partial product 235-$n$. As shown in FIG. 2, the partial products may be input, for example, to Carry Save Adder 240, which may add the partial products to produce Term 1 250-1 and Term 2 250-2. For example, Term 1 250-1 may comprise a sequence of partial sum bits, while Term 2 250-2 may comprise a sequence of carry bits. Term 1 250-1 and Term 2 250-2 may be input to two-input adder 260 (which may, for example, take the form of a Carry Lookahead Adder (CLA)). Adder 260 may add Term 1 250-1 and Term 2 250-2 to produce the output, which may be the product of multiplier 205 and multiplicand 210.

Figure 3A:
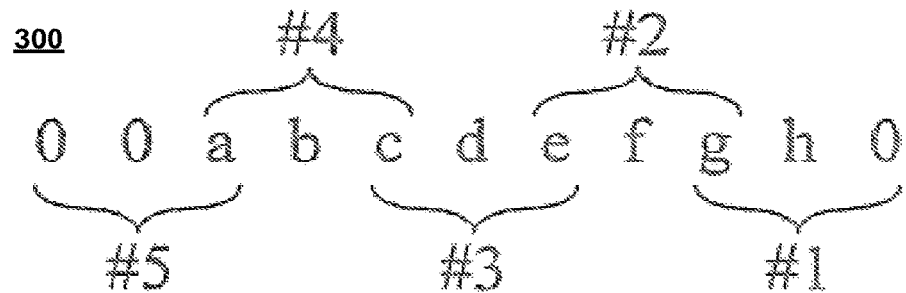
FIGS. 3A and 3B show exemplary modified Booth encodings for 8 and 16 bit unsigned numbers, respectively.

FIG. 3A shows a modified Booth encoding 300 for an 8-bit number with bits, from most significant to least significant, denoted by the letters "abcdefgh". As shown in FIG. 3, in modified Booth encoding 300, the 8-bit multiplicand is partitioned into five overlapping groups of 3 bits shown as: (i) Group #1: g, h, and 0; (ii) Group #2: e, f, and g; (iii) Group #3: c, d, and e; (iv) Group #4: a, b, and c; and (v) Group #5, which is a, a, and a, for signed multiplies; or 0, 0, and a for unsigned multiplies.

Figure 3B:
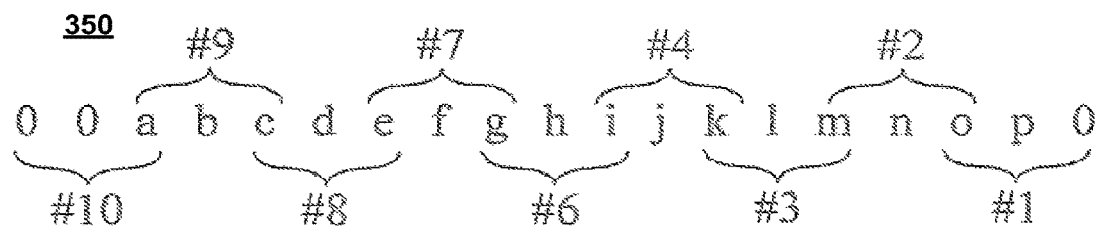

Similarly, FIG. 3B shows a modified Booth encoding 350 for a 16-bit number with bits, from most significant to least significant, denoted by the pair of letters "abcdefgh_ijklmnop". The modified Booth encoding 350 for the 16-bit multiplicand thus constitutes 10 partial product rows comprising (in order) bits: (i) Group #1: o, p, and 0; (ii) Group #2: m, n, and o; (iii) Group #3: k, l and m; (iv) Group #4: i, j and k; (v) Group #5: 0, 0, and 0; (vi) Group #6: g, h, and i; (vii) Group #7: e, f, and g; (viii) Group #8: c, d, and e; (ix) Group #9: a, b, and c; and (x) Group #10: which is a, a, and a for signed multiplies or 0, 0, and a for unsigned multiplies.

In some embodiments, multiply unit 117 may use a modified Booth encoding and have 40 partial product rows, with five partial product rows for each 8 bits of input. In some embodiments, multiply unit 117 may have three 64 bit operand inputs, including: (i) one or more multipliers(s) (cumulatively 64 bits in width) (ii) one or more multiplicand(s) (cumulatively 64 bits in width); and (iii) a third input with other values that the products may be added to or subtracted from. FIGS. 4 through 7 show an exemplary placement of partial products in multiply unit 117 for a variety of cases.

Figure 4A:
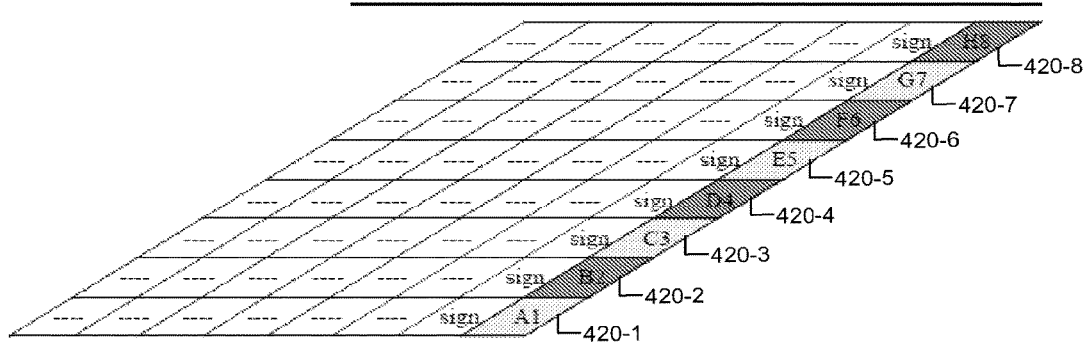
FIG. 4A shows a partial product placement for computation of eight 8×8 multiplies in a manner consistent with disclosed embodiments.

FIG. 4A shows a partial product placement 400 for computation of eight 8×8 multiplies in a manner consistent with disclosed embodiments. As shown in FIG. 4A, for 8-bit multiplies, multipliers 405 may comprise eight 8-bit multipliers shown as 1, 2, 3, 4, 5, 6, 7, 8, while multiplicands 410 may comprise corresponding 8-bit multiplicands shown as A, B, C, D, E, F, G, H. Further, each of the eight bit multiplicands may be encoded using a modified Booth encoding scheme, such as the scheme 300 shown in FIG. 3A. In some embodiments, sets of partial products shown by H8 420-8, G7 420-7, F6 420-6, E5 420-5, D4 420-4, C3 420-3, B2 420-3 and A1 420-1 may be placed as shown in FIG. 4A. In some embodiments, each row of partial products (e.g. 480-82) may be offset by 2-bits from the immediately higher row (e.g. 480-81) of partial products.

Figure 4B:
FIG. 4B shows a detailed mapping illustrating how exemplary modified Booth encodings for 8-bit numbers are used in the computation of partial product rows.
Figure 4B:
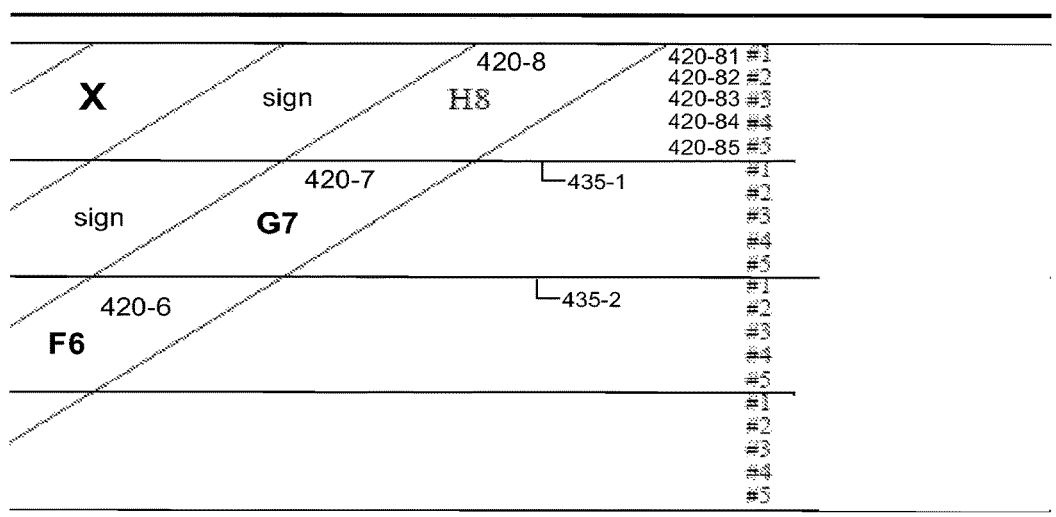

FIG. 4B shows a detailed mapping illustrating how exemplary Booth encodings for 8-bit numbers are used in the computation of partial product rows. As shown in FIG. 4B, for 8-bit multiplies, H8 420-8 may comprise a set of 5 partial product rows. Group #1 (FIG. 3A) from the modified Booth encoding for the multiplicand with bits g, h, and zero may be used to obtain first partial product 420-81. Group #2 (FIG. 3A) from the modified Booth encoding for the multiplicand with bits e, f, and g may be used to obtain second partial product 420-82, while the third partial product row 420-83 may be obtained using group #3 (FIG. 3A) with bits c, d, and e. The fourth partial product 420-84 in the fourth row may be obtained using group #4 (FIG. 3A) with bits a, b, and c. Finally, for unsigned multiplies, the partial product 420-85 in the fifth row may be obtained using group #5 (FIG. 3A) with 0, 0, and a. For signed multiplies, in the fifth row 420-85, the zero bits are replaced with the value of a.

Similarly, G7 420-7 and F6 420-6 E5 (shown FIG. 4B) and 420-5, D4 420-4, C3 420-3, B2 420-2 and A1 420-1 (not shown in FIG. 4B) each comprise a set of five rows of partial products, where, within a set, each partial product row is obtained based, in part, on a corresponding modified Booth encoding for the corresponding multiplicand (i.e. one of G, F, E, D, C, B or A). Further, as shown in FIG. 4B, for 8-bit multiplies, "logical breaks" 435 occur between each of the sets (of five partial products). For example, logical break 435-1 occurs between H8 420-8 and G7 420-7, while logical break 435-2 occurs between G7 420-7 and F6 420-6.

In some embodiments, during multiplication, within each row in each set, appropriate bits of the multiplier may be placed in the least significant positions while the most significant positions may be sign filled with sign bits as determined by the Booth encoding. For 8 bit multiplies, each row in set may have 8 bit least significant bits with the next 8 bits sign filled.

Figure 5A:
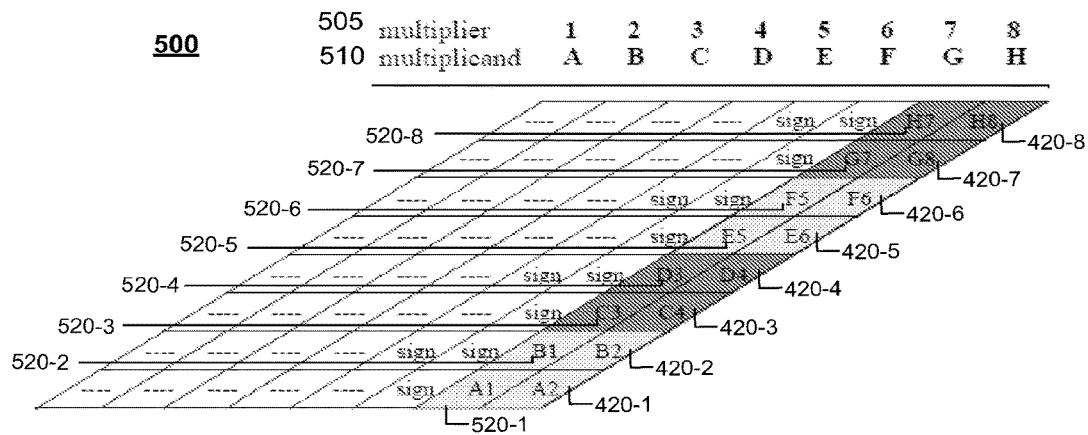
FIG. 5A shows a partial product placement for computation of four 16×16 multiplies in a manner consistent with disclosed embodiments.

FIG. 5A shows a partial product placement 500 for computation of four 16×16 multiplies in a manner consistent with disclosed embodiments. As shown in FIG. 5A, for 16-bit multiplies, multipliers 505 may comprise four 16-bit multipliers (1·2), (3·4), (5·6), and (7·8), while multiplicands 410 may comprise corresponding 16-bit multiplicands (A·B) (C·D) (E·F) (G·F1), where the symbol "·" denotes concatenation. Further, each of the four 16-bit multiplicands may be encoded using a modified Booth encoding scheme, such as scheme 350 shown in FIG. 3B resulting in 10 partial product rows 520-81 through 520-90 as shown in FIG. 5B.

FIG. 5A shows the placement of pairs of partial product sets H8 420-8, H7 520-8; G8 420-7, G7 520-7; F6 420-6, F5 520-6; E6 420-5, E5 520-5; D4 420-4, D3 520-4; C4 420-3, C3 520-3; B2 420-2, B1 520-2; and A2 420-1, A1 520-1. The labels and shadings in FIG. 5A indicate the sets contributing to one of the four results. For example, sets H8 420-8, H7 520-8, G8 420-7, and G7 520-7 are used in the computation of the product of the pair of 16-bit numbers (7·8)*(G·H).

Figure 5B:
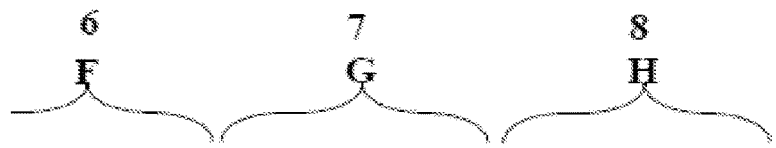
FIG. 5B shows a detailed mapping illustrating how exemplary modified Booth encodings for 16-bit numbers are used in the computation of partial product rows.
Figure 6:
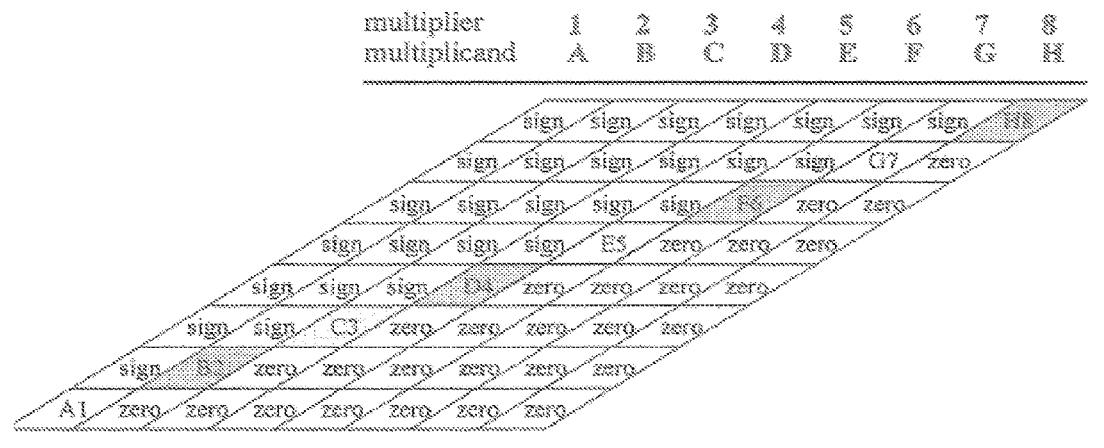

FIG. 5B shows a detailed mapping illustrating how exemplary Booth encodings for 16-bit numbers are used in the computation of partial product rows. As shown in FIG. 6, for 16-bit multiplies, partial product sets such as, for example, sets H8 420-8, H7 520-8, G8 420-7, G7 520-7, may comprise 10 partial product rows. For example, if the 16-bit multiplicand is denoted by the string abcdefghijklmnop, (where "a" is the msb and "p" is the lsb) the modified Booth encoding for the first partial product 520-81 in the first row of the set may use group #1 (FIG. 3B) with bits o, p, and zero. The modified Booth encoding for the second partial product 520-82 in the second row of the set may use group #2 (FIG. 3B) with bits m, n, and o, while the third partial product 520-83 may use group #3 (FIG. 3B) with k, l, and m. The fourth partial product 520-84 may use group #4 (FIG. 3B) with bits i, j, and k. As shown in FIG. 5B, the fifth row 520-85 is all zeroes. Partial product rows 520-86, 520-87, 520-88, 520-89 and 520-90 correspond to group numbers 6, 7, 8, 9, and 10, respectively, in FIG. 3B. For 16-bit multiplies, each row in each pair of sets may have least significant 16 bits with the next 8 or 16 bits sign extended.

Thus, in FIG. 5A, the four 16-bit products are computed using: (i) H8 420-8, H7 520-8, G8 420-7, G7 520-7; (ii) F6 420-6, F5 520-6, E6 420-5, E5 520-5; (iii) D4 420-4, D3 520-4, C4 420-3, C3 520-3; and (iv) B2 420-2, B1 520-2, A2 420-1, A1 520-1, where each group of partial products includes ten partial product rows. Further, each partial product row is obtained based on a corresponding modified Booth encoding for the corresponding multiplicand (i.e. one of G, F, E, D, C, B or A). Further, as shown in FIG. 5B, for 16-bit multiplies, logical breaks 535 occur after the second, fourth, and sixth group of 5 partial products. For example, logical break 535-1 occurs after tenth partial product row 520-90, while logical break 535-2 occurs after the twentieth partial product row.

This concept of logical break or no logical break is also used for 32 and 64 bit multiplies. In summary, logical breaks are applied as follows. For 8 bit multiplies, logical breaks are used between each group of 5 partial products. For 16 bit multiplies, logical breaks occur after the second, fourth, and sixth group of 5 partial products. For 32 bit multiplies, logical breaks occur after the fourth group of 5 partial products. For 64 bit multiplies, no logical breaks apply.

For two 24-bit mantissa floating point multiplies, no logical breaks are used in the first three groups for one of the multiplies. Further, no logical breaks are used in the last three groups. The partial products for the middle two groups are set to all zero.

For a 53-bit mantissa floating point multiply, 11 bits of zero are concatenated to the least significant bit positions of the mantissa and the 64-bit number (obtained from the concatenation) is then processed as a 64 bit multiply.

Figure 8:
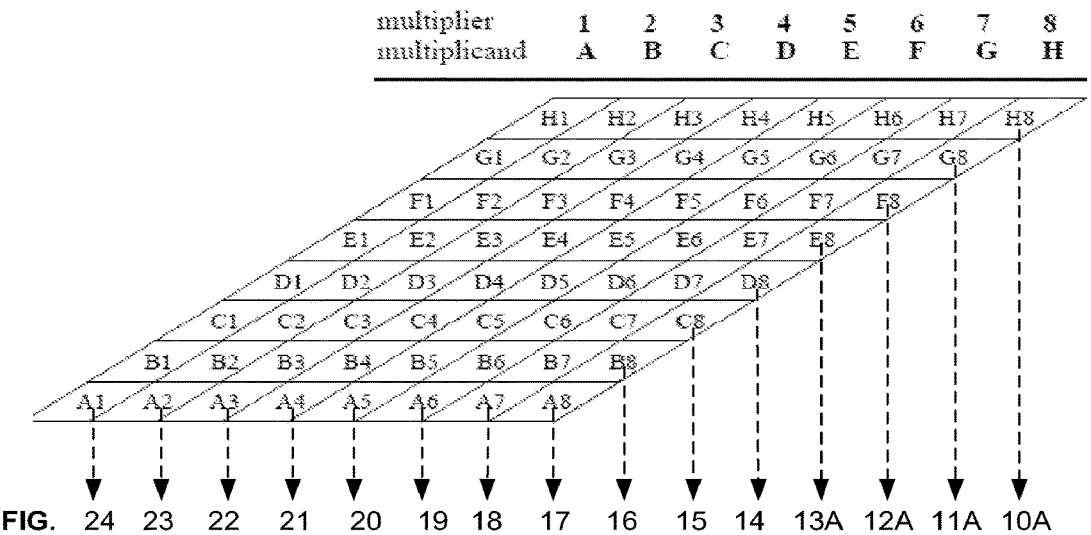
FIG. 8 shows a partial product placement for computation of one 64×64 multiply in a manner consistent with disclosed embodiments.

FIG. 6 shows typical partial product placement in some conventional CSAs for computation of eight 8 by 8 multiplies. As shown in FIG. 8, each of the eight sets of partial products H8, G7, F6, E5, D4, C3, B2 and A1 are placed along a diagonal and each one of the eight sets (e.g. G7) is offset from the end of the last partial product row in the prior set (e.g. H8) by 2 bits. In FIG. 8, locations specified as "zero" are actually zero only for rows that correspond to positive or zero results of Booth encoding. Rows that correspond to negative results of Booth encoding may be filled with 1's. In conventional schemes, because there are five partial products rows in each set, the start of a set of partial products (e.g. G7) is offset from the start of the prior set (e.g. H8) by 2 times the size of the multiplicand.

Thus, in conventional schemes, for an 8-bit multiplicand the start of each partial product set is offset from the beginning of the immediately preceding product set by an amount given by 2*8=16 bits. The offset, in the conventional placement, is intended to prevent one computation (e.g. based on H8) from confounding the next computation (e.g. based on G7), when partial product rows are added to obtain the 8 products of the multiplies.

In FIG. 6, in conventional CSAs where multiple multiplies (e.g. Single Instruction Multiple Data (SIMD) type instructions) are performed, then, none of the individual computations may be ready for a carry lookahead adder (such as Full Adder 260) before the last level (e.g. A1) has finished. In many conventional CSAs, because of the potential for negative values created due to Booth encoding, all carries from the right of the computation in question must be resolved. Thus, in conventional implementations, when the computations in question are placed along the diagonal as shown in FIG. 6, latency is introduced because the full adder/carry lookahead adder waits for the carries to be resolved.

In contrast, in the embodiment shown in FIG. 4A, the full adder/carry lookahead adder may start earlier because the offsets are smaller. In the embodiment shown in FIG. 4A, each of the eight partial product computations (e.g. G7) is offset by only the size of the multiplicand=8 bits from the start of the first row of the prior set (e.g. H8). In FIG. 4A, for example, the multiplier operand may be input to a multiplexer for appropriate placement, while the Booth select values are being determined from the multiplicand operand thereby mitigating latency. In particular, the values from A1 are available at the same time as the values from H8 because there is no long propagation of carries from the right that need to be resolved.

Figure 7:
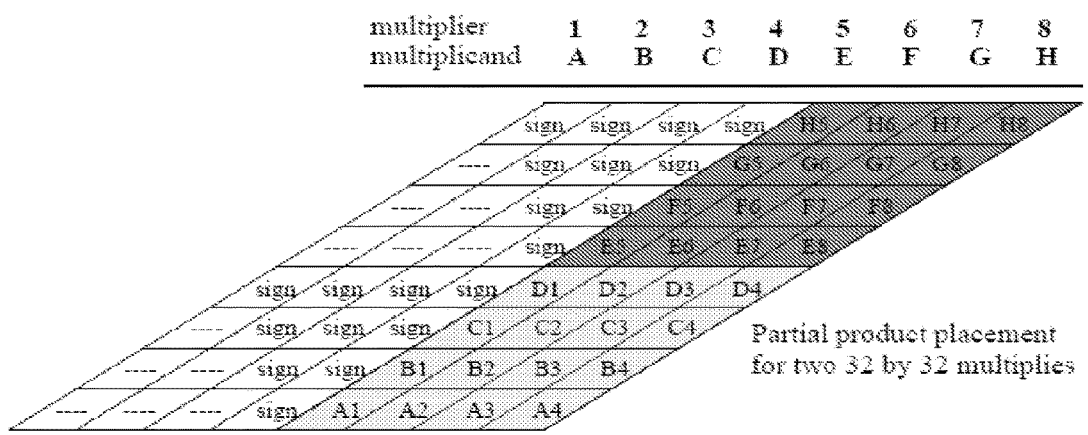
FIG. 7 shows a partial product placement for computation of two 32×32 multiplies in a manner consistent with disclosed embodiments.

FIG. 7 shows a partial product placement for computation of two 32×32 multiplies in a manner consistent with disclosed embodiments. As shown by the shaded areas in FIG. 7, partial products obtained using the first pair of operands (first multiplier) 1·2·3·4 and (first multiplicand) E·F·G·H are used to obtain a first result, while partial products obtained using the second pair of operands (second multiplier) 5.6.7.8 and (second multiplicand) A·B·C·D are used to obtain a second result. For 32 bit multiplies, each half has its appropriate least significant 32 bits with appropriate sign extension.

FIG. 8 shows a partial product placement for computation of one 64×64 multiply in a manner consistent with disclosed embodiments. As shown in FIG. 8, the multiplier comprises 1·2·3·4·5·6·7·8 while the multiplicand comprises A·B·C·D·E·F·G·H. The partial products obtained are arranged as shown in FIG. 8 in order to obtain a result.

In FIG. 8, the figure number, which appears below each column of partial product sets, corresponds to a figure of a circuit that computes sums of a single column of partial product bits in the indicated column of partial product sets. Accordingly, FIGS. 10A, 11A, 12A, 13A and 14-24 show exemplary circuits for the computation of the sum of a single column of partial product bits for some exemplary partial product sets shown in FIG. 8.

Figure 10A:
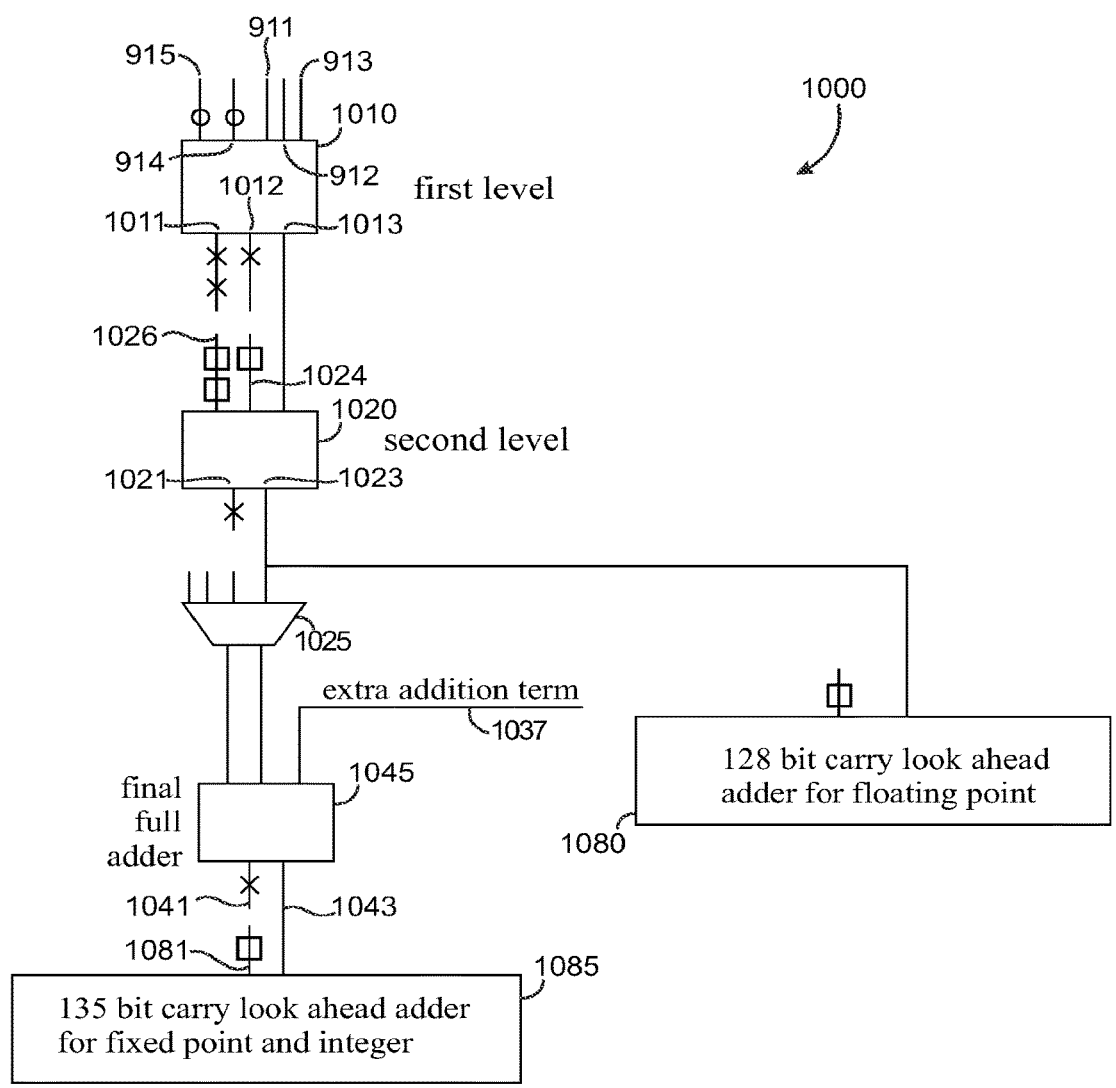
FIG. 10A shows an exemplary circuit for computing the sum of bits in column 6 of FIG. 9 for partial product set H8 in a manner consistent with disclosed embodiments.

Each column in a partial product set (e.g. H8) in FIG. 10A may include 5 rows, where each row is offset from the immediately preceding row by 2-bits. Accordingly, each partial product set (e.g. H8) may be 16 bits in width from the start of the first partial product row in the partial product set to the end of the last (fifth) partial product row in the set.

Figure 9:
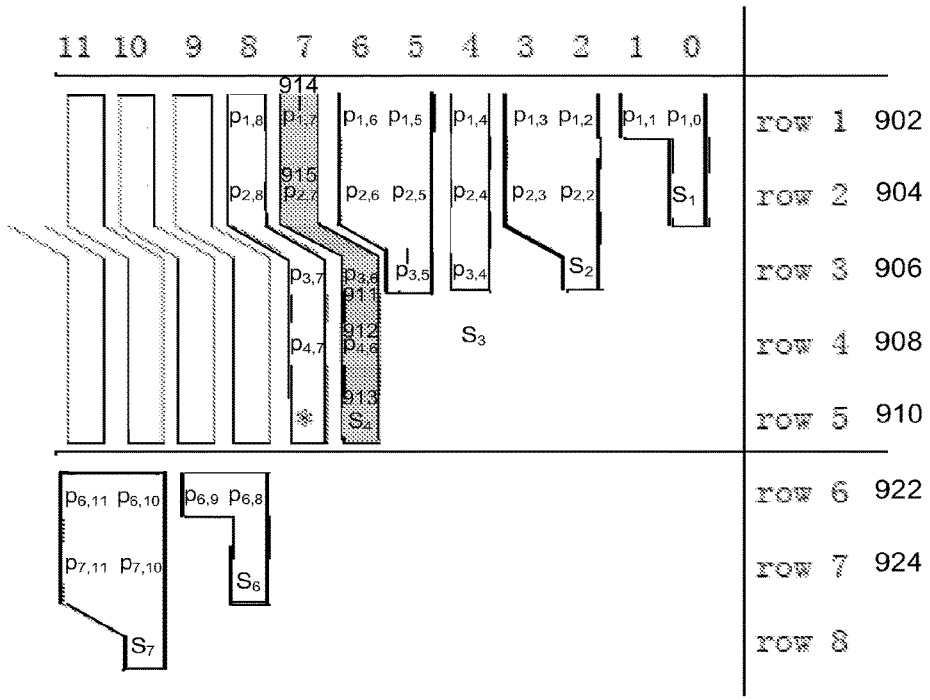
FIG. 9 shows the organization of exemplary inputs to a first level of 5:3 compressors.

FIG. 9 shows some exemplary inputs to the first level of compressors for the circuit shown in FIG. 10A. In FIG. 9, each row of partial products $P_i$ includes partial product bits $p_{ij}$, where the subscript i denotes the row and j denotes the bit position or column. Each row of partial products $P_i$ is produced by multiplying each group of bits of the modified Booth encoded 64-bit multiplicand with the multiplier. Because there are five modified Booth encoded groups for every 8 bits of the 64-bit multiplicand, there are total of forty rows of partial products.

In FIG. 9, the first partial product row (i=1) $P_1=\{p_{ij}|j=0, 1, 2 \ldots\}$ 902 corresponds to a partial product obtained from the first group of the modified Booth encoded multiplicand. The second (i=2), third (i=3), and fourth (i=4) of Booth encoded partial product rows 904, 906 and 908 correspond to partial products obtained from the second, third and fourth groups, respectively, of the modified Booth encoded multiplicands. Sign bits $S_1$, $S_2$, $S_3$, and $S_4$ correspond to partial products 902, 904, 906, and 908, respectively. Note that the fifth partial product row 910 does not have a sign bit because it is either one times or zero times the multiplier, thus never a negative multiple of the multiplier. FIG. 9 shows partial product rows labeled as row 1 902, row 2 904, row 3 906, row 4 908, and row 5 910, which, when added together may yield H8.

The sixth partial product row 922 corresponds to the sixth group of the modified Booth encoded multiplicand for 16, 32, and 64 bit multiplies. However, for 8×8 bit multiplies, the sixth partial product row 922 corresponds to the partial products obtained from the first group of the second multiplicand. The seventh partial product row 924 corresponds to the seventh group of the modified Booth encoded multiplicand for 16, 32, and 64 bit multiplies. However, for 8×8 bit multiplies, the seventh row of partial products 924 corresponds to the partial product obtained from the second group of the second multiplicand. Sign bits $S_7$ and $S_8$ correspond to partial product rows 922 and 924, respectively. Thus, in FIG. 9, rows 6 through 10 are similar to rows 1 through 5 but shifted to the left by eight columns. Similarly, rows 11 through 15 are like rows 1 through 5 but shifted to the left by sixteen columns, etc. Thus, each partial product set, which may include five rows, is shifted to the left by eight columns from the preceding partial product set.

For example, because there are 5 partial product rows for each eight bits of input, with 64-bit operands, there may be 40 partial product rows. By using a first level of compression with 5:3 compressors along columns of the 40 partial product rows, 3*8=24 terms are obtained. The 24 terms are further compressed using the second level of compressors with 3:2 adders to 16 terms. The third, fourth, and fifth levels of compression use 4 to 2 compressors, result in, respectively, 8, 4, and finally to 2 terms. The circuits are described in further detail below.

FIG. 9 also shows bit groupings for the inputs to the first level of 5:3 compressors. For the purposes of the discussion, a compressor is considered to be in the column of its unary bit position. Thus, for column 6 (j=6) inputs $p_{3,6}$ 911, $p_{4,6}$ 912, and $S_4$ 913, are the unary inputs to a 5 to 3 compressor, while inputs $p_{1,7}$ 914 and $p_{2,7}$ 915 are two's position inputs, which arrive from the $j+1=6+1=7^{th}$ column.

In FIG. 10A, an "o" on an input wire for column j specifies that the input comes from the $(j+1)^{th}$ (immediately succeeding) column; two "o"s specify that it comes from the $(j+2)^{th}$ column. An "X" on an output wire for column j specifies that the output goes to the $(j+1)^{th}$ (next) column; two "X"s specify that it goes to the $(j+2)^{th}$ column. A "□" on an input wire on an input wire for column j specifies that the input comes from the $(j-1)^{th}$ (immediately preceding) column; two "□"s specify that it comes from the $(j-2)^{th}$ column FIG. 10A shows exemplary circuit 1000 for computing the sum of bits in column 6 of FIG. 9 for partial product set H8. In FIG. 10A, at a first level, 5:3 compressor 1010 compresses five modified Booth encoded input signals 911, 912, 913, 914 and 915 for cell H8 to three output signals 1011, 1012 and 1013, which are input to 3:2 compressor 1020 at the second level. Most compressors in the second level have 3 inputs, however, for column 6, input 1026 is zero as there is no source for this position because there is no 5:3 compressor in column 4, as can be seen in FIG. 9

Figure 5B:
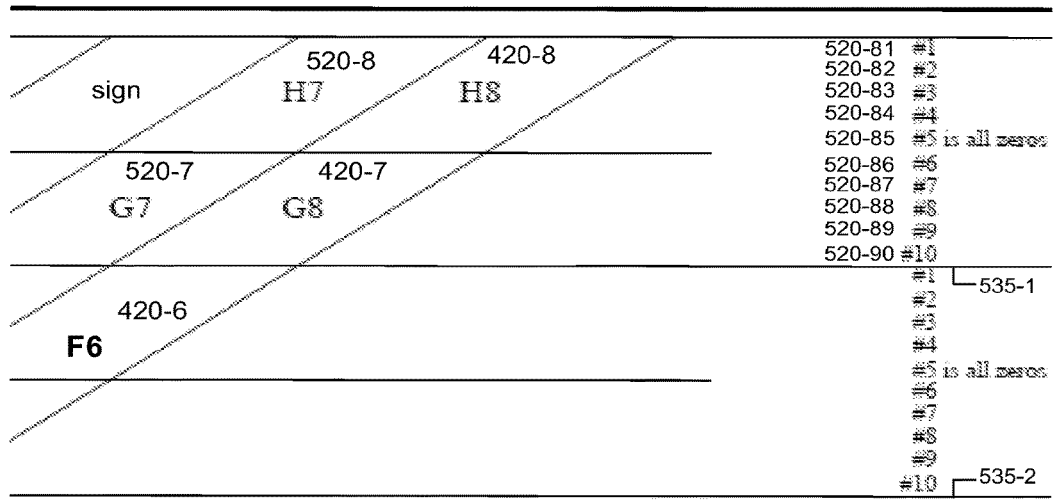

Some of the inputs to the first level of 5:3 compressors are shown in FIG. 9 enclosed in polygons. The polygons enclosing partial product bits shown in FIG. 9 correspond to inputs to the first level of compressors shown in FIG. 10A. In FIG. 10A, 5:3, compressor 1010 receives inputs $p_{3,6}$ 911, $P_{4,6}$ 912 and $S_4$ 913 from column 6 (FIG. 9) in the "one's" bit input position and inputs $p_{1,7}$ 914 and $p_{2,7}$ 915 (marked with "o" in FIG. 10) from column 7 (FIG. 9) in the "two's" input position. As noted above, compressors are considered to be in the column of their respective unary bit positions.

Figure 10B:
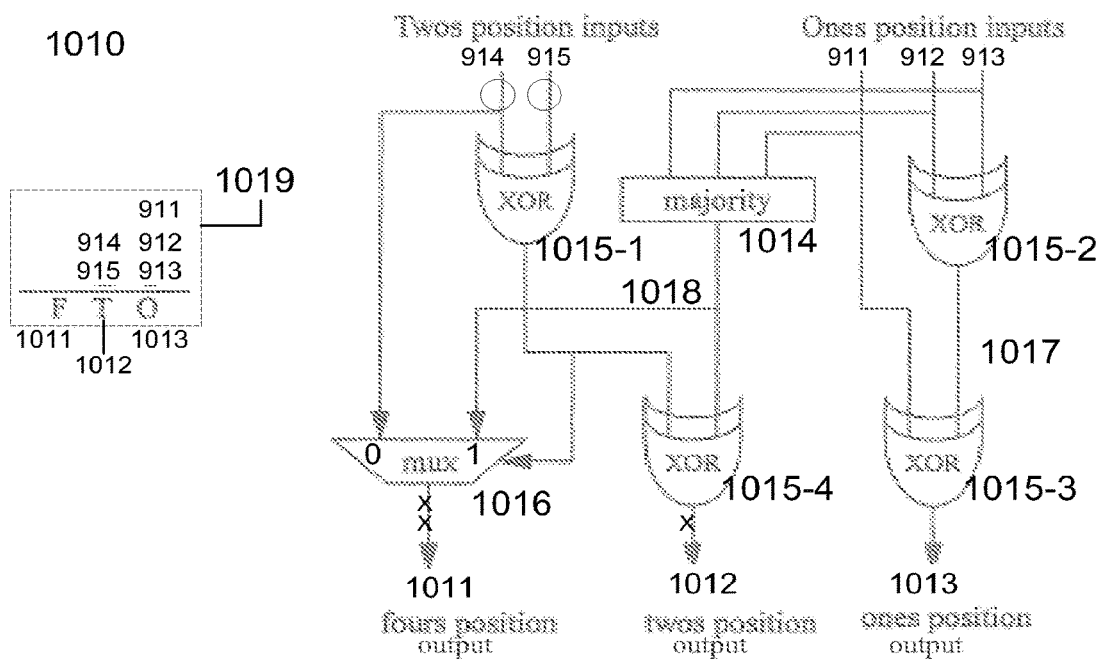
FIG. 10B shows exemplary logic associated with 5:3 compressor 1010.

FIG. 10B shows exemplary logic associated with 5:3 compressor 1010. As shown in FIG. 10B, inputs $p_{3,6}$ 911 and $p_{4,6}$ 912 to 5:3 compressor 1010 are input to XOR gate 1015-2 and the output 1017 (of XOR gate 1015-2) is input along with $S_4$ 913 (in the ones position) to XOR gate 1015-3 to obtain ones position output 1013. As shown in box 1019, XOR gates 1015-2 and 1015-3 sum bits 911, 912 and 913 to obtain 1013 (for column 6).

Similarly, as shown in box 1019, XOR gates 1015-1 and 1015-4 are used, in part, to sum two's position inputs $p_{1,7}$ 914, $p_{2,7}$ 915, and carry 1018 out of the one's position to obtain two's position output 1012 (which is output to column 7). The carry out of the one's position is given by the majority of the values of inputs $p_{3,6}$ 911, $p_{4,6}$ 912 and $S_4$ 913 (in the ones position). The majority of the values of inputs 911, 912 and 913 may be selected using logic 1014 and output as signal 1018.

Further, as shown in box 1019, a carry out of the two's position is used to obtain four's position output 1011. Four's position output is obtained using multiplexer 1016, by selecting input 0 (signal 914) when both 914 and 915 have the same value. Thus, output 1011 of multiplexer 1016 is "1" if both 914 and 915 are "1" or "0" if both 914 and 915 are "0". Further, if exactly one of 914 and 915 is 1 and there is a carry out from inputs 911, 912 and 913, then multiplexer 1016 selects input 1. Because a carry out of the one's position implies a majority (at least two) of the values of 911, 912 and 913 are 1, majority signal 1018 is 1, which becomes output 1011 (for column 8).

Figure 10C:
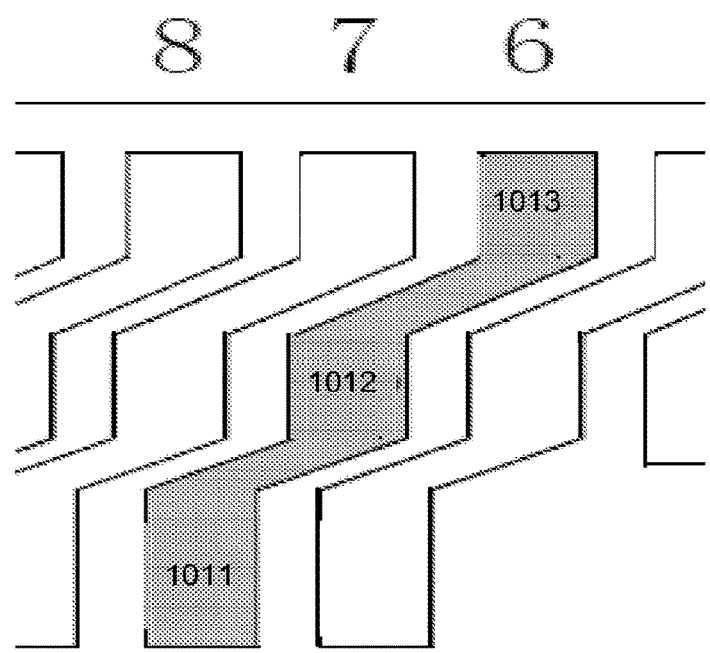
FIG. 10C shows the flow of outputs 1011, 1012 and 1013 to second level compressors.

The flow of outputs 1011, 1012 and 1013 to second level compressors is shown in FIG. 10C. As shown In FIG. 10C, one's position output 1013 of 5:3 compressor 1010 may be one of the inputs to a second level 3:2 compressor 1020, while two position output 1012 forms one of the inputs to a second level 3:2 compressor for column 7 (not shown in FIG. 10A) and four's position output 1011 forms one of the inputs to a second level 3:2 compressor for column 8 (not shown in FIG. 10A).

Although the operation of 5:3 compressor 1010 has been described with respect to the operation of circuit 1010, in general, similar 5:3 compressors may be used in various other circuits described herein. Circuit 1010 is merely exemplary and other 5:3 compressors may also be used in a manner consistent with disclosed embodiments.

Referring to FIG. 10A, signals 1013, 1024 and 1026 are input to 3:2 compressor 1020 at the second level. Further, four's position output 1011 (with two Xs) of compressor 1010 is also input to the second level 3:2 compressor associated with column j+2=8, and two's position output 1012 (with one X) is input to the second level 3:2 compressor associated with column j+1=7.

For column j=6, as shown in FIG. 10A, input 1024 of second level 3:2 compressor 1020 may be obtained from the two's position output of a first level 5:3 compressor for column j-1=5 and output 1026 would be obtained from the four's position output of a first level 5:3 compressor for column j-2=4 if there were a 5:3 compressor in column 4. As noted above, most columns have a 5:3 compressor in the second preceding column but such is not the case from column 6.

Figures 10D, 10E:
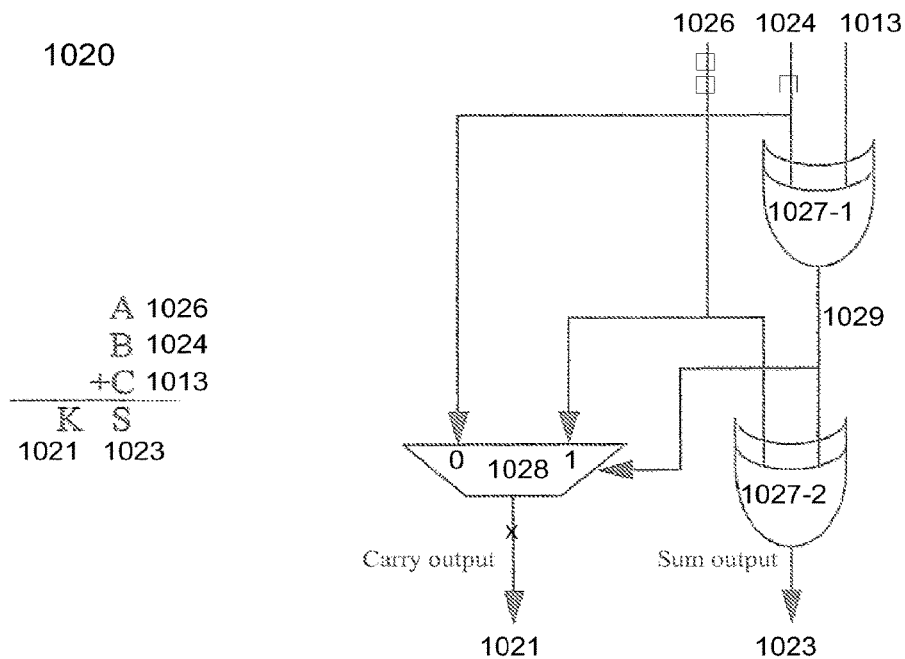
FIG. 10D shows 3:2 compressor or full adder 1020 at the second level, which sums inputs 1013, 1024 and 1026 to produce carry output 1021 and sum output 1023.
FIG. 10E shows the organization of inputs to CLA 1085 for 8 bit by 8 bit integer multiplies.

FIG. 10D shows 3:2 compressor or full adder 1020 at the second level. As shown in box 1022, 3:2 compressor 1020 sums inputs 1013, 1024 and 1026 to produce carry output 1021 and sum output 1023. If all inputs 1013, 1024 and 1026 to XOR gate 1027-1 are 0, then signals 1026 and 1029 are zero and sum output 1023 is 0. Signal 1029 selects signal 1024 as the output, so carry output 1021 is also 0.

If 1029 is 0 because both 1013 and 1024 are 1, then, if 1026=1, sum output 1023=(1026 XOR 1029)=1. Signal 1029 also selects 1024 as the output of multiplexer 1028, which forms carry output 1021=1024=1.

On the other hand, if 1026 is 1 and one of 1013 or 1024 is 1, then: 1029=(1013 XOR 1024)=1, so that sum output 1023=1029 XOR 1026=0. Further input 1 of multiplexer 1028 is selected so that carry output 1021=1026=1.

If only one of inputs 1013, 1024 or 1026 is "1", then: either (a) 1029=(1013 XOR 1024)=1; (b) or 1026=1. In case (a), where 1029=1, then sum output 1023=(1029 XOR 1026)=1, and input 1 of multiplexer 1028 is selected so that carry output 1021=1026=0. In case (b) above, where 1026=1, then 1029=(1013 XOR 1024)=0, so that 1023= (1029 XOR 1026)=1 and input 0 of multiplexer 1028 is selected so that 1023=1024=0.

Although the operation of 3:2 compressor 1020 has been described with respect to the operation of circuit 1020, in general, similar 3:2 compressors may be used in other circuits described herein. Circuit 1020 is merely exemplary and various other 3:2 compressors may also be used in a manner consistent with disclosed embodiments.

The sum output 1023 of 3:2 compressor 1020 may be input to multiplexer 1025. Multiplexer 1025 may also receive carry inputs from 3:2 compressors at the second level in other columns. Multiplexer 1025 may facilitate the routing, alignment and selection of inputs from/to appropriate columns. The outputs of multiplexer 1025 may be combined with extra addition term 1037 by final full adder 1045.

Sum output 1043 of full adder 1045 is input to 135 bit carry lookahead adder (CLA) for fixed point and integer operations 1085, while carry output 1041 is input to column 7. CLA 1085 also receive, as input 1081, the carry output of a full adder for column 5.

Sum output 1023 of 3:2 compressor 1020 is input to 128-bit carry lookahead adder for floating point additions 1080. CLA 1080 may also receive, as input, the carry output of a second level 3:2 compressor for column 5.

FIG. 10E shows the organization of inputs to CLA 1085 for 8-bit by 8-bit integer multiplies. In FIG. 10B, each of the eight sets of partial products A1 B2, C3, D4, E5, F6, G7, and H8 are separated by seven additional columns "b", which are also referred to as "break" columns below. The term "additional" is used to refer to columns in a CLA, which cause the width of the CLA's data path to be greater than the maximum operand size. Thus, for example, CLA 1085, which is capable of operating on 128-bit numbers, has 7 additional columns and is 128+7=135-bits wide. Each additional column "b" includes bit values that are configured to prevent propagation of the carries across the column. In FIG. 10B, the additional (break) columns "b" occur at bit positions 16, 33, 50, 67, 84, 101, and 118. For example, for 8 by 8-bit integer multiplies, each break column in a CLA may be populated with bit values that prevent the propagation of a carry bit resulting from operations in columns preceding the break column to columns after the break column. Note that these bit values occupy inserted columns and thus are physical breaks, not merely logical breaks. Thus, as a consequence of the break column, the carry out of the full adder just before the inserted position is discarded. In some embodiments, for the three bits, which include two bits in the additional (break) column position, and one bit in the carry out position immediately after the additional (break) column position: (a) all three bits are set to 0, if extra term 1037 is being added; or, (b) all three bits are set to 1, if extra term 1037 is being subtracted.

In some embodiments, each break column "b" may prevent carry propagation between the partial product sets. As a consequence of the seven additional columns, for 8-bit by 8-bit multiplies, CLA 1085 is 128+7=135-bits wide. CLA 1085 may output eight sets of partial products A1 B2, C3, D4, E5, F6, G7, and H8.

Figure 11A:
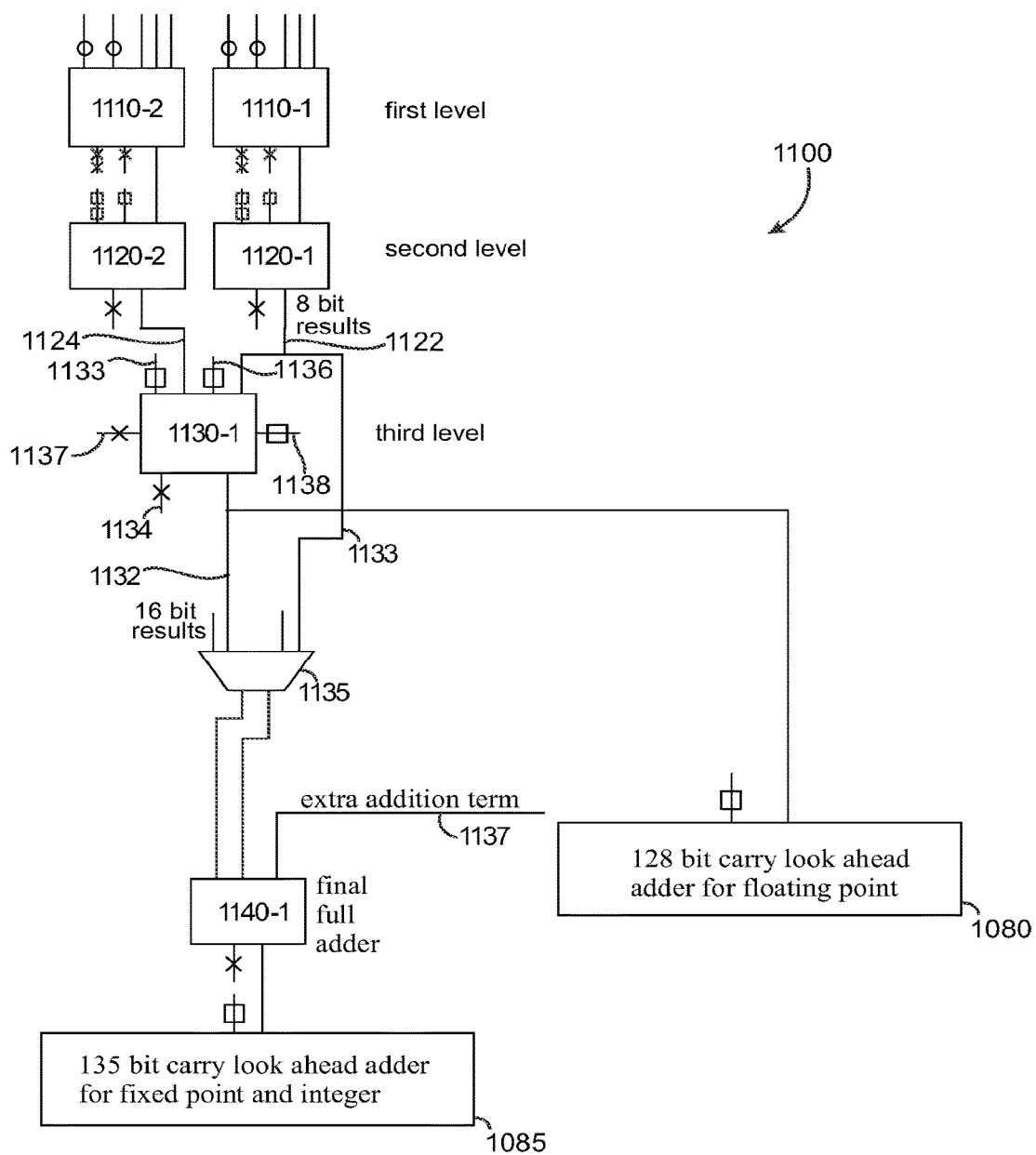
FIG. 11A shows exemplary circuit 1100 for computing the sum of bits in column 14 for partial product sets H7 and G8 in FIG. 8.

FIG. 11A shows exemplary circuit 1100 for computing the sum of bits in column 14 for partial product sets H7 and G8 in FIG. 8. In FIG. 11A, at a first level, 5:3 compressors 1110-1 and 1110-2 compress ten modified Booth encoded input signals for cells H7 and G8 to six output signals. In some embodiments, the 5:3 compressors may be implemented using circuits similar to the 5:3 compressor circuit shown in FIG. 10B. As indicated in FIG. 11A, six of the signals are from column j=14, while four of the signals (shown with circles on the wires) arrive from column j=15. Referring to FIG. 5B, 5:3 compressor 1110-1 may receive 3 inputs from column 14 and 2 inputs from column 15 for partial product set H7, while 5:3 compressor 1110-2 may receive three inputs from column 14 and two inputs from column 15 for partial product set G8.

The one's outputs of 5:3 compressors 1110-1 and 1110-2 are input to input to 3:2 compressors 1120-1 and 1120-2, respectively, at the second level. 5:3. In addition, 3:2 compressors 1120-1 and 1120-2 each receive inputs from the corresponding two's output of first level compressors (not shown in FIG. 11A) in column 13 and the corresponding four's output of first level compressors (not shown in FIG. 11A) in column 12. In some embodiments, the 3:2 compressors may be implemented using circuits similar to the 3:2 compressor circuit shown in FIG. 10D. Further, the two outputs of first level compressors 1110-1 and 1110-2 may be input to second level 3:2 compressors for column 15, while the four's outputs of compressors 1110-1 and 1110-2 may be input to second level 3:2 compressors for column 16.

In some embodiments, the sum output of 3:2 compressors 1120-1 may be selected to form part of 8-bit results output 1122 (e.g. G7), when 8-bit multiplies are being computed. When 16-bit multiplies are being computed, sum outputs of 3:2 compressors 1120-1 and 1120-2 may be input to 4:2 compressor 1130-1 at a third level.

Figure 11B:
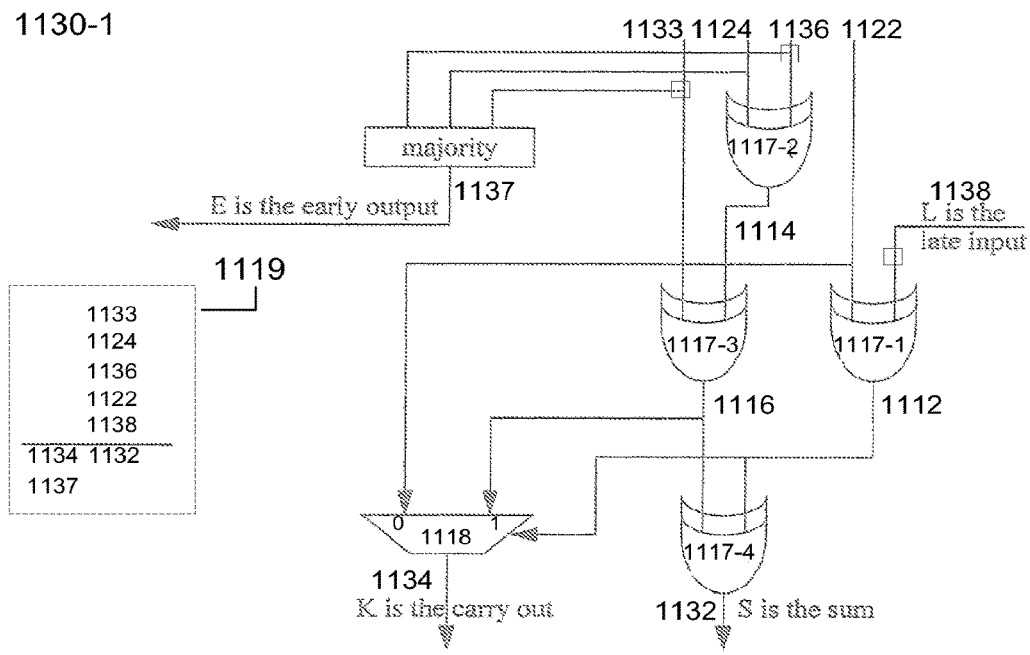
FIG. 11B shows an exemplary circuit for 4:2 compressor 1130-1.

FIG. 11B shows an exemplary circuit for 4:2 compressor 1130-1. 4:2 compressor 1130-1 receives inputs 1133 and 1136 from the carry output of corresponding second level 3:2 compressors for column 13 (not shown in FIGS. 11A and 11B) and inputs 1124 and 1122 from the corresponding one's output of 3:2 compressors 1120-2 and 1120-1, respectively. Further, 4:2 compressor 1130-1 also receives late input from 4:2 compressor for column 13 at the third level (not shown in FIGS. 11A and 11B).

As shown in box 1119, 4:2 compressor 1120 computes the sum of inputs 1133, 1124, 1136, 1122 and 1138 and outputs sum bit 1132, carry bit 1134 and early output 1137. Early output 1137 takes the value of the majority of signals 1133, 1124 and 1136. Accordingly, if two or more of 1133, 1124 and 1136 are 1, then early output E 1137 is also 1.

If inputs 1136, 1124, 1133, 1122 and 1138 are all 0, then: signal 1112 output by XOR gate 1117-1 is 0, signal 1114 output by XOR gate 1117-2 is 0 and signal 1116 output by XOR gate 1117-3 (with inputs 1133 and 1114) is 0. Consequently, sum 1132 output by XOR gate 1117-4 is also 0. Select signal 1112 selects input 0 of multiplexer 1118. Input 0 of multiplexer 1118 corresponds to signal 1122, which is 0. Therefore, output 1134 is also. Output 1137 is also 0.

In FIG. 11B, if only one of inputs 1122 or 1138 to XOR gate 1117-1 is 1, then signal 1112 output by XOR gate 1117-1 is 1, otherwise signal 1112 is 0. Similarly, if only one of inputs 1124 or 1136 to XOR gate 1117-2 is 1, then signal 1114 output by XOR gate 1117-2 is 1, otherwise signal 1114 is 0.

If only one of inputs 1136, 1124, 1133, 1122 and 1138 is 1, then: (a) 1112 is 1 (if only one of 1138 or 1122 is 1), or (b) 1114 is 1 (if only one of 1124 or 1136 is 1) or (c) 1116 is 1 (if only 1133) is 1. Further, because only one of inputs 1136, 1124, 1133, 1122 and 1138 is 1, then only one of 1112 or 1116 is 1. Therefore, sum 1132 is 1.

In FIG. 11B, if any two of inputs 1136, 1124, 1133, 1122 and 1138 is 1, then sum output 1132 is 0, and either early output 1137 or carry output 1134 is 1. The various cases are considered below.

For example, if 1138 and 1122 are both 1, then select 1112 for multiplexer 1118 is 0, which selects input 0 of multiplexer 1118. Input 0 of multiplexer 1118 corresponds to signal 1122, so that the output 1134 of multiplexer 1118 is 1. Because 1112 and 1116 are both 0, sum output 1132 is 0. Further, early output 1137 is also 0.

If one of 1138 or 1122 is 1 and, if only one of 1133, 1124 or 1136 is 1, then 1112 and 1116 are both 1. Accordingly, select 1112 for multiplexer 1118 is 1, which selects input 1 of multiplexer 1118. Input 1 of multiplexer 1118 corresponds to signal 1116, so that the output 1134 of multiplexer 1118 is 1. Because 1112 and 1116 are both 1, sum output 1132 is 0. Further, early output 1137 is also 0.

If both 1138 and 1122 are 0, and only two of 1133, 1124 and 1136 are 1, then 1112 is 0. Further, early output 1137 is 1. Signals 1112 and 1116 are both 0, so that sum output 1132 is 0. Further, 1112 selects input 0 of multiplexer 1118 corresponding to input 1122, so that carry output 1134 is also 0.

If both 1138 and 1122 are 0, and all three of 1133, 1124 and 1136 are 1, then early output 1137 is 1, while 1112 is zero. Consequently, input 0 (which corresponds to signal 1122) of multiplexer 1118 is selected is selected so that carry output 1134 is 0. Signal 1116 is 1 and 1112 is 0 so that sum output 1132 is 1.

If 1138 and 1122 are both 1, and only one of 1133, 1124 or 1136 is 1, then select 1112 for multiplexer 1118 is 0, which selects input 0 of multiplexer 1118. Input 0 of multiplexer 1118 corresponds to signal 1122, so that carry output 1134 is 1. Further, 1116 is 1 and 1112 is 0, so that sum output 1132 is also 1, while early output 1137 is 0.

If one of 1138 and 1122 is 1, and only two of 1133, 1124 or 1136 are 1, then 1112 is 1, which selects input 1 of multiplexer 1118. Further, 1116 is 0, so that sum output 1132 is 1 and carry output 1134 is 0. Early output 1137 is 1.

In FIG. 11B, if both 1138 and 1122 are 1 and, if only two of 1133, 1124 and 1136 are 1, then early output 1137 is 1 and 1112 is 0. Further, 1116 is 0, so that sum output 1132 is 0 and carry output 1134 (corresponding to signal 1122) is 1.

If one of 1138 or 1122 is 1, and all three of 1133, 1124 and 1136 are 1, then early output 1137 is 1 and 1112 is 1. Further, 1116 is 1, so that sum output 1132 is 0 and carry output 1134 (corresponding to signal 1116) is 1.

Finally, if inputs 1136, 1124, 1133, 1122 and 1138 are all 1, then: signal 1112 output by XOR gate 1117-1 is 0, signal 1114 output by XOR gate 1117-2 is 0 and signal 1116 output by XOR gate 1117-3 (with inputs 1133 and 1114) is 1.

Consequently, sum 1132 output by XOR gate 1117-4 is also 1. Select signal 1112 selects input 0 of multiplexer 1118.

Input 0 of multiplexer 1118 corresponds to signal 1122, which is 1. Therefore, output 1134 is also 1. Early output 1137 is also 1.

Although the operation of a 4:2 compressor has been described with respect to the operation of circuit 1130, in general, similar 4:2 compressors may be used in other circuits described herein. Circuit 1130 is merely exemplary and various other 4:2 compressors may also be used in a manner consistent with disclosed embodiments.

Referring to FIG. 11A, early output 1137 may be output to third level compressor for column 15 and carry output 1134 of 4:2 compressor 1130-1 may be output to a multiplexer for column 15 (not shown in FIG. 11A).

The sum output 1132 of 4:2 compressor 1130-1 may be input to multiplexer 1135. In some embodiments, multiplexer 1135 may also receive inputs from 4:2 compressors at the third level from other columns, including 8-bit results and 16-bit sum and carry results. Multiplexer 1135 may facilitate the routing, alignment and selection of inputs from/to appropriate columns. The outputs of multiplexer 1135 may be combined with extra addition term 1137 by final full adder 1140-1. For example, multiplexer 1135 may be used to select one of 8-bit results 1122 or 16-bit results 1132, which may be input to full adder 1140-1.

Sum output of full adder 1140-1 is input to 135 bit carry lookahead adder for fixed point and integer operations 1085, while carry output of full adder 1140-1 is input to column 15 of CLA 1085. CLA 1085 (for column 14) also receives input from column 13.

Sum output 1132 of 4:2 compressor 1130-1 is input to 128-bit carry lookahead adder for floating point additions 1080. CLA 1080 may also receive an input from column 13.

Figure 11C:
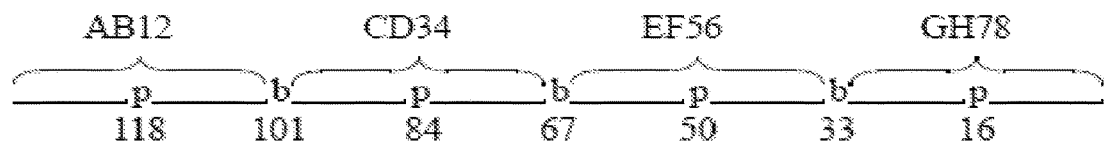
FIG. 11C shows the organization of inputs to CLA 1085 for 16-bit by 16-bit integer multiplies.

FIG. 11C shows the organization of inputs to CLA 1085 for 16-bit by 16-bit integer multiplies. In FIG. 11C, each of the four sets of partial products AB12, CD34, EF56, and GH78 are separated by four additional (break) columns "b", which occur at bits 33, 67, and 101. As outlined above, for break columns, the carry out of the full adder just before the break column position is discarded. The two bits in (i) the additional (break) column position and (ii) the carry out position just after the additional (break) column position are: (a) both set to 0, if extra term 1137 is being added; or, (b) both set to 1, if extra term 1137 is being subtracted. In some embodiments, each additional (break) column "b" may prevent carry propagation between the partial product sets.

Further, in FIG. 11C, each letter "p" represents an additional column with bit values that propagate carries across the column. These additional columns "p" are also referred to as "propagate" columns. Each additional (propagate) column "p" in CLA 1085 may be populated with bit values that cause a carry in to the additional (propagate) column from columns preceding the propagate column to columns after the propagate column. For example, the bits in additional (propagate) column position are set to 1, and the bit in the carry out position is set to zero, or vice versa. Thus, any carry out from the left of the inserted propagate column propagates to the right. The bit placed in the carry out position of the column immediately after the inserted propagate column is the carry out of the full adder from just before the inserted propagate position.

Propagate columns occur at bits 16, 50, 84 and 118. Thus, as a consequence of the three break columns and four propagate columns, for four 16-bit by 16-bit multiplies, CLA 1085 may output four sets of 16-bit partial products AB12, CD34, EF56, and GH78.

In general, an additional column may either be a break column or a propagate column and each additional column may be include bit values that: prevent carry propagation across the additional column, or propagate carries across the additional column. Further, the determination to: (a) propagate carries, or (b) prevent carry propagation across each of the one or more additional columns may be based, in part, on a current instruction being executed by the arithmetic unit, a number of concurrent operations specified in the current instruction, and a precision of the current instruction. The locations of each of the additional columns may be based, in part, on the operand size and position.

Figure 12A:
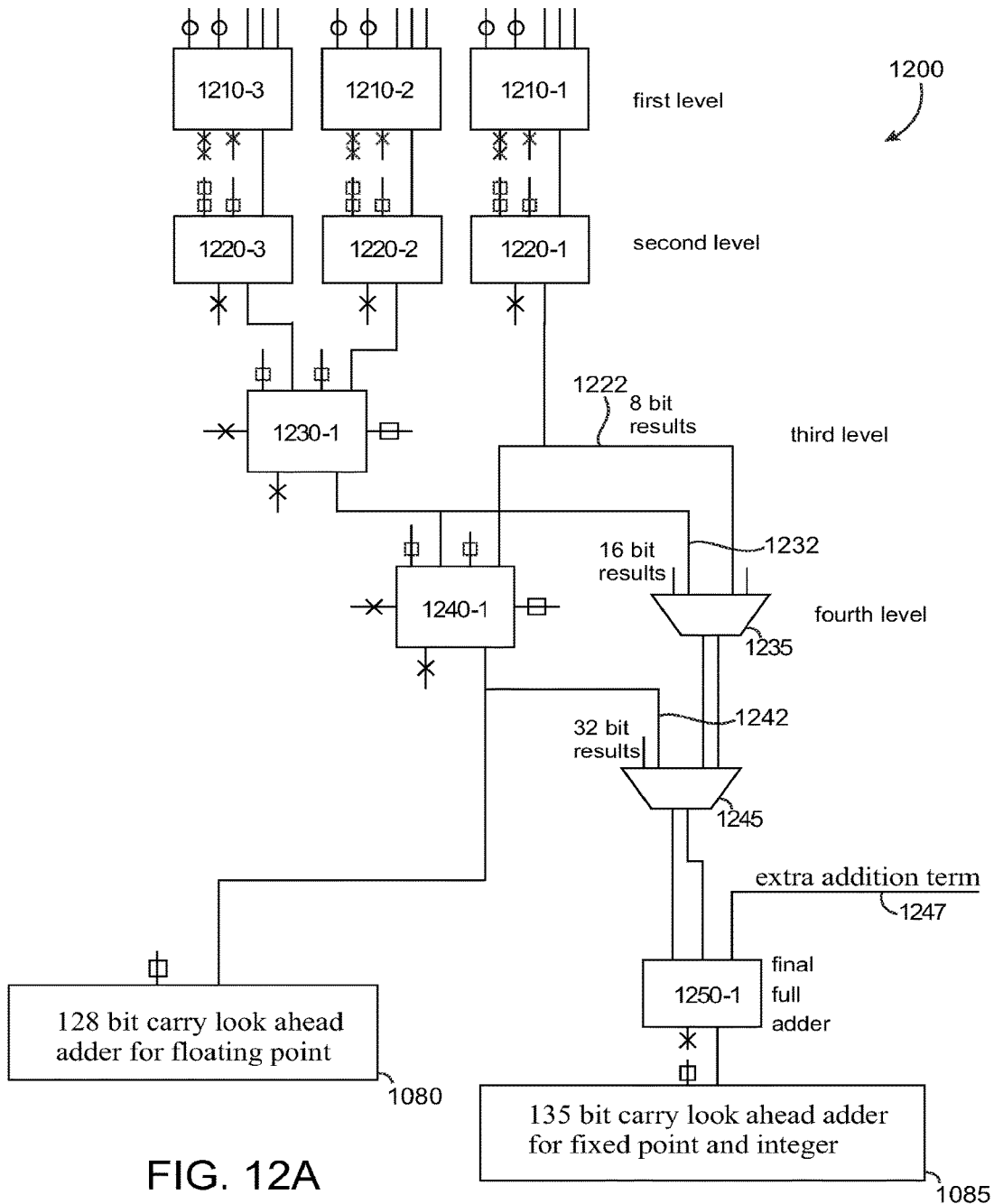
FIG. 12A shows exemplary circuit 1200 for computing the sum of bits in column 22 for partial product sets H6, G7, and F8 in FIG. 8.

FIG. 12A shows exemplary circuit 1200 for computing the sum of bits in column 22 for partial product sets H6, G7, and F8 in FIG. 8. In FIG. 12A, at a first level, 5:3 compressors 1210-1, 1210-2, and 1210-3 compress fifteen modified Booth encoded input signals for cells H6, G7 and F8 to nine output signals. In some embodiments, the 5:3 compressors may be implemented using circuits similar to the 5:3 compressor circuit shown in FIG. 10B. As indicated in FIG. 12A, each 5:3 compressor receives three signals from column j=22, while two of the input signals (shown with circles on the wires) arrive from column j=23.

The one's outputs of 5:3 compressors 1210-1, 1210-2, and 1210-3 are input to 3:2 compressors 1220-1, 1220-2, and 1220-3, respectively, at the second level. 5:3. In addition, 3:2 compressors 1220-1, 1220-2, and 1220-3 each receive inputs from the corresponding two's output of first level compressors (not shown in FIG. 12A) in column 21 and the corresponding four's output of first level compressors (not shown in FIG. 12A) in column 20. In some embodiments, the 3:2 compressors may be implemented using circuits similar to the 3:2 compressor circuit shown in FIG. 10D. Further, the two's outputs of first level compressors 1210-1 1210-2, and 1210-3 may be input to second level 3:2 compressors for column 23, while the four's outputs of compressors 1210-1, 1210-2, and 1210-3 may be input to second level 3:2 compressors for column 24.

Carry outputs of 3:2 compressors 1220-2 and 1220-3 may be output to third level compressors in column 23. Further, the sum output of second level 3:2 compressors 1220-2 and 1220-3 may be input to third level 4:2 compressor 1230-1, which may also receive late input from a third level compressor in column 21 (not shown in FIG. 12A), as well as inputs from carry outputs of second level compressors in column 21.

Further, the sum output of 3:2 compressor 1220-1 may be input to fourth level 4:2 compressor 1240-1, which may also receive the sum output of third level 4:2 compressor 1230-1 as input. In addition fourth level 4:2 compressor 1240-1 may receive late input from a fourth level 4:2 compressor in column 21 and from third level 4:2 compressors in column 21. In some embodiments In some embodiments, the 4:2 compressors may be implemented using circuits similar to the 4:2 compressor circuit shown in FIG. 11B.

In some embodiments, when 8-bit multiplies are being computed, the sum output of 3:2 compressor 1220-1 may be selected by multiplexer 1235 to form part of 8-bit results 1222. When 16-bit multiplies are being computed, the sum output of 3:2 compressors 1230-1 may be selected by multiplexer 1235 to form part of 16-bit results 1232. Further, when 32-bit multiplies are being computed, the sum output of 4:2 compressor may be selected by multiplexer 1245 to form part of 32-bit results 1242. Multiplexer 1235 may also receive carry inputs from other columns.

Multiplexer 1235 may select one of 8-bit results 1222 or 16-bit results 1232, which may be input to multiplexer 1245. Multiplexer 1245 may select one of 32-bit results 1242 or the input selected by multiplexer 1235. The outputs of multiplexer 1245 may be combined with extra addition term 1247 by final full adder 1250-1. Multiplexer 1245 may also receive carry inputs from other columns.

Sum output of full adder 1250-1 is input to 135 bit carry lookahead adder (CLA) for fixed point and integer operations 1085, while carry output of full adder 1250-1 is input to column 23 of CLA 1085. CLA 1085 also receives, as input, the carry output of the final full adder for column 21 (not shown in FIG. 12A).

Sum output of 4:2 compressor 1240-1 is input to 128-bit carry lookahead adder for floating point additions 1080. CLA 1080 may also receive, as input, the carry output from fifth level 4:2 compressor for column 21.

Figure 12B:
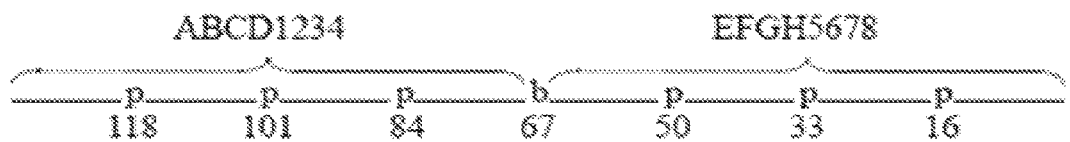
FIG. 12B shows the organization of inputs to CLA 1085 for 32-bit by 32-bit integer multiplies.

FIG. 12B shows the organization of inputs to CLA 1085 for 32-bit by 32-bit integer multiplies. In FIG. 12B, the two sets of partial products ABCD1234 and EFGH5678 are separated by one break column "b", which occurs at bit 67. For break column 67, the carry out of the full adder just before the inserted break position is discarded. The two bits in the inserted break column position and the carry out position just after the inserted break column position are all set to 0, if extra term 1247 is being added; or, all set to 1, if extra term 1247 is being subtracted. Propagate columns occur at bits 16, 33, 50, 84, 101 and 118. Thus, as a consequence of the one break column and six propagate columns, for 32-bit by 32-bit multiplies, CLA 1085 may output two sets of 32-bit partial products ABCD1234 and EFGH5678.

Figure 13A:
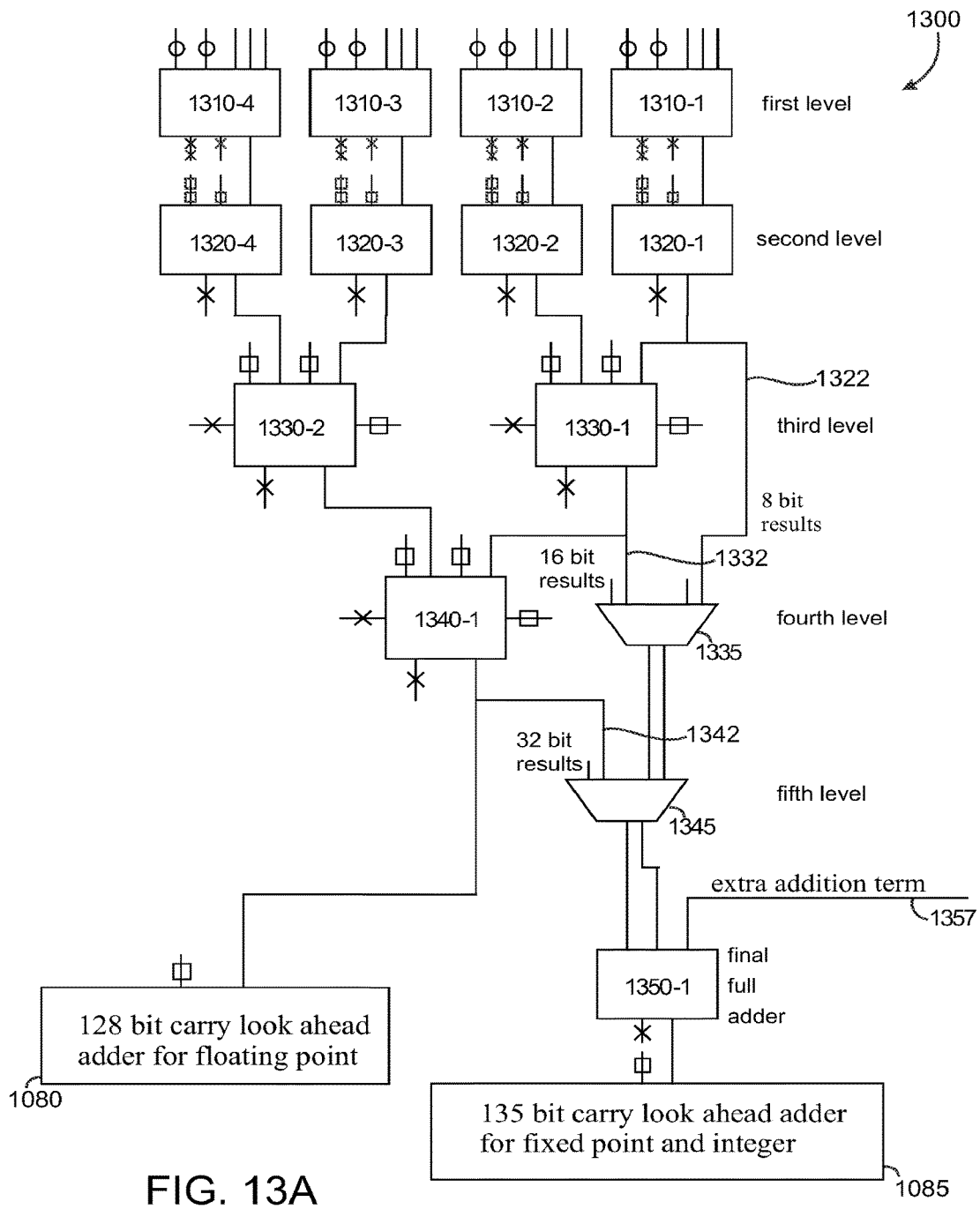
FIG. 13A shows exemplary circuit 1300 for computing the sum of bits in column 30 for partial product sets H5, G6, F7, and E8 in FIG. 8.

FIG. 13A shows exemplary circuit 1300 for computing the sum of bits in column 30 for partial product sets H5, G6, F7, and E8 in FIG. 8. In FIG. 13A, at a first level, 5:3 compressors 1310-1, 1310-2, 1310-3 and 1310-4 compress twenty modified Booth encoded input signals for cells H5, G6, F7, and E8 to twelve output signals. In some embodiments, the 5:3 compressors may be implemented using circuits similar to the 5:3 compressor circuit shown in FIG. 10B. As indicated in FIG. 13A, each 5:3 compressor receives three signals from column j=30, while two of the input signals (shown with circles on the wires) arrive from column j=31.

The one's outputs of 5:3 compressors 1310-1, 1310-2, 1310-3, and 1310-4 are input to input to 3:2 compressors 1320-1, 1320-2, 1320-3, and 1320-4, respectively, at the second level. In addition, 3:2 compressors 1320-1, 1320-2, 1320-3 and 1320-4 each receive inputs from the corresponding two's output of first level 5:3 compressors (not shown in FIG. 13A) in column 29 and the corresponding four's output of first level 5:3 compressors (not shown in FIG. 13A) in column 28. In some embodiments, the 3:2 compressors may be implemented using circuits similar to the 3:2 compressor circuit shown in FIG. 10D. Further, the two outputs of first level compressors 1310-1, 1310-2, 1310-3, and 1310-4 may be input to second level 3:2 compressors for column 31, while the four's outputs of compressors 1310-1, 1310-2, 1310-3, and 1310-4 may be input to second level 3:2 compressors for column 32.

Carry outputs of 3:2 compressors 1320-1, 1320-2, 1320-3 and 1320-4 may be output to third level compressors in column 31 (not shown in FIG. 13A). Further, the sum output of second level 3:2 compressors 1320-1 and 1320-2 may be input to third level 4:2 compressor 1330-1, which may also receive late input from a third level compressor in column 29 (not shown in FIG. 13A), as well as inputs from second level compressors in column 29. Similarly, the sum output of second level 3:2 compressors 1320-3 and 1320-4 may be input to third level 4:2 compressor 1330-2, which may also receive late input from a third level compressor in column 29 (not shown in FIG. 13A), as well as inputs from second level compressors in column 29.

Early outputs of third level 4:2 compressors 1330-1 and 1330-2 may be input to third level 4:2 compressors in column 31, while carry outputs of 4:2 compressors 1330-1 and 1330-2 may be input to fourth level 4:2 compressor in column 31 (not shown in FIG. 13A). Further, sum outputs of 4:2 compressors 1330-1 and 1330-2 may be input to fourth level 4:2 compressor 1340-1, which also receives late input from a fourth level 4:2 compressor in column 29, and inputs from third level 4:2 compressors in column 29.

The early output of fourth level 4:2 compressor 1340-1 may be input to fourth level compressor for column 31, while carry output of 4:2 compressor 1340-1 may be input to column 31 of CLA 1080. In some embodiments, the 4:2 compressors may be implemented using circuits similar to the exemplary 4:2 compressor circuit shown in FIG. 11B.

In some embodiments, when 8-bit multiplies are being computed, the sum output of 3:2 compressor 1320-1 may be selected by multiplexer 1335 to form part of 8-bit results 1322 (e.g. E5). When 16-bit multiplies are being computed, the sum output of 3:2 compressors 1330-1 may be selected by multiplexer 1335 to form part of 16-bit results 1332 (e.g. EF56). Further, when 32-bit multiplies are being computed, the sum output of 4:2 compressor may be selected by multiplexer 1345 to form part of 32-bit results 1342 (e.g. EFGH5678).

Multiplexer 1335 may select one of 8-bit results 1322 or 16-bit results 1332, which may be input to multiplexer 1345. Multiplexer 1345 may select one of 32-bit results 1342 or the input selected by multiplexer 1335. The outputs of multiplexer 1345 may be combined with extra addition term 1357 by final full adder 1350-1.

Sum output of full adder 1350-1 is input to 135 bit carry lookahead adder (CLA) for fixed point and integer operations 1085, while carry output is input to column 31 of CLA 1085. CLA 1085 also receives, as input, the carry output from the final full adder for column 29 (not shown in FIG. 13A).

Sum output of 4:2 compressor 1340-1 is input to 128-bit carry lookahead adder for floating point additions 1080. CLA 1080 may also receive, as input, carry output from fifth level 4:2 compressor for column 29.

Figure 13B:
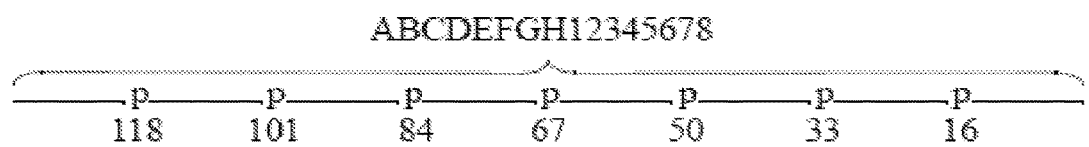
FIG. 13B shows the organization of inputs to CLA 1085 for 64-bit by 64-bit integer multiplies.

FIG. 13B shows the organization of inputs to CLA 1085 for 64-bit by 64-bit integer multiplies. In FIG. 13B, there are no break columns for the one partial product set ABCDEFGH12345678. Further, in FIG. 13B, propagate columns occur at bits 16, 33, 50, 67, 84, 101 and 118. Thus, as a consequence of the seven propagate columns, for 64-bit by 64-bit multiplies, CLA 1085 may output partial product set ABCDEFGH12345678.

Figure 14:
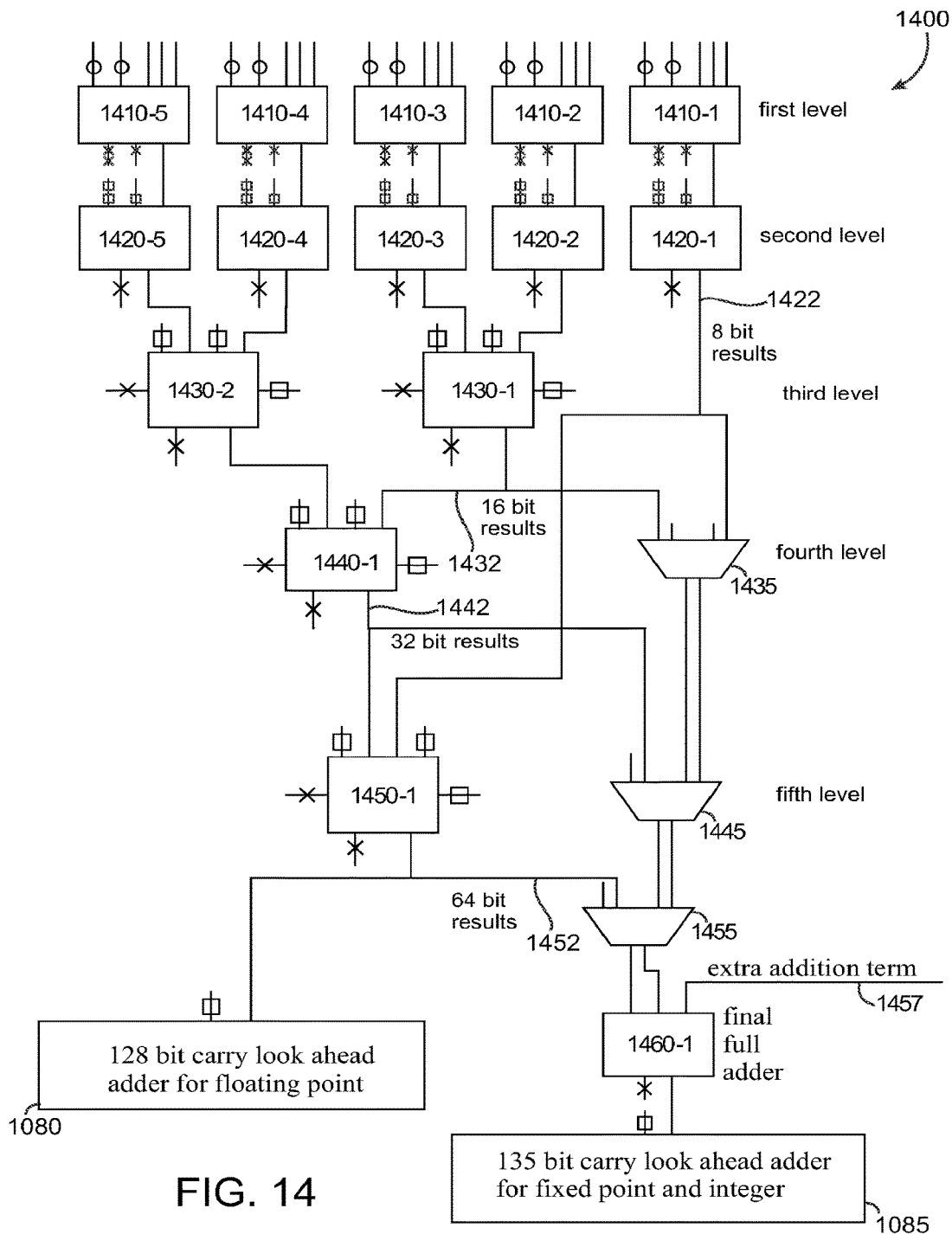
FIGS. 14-24 show exemplary circuits 1400, 1500, 1600, 1700, 1800, 1900, 2000, 2100, 2200, 2300, and 2400 for computing sums in columns 38, 46, 54, 62, 70, 78, 86, 94, 102, 110 and 118, respectively, in FIG. 8.

FIG. 14 shows exemplary circuit 1400 for computing the sum of bits in column 38 for partial product sets H4, G5, F6, E7, and D8 in FIG. 8. In FIG. 14, at a first level, 5:3 compressors 1410-1, 1410-2, 1410-3, 1410-4, and 1410-4 compress twenty-five modified Booth encoded input signals for cells H4, G5, F6, E7, and D8 to fifteen output signals. In some embodiments, the 5:3 compressors may be implemented using circuits similar to the 5:3 compressor circuit shown in FIG. 10B. As indicated in FIG. 14, each 5:3 compressor receives three signals from column j=38, while two of the input signals (shown with circles on the wires) arrive from column j=39.

The one's outputs of 5:3 compressors 1410-1, 1410-2, 1410-3, 1410-4, and 1410-5 are input to input to 3:2 compressors 1420-1, 1420-2, 1420-3, 1420-4 and 1420-5, respectively, at the second level. In addition, 3:2 compressors 1420-1, 1420-2, 1420-3, 1420-4, and 1420-5 each receive inputs from the corresponding two's output of first level 5:3 compressors (not shown in FIG. 14) in column 37 and the corresponding four's output of first level 5:3 compressors (not shown in FIG. 14) in column 36. In some embodiments, the 3:2 compressors may be implemented using circuits similar to the 3:2 compressor circuit shown in FIG. 10D. Further, the two's outputs of first level compressors 1410-1, 1410-2, 1410-3, 1410-4, and 1410-5 may be input to second level 3:2 compressors for column 39, while the four's outputs of compressors 1410-1, 1410-2, 1410-3, 1410-4, and 1410-5 may be input to second level 3:2 compressors for column 40.

Carry outputs of 3:2 compressors 1420-1, 1420-2, 1420-3, 1420-4, and 1420-5 may be output to third level compressors in column 39 (not shown in FIG. 14). Further, the sum output of second level 3:2 compressors 1420-2 and 1420-3 may be input to third level 4:2 compressor 1430-1, which may also receive late input from a third level 4:2 compressor in column 37 (not shown in FIG. 14), as well as inputs from second level 3:2 compressors in column 37. Similarly, the sum output of second level 3:2 compressors 1420-4 and 1420-5 may be input to third level 4:2 compressor 1430-2, which may also receive late input from a third level compressor in column 37 (not shown in FIG. 14), as well as inputs from second level 3:2 compressors in column 37.

Early outputs of third level 4:2 compressors 1430-1 and 1430-2 may be input to third level 4:2 compressors in column 39, while carry outputs of 4:2 compressors 1430-1 and 1430-2 may be input to fourth level 4:2 compressor in column 39 (not shown in FIG. 14). Further, sum outputs of 4:2 compressors 1430-1 and 1430-2 may be input to fourth level compressor 1440-1, which also receives late input from fourth level 4:2 compressor in column 37 and from third level 4:2 compressors in column 37.

The early output of fourth level 4:2 compressor 1440-1 may be input to fourth level compressor for column 39, while carry output of 4:2 compressor 1440-1 may be input to the next column of CLA 1080. In some embodiments, the 4:2 compressors may be implemented using circuits similar to the 4:2 compressor circuit shown in FIG. 11B.

In some embodiments, when 8-bit multiplies are being computed, the sum output of 3:2 compressor 1420-1 may be selected by multiplexer to form part of 8-bit results 1422 (e.g. D4). When 16-bit multiplies are being computed, the sum output of 4:2 compressors 1430-1 may be selected to form part of 16-bit results 1432 (e.g. EF56). Further, when 32-bit multiplies are being computed, the sum output of 4:2 compressor 1440-1 may be tapped to form part of 32-bit results 1442 (e.g. EFGH5678).

Multiplexer 1435 may select one of 8-bit results 1422 or 16-bit results 1432, which may be input to multiplexer 1445. Multiplexer 1445 may select one of 32-bit results 1442 or the input selected by multiplexer 1435. Further, multiplexer 1455 may select one of 64-bit results 1452 or the input selected by multiplexer 1445. The outputs of multiplexer 1455 may be combined with extra addition term 1457 by final full adder 1460-1. Multiplexers 1435 and 1445 may also receive carry outputs from other columns.

Sum output of full adder 1460-1 is input to 135 bit carry lookahead adder (CLA) for fixed point and integer operations 1085, while carry output is input to column 39 of CLA 1085. CLA 1085 also receives input from the final full adder for column 37 (not shown in FIG. 14). As discussed previously, appropriate break and propagate columns may be inserted in CLA 1085 based on the integer or fixed point multiplies being computed.

Sum output of 4:2 compressor 1450-1 is input to 128-bit carry lookahead adder for floating point additions 1080. CLA 1080 may also receive an input from fifth level 4:2 compressor for column 37.

Figure 15:
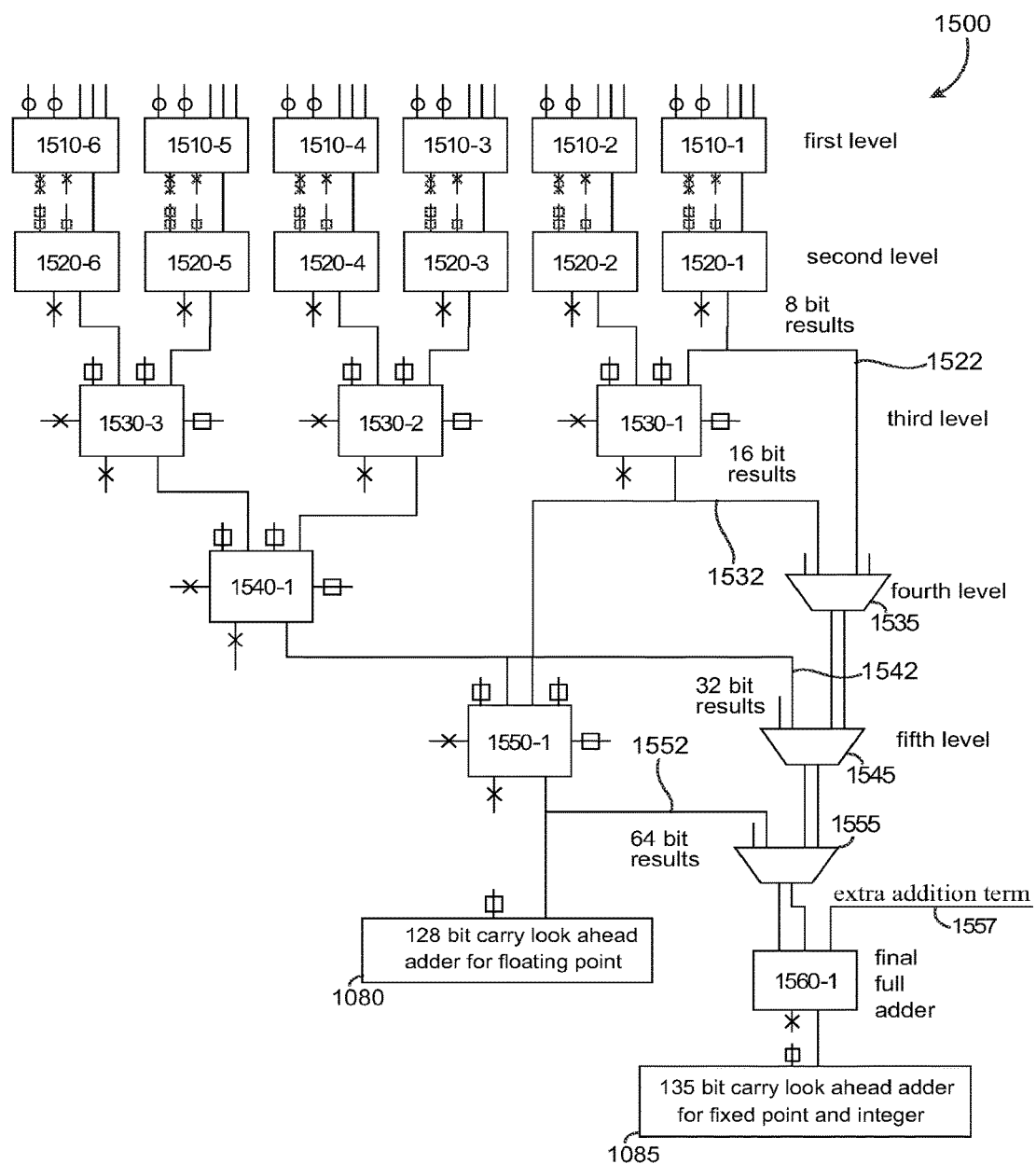

FIG. 15 shows exemplary circuit 1500 for computing the sum of bits in column 46 for partial product sets H3, G4, F5, E6, D7, and C8 in FIG. 8. In FIG. 15 at a first level, 5:3 compressors 1510-1, 1510-2, 1510-3, 1510-4, 1510-5, and 1510-6 compress thirty input signals for cells H3, G4, F5, E6, D7, and C8 to eighteen output signals. In some embodiments, the 5:3 compressors may be implemented using circuits similar to the 5:3 compressor circuit shown in FIG. 10B. As indicated in FIG. 15, each 5:3 compressor receives three signals from column 46, while two of the input signals (shown with circles on the wires) arrive from column 47.

The one's outputs of 5:3 compressors 1510-1, 1510-2, 1510-3, 1510-4, 1510-5, and 1510-6 are input to input to 3:2 compressors 1520-1, 1520-2, 1520-3, 1520-4, 1520-5, and 1520-6, respectively, at the second level. In addition, 3:2 compressors 1520-1, 1520-2, 1520-3, 1520-4, 1520-5, and 1520-6 each receive inputs from the corresponding two's output of first level 5:3 compressors (not shown in FIG. 15) in column 45 and the corresponding four's output of first level 5:3 compressors (not shown in FIG. 15) in column 44. In some embodiments, the 3:2 compressors may be implemented using circuits similar to the 3:2 compressor circuit shown in FIG. 10D. Further, the two's outputs of first level compressors 1510-1, 1510-2, 1510-3, 1510-4, 1510-5, and 1510-6 may be input to second level 3:2 compressors for column 47, while the four's outputs of compressors 1510-1, 1510-2, 1510-3, 1510-4, 1510-5, and 1510-6 may be input to second level 3:2 compressors for column 48.

Carry outputs of 3:2 compressors 1520-1, 1520-2, 1520-3, 1520-4, 1520-5, and 1520-6 may be output to third level compressors in column 47 (not shown in FIG. 15). Further, the sum outputs of second level 3:2 compressor pairs (1520-1, 1520-2), (1520-3, 1520-4) and (1520-5, 1520-6) may be input to third level 4:2 compressors 1530-1, 1530-2, and 1530-3, respectively. Each of compressors 1530-1, 1530-2, and 1530-3 may also receive late input from a third level 4:2 compressor in column 45 (not shown in FIG. 15), as well as inputs from second level 3:2 compressors in column 45.

Early outputs of third level 4:2 compressors 1530-1, 1530-2, and 1530-3 may be input to third level 4:2 compressors in column 47, while carry outputs of 4:2 compressors 1530-1, 1530-2, and 1530-3 may be input to fourth level 4:2 compressor in column 47 (not shown in FIG. 15). Further, sum outputs of 4:2 compressors 1530-2 and 1530-3 may be input to fourth level compressor 4:2 1540-1, which also receives late input from fourth level 4:2 compressors in column 45, and inputs from third level 4:2 compressors in column 45.

The early output of fourth level 4:2 compressor 1540-1 may be input to fourth level compressor for column 47, while carry output of 4:2 compressor 1540-1 may be input to a fifth level 4:2 compressor for column 47. The sum output of 4:2 compressor 1540-1 may be input to fifth level 4:2 compressor 1550-1, which also receives, as input, the sum output of third level 4:2 compressor 1530-1. In addition, 4:2 compressor 1550-1 receives late input from a fifth level compressor for column 45 and inputs from fourth level 4:2 compressors in column 45.

The early output of 4:2 compressor 1550-1 is input to a fifth level compressor for column 47. The carry output of 4:2 compressor 1550-1 is input to the next column of CLA 1080. In some embodiments, the 4:2 compressors may be implemented using circuits similar to the 4:2 compressor circuit shown in FIG. 11B.

In some embodiments, when integer 8-bit multiplies are being computed, the sum output of 3:2 compressor 1520-1 may be selected by multiplexer 1535 to form part of 8-bit results 1522 (e.g. C3). When integer 16-bit multiplies are being computed, the sum output of 4:2 compressors 1530-1 may be selected by multiplexer 1535 to form part of 16-bit results 1532 (e.g. CD34). Further, when integer 32-bit multiplies are being computed, the sum output of 4:2 compressor 1540-1 may be selected by multiplexer 1545 to form part of 32-bit results 1542 (e.g. EFGH5678). Multiplexers 1535 and 1545 may also receive carry outputs from other columns.

Multiplexer 1535 may select one of 8-bit results 1522 or 16-bit results 1532, which may be input to multiplexer 1545. Multiplexer 1545 may select one of 32-bit results 1542 or the input selected by multiplexer 1535. Further, multiplexer 1555 may select one of 64-bit results 1552 or the input selected by multiplexer 1545. The outputs of multiplexer 1555 may be combined with extra addition term 1557 by final full adder 1560-1.

Sum output of full adder 1560-1 is input to 135 bit carry lookahead adder (CLA) for fixed point and integer operations 1085, while carry output is input to column 47 of CLA 1085. CLA 1085 also receives input from the final full adder for column 45 (not shown in FIG. 15). As discussed previously, appropriate break and propagate columns may be inserted in CLA 1085 based on the integer or fixed point multiplies being computed.

Sum output of 4:2 compressor 1550-1 is input to 128-bit carry lookahead adder for floating point additions 1080. CLA 1080 may also receive an input from fifth level 4:2 compressor for column 45.

Figure 16:
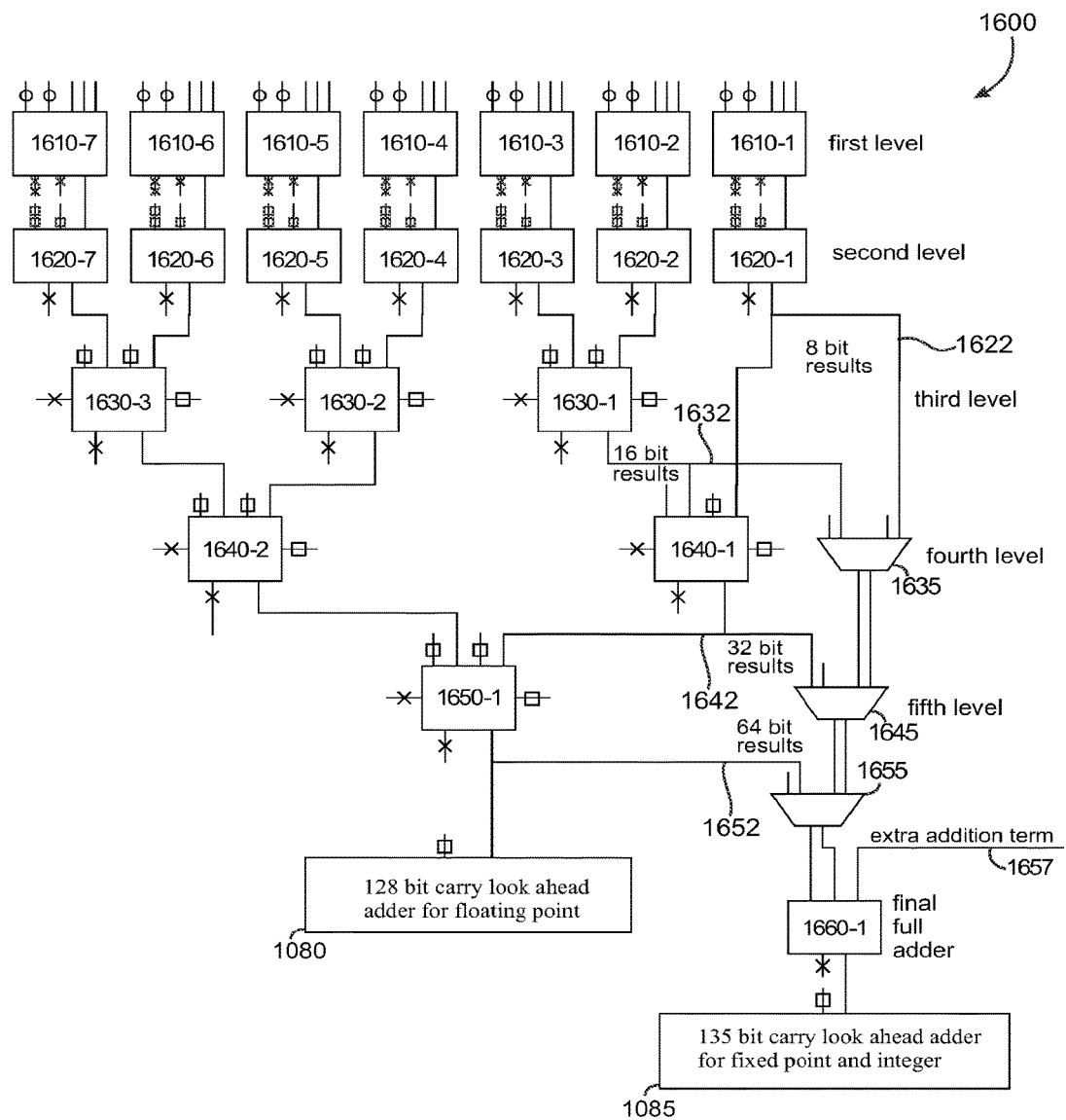

FIG. 16 shows exemplary circuit 1600 for computing the sum of bits in column 54 for partial product sets H2, G3, F4, E5, D6, C7, and B8 in FIG. 8. In FIG. 16 at a first level, 5:3 compressors 1610-1, 1610-2, 1610-3, 1610-4, 1610-5, 1610-6 and 1610-7 compress thirty-five modified Booth encoded input signals for cells H3, G4, F5, E6, D7, and C8 to twenty-one output signals. In some embodiments, the 5:3 compressors may be implemented using circuits similar to the 5:3 compressor circuit shown in FIG. 10B. As indicated in FIG. 16, each 5:3 compressor receives three signals from column 54, while two of the input signals (shown with circles on the wires) arrive from column 55.

The one's outputs of 5:3 compressors 1610-1, 1610-2, 1610-3, 1610-4, 1610-5, 1610-6, and 1610-7 are input to input to 3:2 compressors 1620-1, 1620-2, 1620-3, 1620-4, 1620-5, 1620-6, and 1620-7, respectively, at the second level. In addition, 3:2 compressors 1620-1, 1620-2, 1620-3, 1620-4, 1620-5, 1620-6, and 1620-7 each receive inputs from the corresponding two's output of first level 5:3 compressors (not shown in FIG. 16) in column 53 and the corresponding four's output of first level 5:3 compressors (not shown in FIG. 16) in column 52. In some embodiments, the 3:2 compressors may be implemented using circuits similar to the 3:2 compressor circuit shown in FIG. 10D. Further, the two's outputs of first level compressors 1610-1, 1610-2, 1610-3, 1610-4, 1610-5, 1610-6, and 1610-7 may be input to second level 3:2 compressors for column 55, while the four's outputs of compressors 1610-1, 1610-2, 1610-3, 1610-4, 1610-5, 1610-6, and 1610-7 may be input to second level 3:2 compressors for column 56.

Carry outputs of 3:2 compressors 1620-1, 1620-2, 1620-3, 1620-4, 1620-5, 1620-6, and 1620-7 may be output to third level compressors in column 55 (not shown in FIG. 16). Further, the sum outputs of second level 3:2 compressor pairs (1620-2, 1620-3), (1620-4, 1620-5) and (1620-6, 1620-7) may be input to third level 4:2 compressors 1630-1, 1630-2, and 1630-3, respectively. Each of compressors 1630-1, 1630-2, and 1630-3 may also receive late input from a third level 4:2 compressor in column 53 (not shown in FIG. 16), as well as inputs from second level 3:2 compressors in column 53.

Early outputs of third level 4:2 compressors 1630-1, 1630-2, and 1630-3 may be input to third level 4:2 compressors in column 55, while carry outputs of 4:2 compressors 1630-1, 1630-2, and 1630-3 may be input to fourth level 4:2 compressor in column 55 (not shown in FIG. 16). Further, sum outputs of 4:2 compressors 1630-2 and 1630-3 may be input to fourth level 4:2 compressor 1640-2, which also receives late input from fourth level 4:2 compressors in column 53, and inputs from third level 4:2 compressors in column 53.

The early output of fourth level 4:2 compressor 1640-2 may be input to fourth level compressor for column 55, while carry output of 4:2 compressor 1640-2 may be input to a fifth level 4:2 compressor for column 55. The sum output of 4:2 compressor 1640-2 may be input to fifth level 4:2 compressor 1650-1.

The sum output of 3:2 compressor 1620-1 and the sum output of 4:2 compressor 1630-1 may be input to 4:2 compressor 1640-1, which also receives late input from fourth level 4:2 compressors in column 53, and inputs from third level 4:2 compressors in column 53.

The sum output of 4:2 compressor 1640-1 may also be input to fifth level 4:2 compressor 1650-1, which also receives, as input, late input from a fifth level compressor for column 53 and inputs from fourth level 4:2 compressors in column 53. The early output of 4:2 compressor 1650-1 is input to a fifth level compressor for column 55. The carry output of 4:2 compressor 1650-1 is input to column 55 of CLA 1080. In some embodiments, the 4:2 compressors may be implemented using circuits similar to the 4:2 compressor circuit shown in FIG. 11B.

In some embodiments, when integer 8-bit multiplies are being computed, the sum output of 3:2 compressor 1620-1 may be selected by multiplexer 1635 to form part of 8-bit results 1622 (e.g. B2). When integer 16-bit multiplies are being computed, the sum output of 4:2 compressors 1630-1 may be selected by multiplexer 1645 to form part of 16-bit results 1632 (e.g. CD34). Further, when integer 32-bit multiplies are being computed, the sum output of 4:2 compressor 1640-1 may be selected by multiplexer 1655 to form part of 32-bit results 1442 (e.g. EFGH5678).

Multiplexer 1635 may select one of 8-bit results 1622 or 16-bit results 1632, which may be input to multiplexer 1645. Multiplexer 1645 may select one of 32-bit results 1642 or the input selected by multiplexer 1635. Further, multiplexer 1655 may select one of 64-bit results 1652 or the input selected by multiplexer 1645. The outputs of multiplexer 1655 may be combined with extra addition term 1657 by final full adder 1660-1. Multiplexers 1635, 1645, and 1655 may also receive carry outputs from other columns.

Sum output of full adder 1660-1 is input to 135 bit carry lookahead adder (CLA) for fixed point and integer operations 1085, while carry output is input to column 55 of CLA 1085. CLA 1085 also receives input from the final full adder for column 55 (not shown in FIG. 16). As discussed previously, appropriate break and propagate columns may be inserted in CLA 1085 based on the integer multiplies being computed.

Sum output of 4:2 compressor 1650-1 is input to 128-bit carry lookahead adder for floating point additions 1080. CLA 1080 may also receive an input from fifth level 4:2 compressor for column 53.

Figure 17:
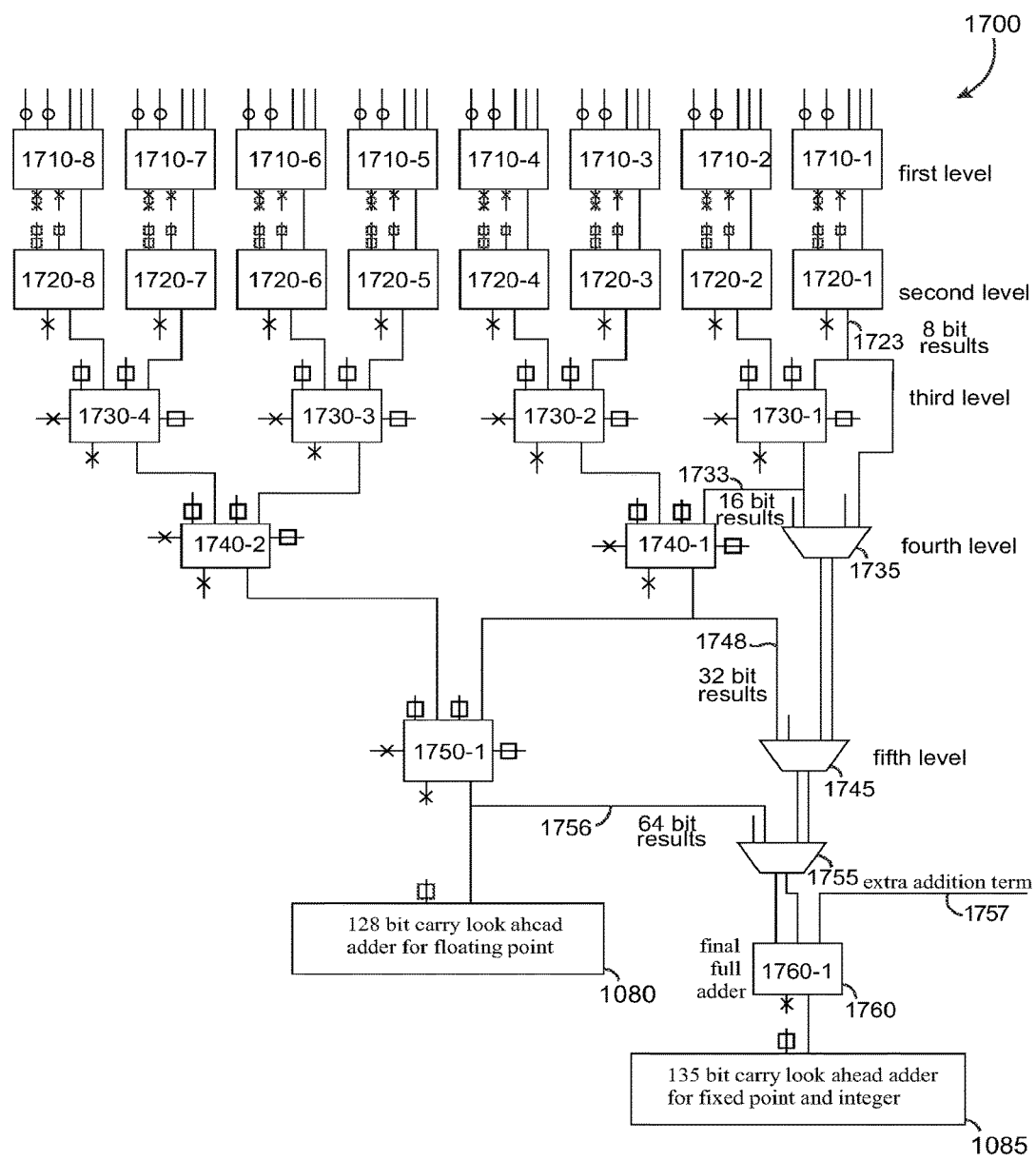

FIG. 17 shows exemplary circuit 1700 for computing the sum of bits in column 62 for partial product sets H1, G2, F3, E4, D5, C6, B7 and A8 in FIG. 8. In FIG. 17 at a first level, 5:3 compressors 1710-1, 1710-2, 1710-3, 1710-4, 1710-5, 1710-6, 1710-7, and 1710-8 compress thirty-five modified Booth encoded input signals for cells H1, G2, F3, E4, D5, C6, B7 and A8 to twenty-four output signals. In some embodiments, the 5:3 compressors may be implemented using circuits similar to the 5:3 compressor circuit shown in FIG. 10B. As indicated in FIG. 17, each 5:3 compressor receives three signals from column 62, while two of the input signals (shown with circles on the wires) arrive from column 63.

The one's outputs of 5:3 compressors 1710-1, 1710-2, 1710-3, 1710-4, 1710-5, 1710-6, 1710-7, and 1710-8 are input to input to 3:2 compressors 1720-1, 1720-2, 1720-3, 1720-4, 1720-5, 1720-6, 1720-7, and 1720-8, respectively, at the second level. In addition, 3:2 compressors 1720-1, 1720-2, 1720-3, 1720-4, 1720-5, 1720-6, 1720-7, and 1720-8 each receive inputs from the corresponding two's output of first level 5:3 compressors (not shown in FIG. 17) in column 61 and the corresponding four's output of first level 5:3 compressors (not shown in FIG. 17) in column 60.

In some embodiments, the 3:2 compressors may be implemented using circuits similar to the 3:2 compressor circuit shown in FIG. 10D. Further, the two's outputs of first level compressors 1710-1, 1710-2, 1710-3, 1710-4, 1710-5, 1710-6, 1710-7, and 1710-8 may be input to second level 3:2 compressors for column 63, while the four's outputs of compressors 1710-1, 1710-2, 1710-3, 1710-4, 1710-5, 1710-6, 1710-7, and 1710-8 may be input to second level 3:2 compressors for column 64.

Carry outputs of 3:2 compressors 1720-1, 1720-2, 1720-3, 1720-4, 1720-5, 1720-6, 1720-7, and 1720-8 may be output to third level compressors in column 63 (not shown in FIG. 17). Further, the sum outputs of second level 3:2 compressor pairs (1720-1, 1720-2), (1720-3, 1720-4), (1720-5, 1720-6) and (1720-7, 1720-8) may be input to third level 4:2 compressors 1730-1, 1730-2, 1730-3, and 1730-4, respectively. Each of compressors 1730-1, 1730-2, 1730-3, and 1730-4 may also receive late input from a third level 4:2 compressor in column 61 (not shown in FIG. 17), as well as inputs from second level 3:2 compressors in column 61.

Early outputs of third level 4:2 compressors 1730-1, 1730-2, 1730-3, and 1730-4 may be input to third level 4:2 compressors in column 63, while carry outputs of 4:2 compressors 1730-1, 1730-2, 1730-3, and 1730-4 may be input to fourth level 4:2 compressor in column 63 (not shown in FIG. 17). Further, sum outputs of 4:2 compressor pairs (1730-1, 1730-2) and (1730-3, 1730-4) may be input to fourth level 4:2 compressors 1740-1 and 1740-2, respectively. Compressors 1740-1 and 1740-2 also receive late input from fourth level 4:2 compressors in column 61, and inputs from third level 4:2 compressors in column 61.

The early output of fourth level 4:2 compressors 1740-1 and 1740-2 may be input to fourth level compressors for column 63, while their carry outputs of may be input to fifth level 4:2 compressors for column 63. The sum output of 4:2 compressors 1740-1 and 1740-2 may be input to fifth level 4:2 compressor 1750-1, which also receives, as input, late input from a fifth level compressor for column 61 and inputs from fourth level 4:2 compressors in column 61.

The early output of 4:2 compressor 1750-1 is input to a fifth level compressor for column 63. The carry output of 4:2 compressor 1750-1 is input to column 63 of CLA 1080. In some embodiments, the 4:2 compressors may be implemented using circuits similar to the 4:2 compressor circuit shown in FIG. 11B.

In some embodiments, when integer 8-bit multiplies are being computed, the sum output of 3:2 compressor 1720-1 may be selected by multiplexer 1735 to form part of 8-bit results 1723 (e.g. A1). When integer 16-bit multiplies are being computed, the sum output of 4:2 compressors 1730-1 may be selected by multiplexer 1745 to form part of 16-bit results 1733 (e.g. AB12). Further, when integer 32-bit multiplies are being computed, the sum output of 4:2 compressor 1740-1 may be selected by multiplexer 1755 to form part of 32-bit results 1748 (e.g. ABCD1234).

Multiplexer 1735 may select one of 8-bit results 1723 or 16-bit results 1733, which may be input to multiplexer 1745. Multiplexer 1745 may select one of 32-bit results 1748 or the input selected by multiplexer 1735. Further, multiplexer 1755 may select one of 64-bit results 1756 or the input selected by multiplexer 1745. The outputs of multiplexer 1755 may be combined with extra addition term 1757 by final full adder 1760-1. Multiplexers 1735, 1745, and 1755 may also receive carry outputs from other columns.

Sum output of full adder 1760-1 is input to 135 bit carry lookahead adder (CLA) for fixed point and integer operations 1085, while carry output is input to column 63 of CLA 1085. CLA 1085 also receives input from the final full adder for column 61 (not shown in FIG. 17). As discussed previously, appropriate break and propagate columns may be inserted in CLA 1085 based on the integer multiplies being computed.

Sum output of 4:2 compressor 1750-1 is input to 128-bit carry lookahead adder for floating point additions 1080. CLA 1080 may also receive an input from fifth level 4:2 compressor for column 61.

The operation of fourth level multiplexers (e.g. 1735), fifth level multiplexers (e.g. 1745) and multiplexers after the fifth level (e.g. 1755) in FIG. 17 are described further below in Tables 1-3, which indicate the input columns to the multiplexers for various operations and the output columns for those operations.

TABLE 1

| Fourth Level Multiplexing Column Inputs for Computation | | | | | | | | |
|---|---|---|---|---|---|---|---|---|
| 8-bits (level 2) | 71-56 | 63-48 | 55-40 | 47-32 | 39-24 | 31-16 | 23-8 | 15-0 |
| 16-bits (level 3) | 79-64 | 63-48 | 63-48 | 47-32 | 47-32 | 31-16 | 31-16 | 15-0 |
| 8-bit dot product (level 3) | 71-56 | 55-48* | 55-40 | 39-32* | 39-24 | 23-16* | 23-8 | 7-0* |

TABLE 1-continued

Fourth Level Multiplexing
Column Inputs for Computation

| Column Outputs (small) | 127-112 | 111-96 | 95-80 | 79-64 | 63-48 | 47-32 | 31-16 | 15-0 |
|---|---|---|---|---|---|---|---|---|

*indicates that 8 zeroes occur to the right of the specified bits

TABLE 2

Fifth Level Multiplexing
Column Inputs for Computation

| | | | | | | | | |
|---|---|---|---|---|---|---|---|---|
| Small (from level 4 multiplexer) | 127-112 | 111-96 | 95-80 | 79-64 | 63-48 | 47-32 | 31-16 | 15-0 |
| 32-bits (from level 4) | 95-80 | 79-64 | 63-48 | 47-32 | 63-48 | 47-32 | 31-16 | 15-0 |
| 16-bit dot product (from level 4) | 79-64 | 63-48 | 47-32 | 16 zeroes | 47-32 | 31-16 | 15-0 | 16 zeroes |
| Column Outputs (not double) | 127-112 | 111-96 | 95-80 | 79-64 | 63-48 | 47-32 | 31-16 | 15-0 |

TABLE 3

After Fifth Level Multiplexing
Column Inputs for Computation

| | | |
|---|---|---|
| Not double (from level 5) | 127-32 | 31-0 |
| 64-bits (from level 5) | 127-32 | 31-0 |
| 32-bit dot product (from level 5) | 95-0 | 32 zeroes |
| Column Outputs for Final Full Adder 1760 | 127-32 | 31-0 |

The multiplexers at each level may each have three inputs, including 2 pairs of inputs from different columns at the higher level.

Figure 18:
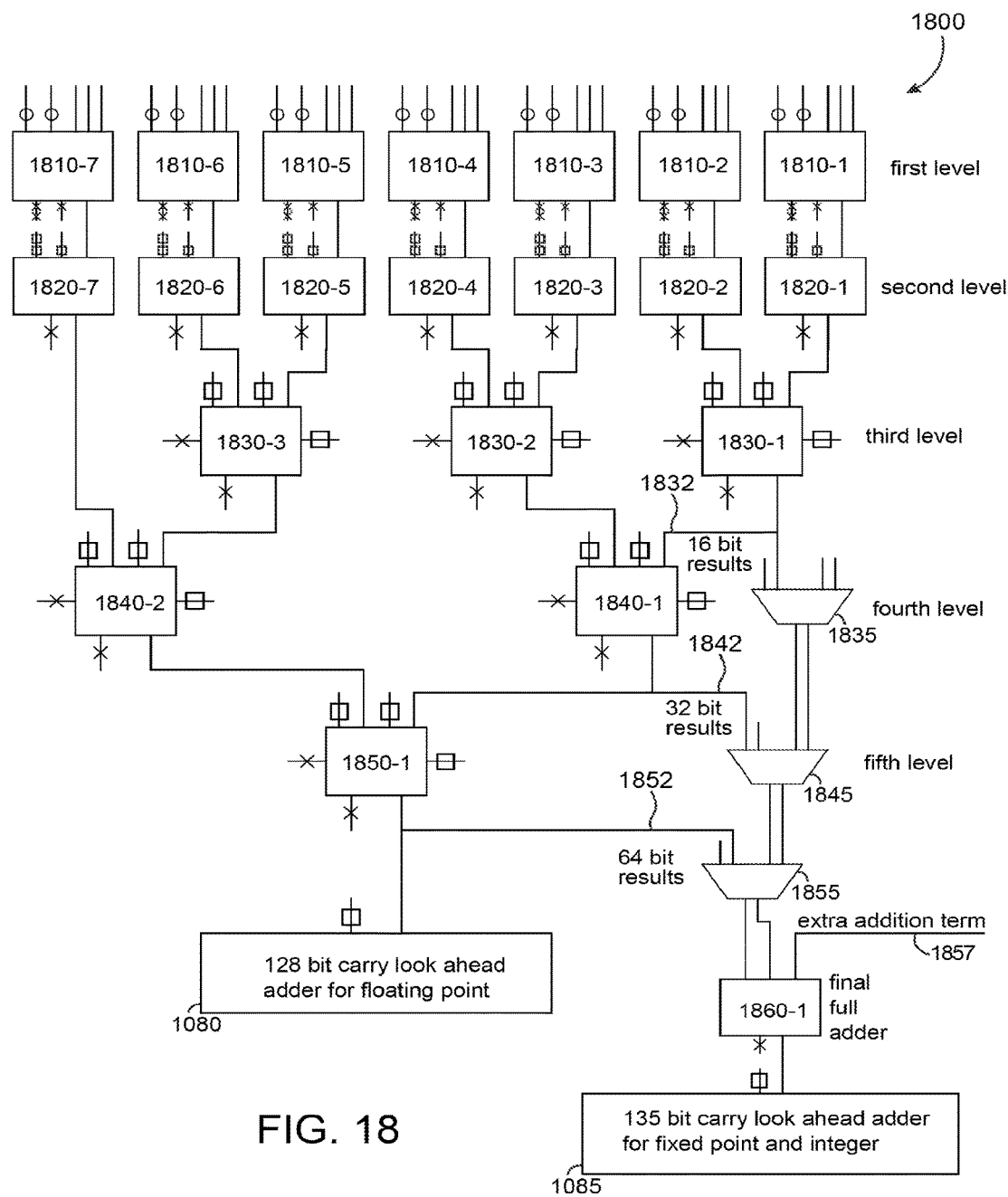

FIG. 18 shows exemplary circuit 1800 for computing the sum of bits in column 70 for partial product sets G1, F2, E3, D4, C5, B6, and A7 in FIG. 8. In FIG. 18 at a first level, 5:3 compressors 1810-1, 1810-2, 1810-3, 1810-4, 1810-5, 1810-6 and 1810-7 compress thirty-five modified Booth encoded input signals for cells G1, F2, E3, D4, C5, B6, and A7 to twenty-one output signals. In some embodiments, the 5:3 compressors may be implemented using circuits similar to the 5:3 compressor circuit shown in FIG. 10B. As indicated in FIG. 18, each 5:3 compressor receives three signals from column 70, while two of the input signals (shown with circles on the wires) arrive from column 71.

The one's outputs of 5:3 compressors 1810-1, 1810-2, 1810-3, 1810-4, 1810-5, 1810-6, and 1810-7 are input to input to 3:2 compressors 1820-1, 1820-2, 1820-3, 1820-4, 1820-5, 1820-6, and 1820-7, respectively, at the second level. In addition, 3:2 compressors 1820-1, 1820-2, 1820-3, 1820-4, 1820-5, 1820-6, and 1820-7 each receive inputs from the corresponding two's output of first level 5:3 compressors (not shown in FIG. 18) in column 69 and the corresponding four's output of first level 5:3 compressors (not shown in FIG. 18) in column 68. In some embodiments, the 3:2 compressors may be implemented using circuits similar to the 3:2 compressor circuit shown in FIG. 10D. Further, the two's outputs of first level compressors 1810-1, 1810-2, 1810-3, 1810-4, 1810-5, 1810-6, and 1810-7 may be input to second level 3:2 compressors for column 71, while the four's outputs of compressors 1810-1, 1810-2, 1810-3, 1810-4, 1810-5, 1810-6, and 1810-7 may be input to second level 3:2 compressors for column 72.

Carry outputs of 3:2 compressors 1820-1, 1820-2, 1820-3, 1820-4, 1820-5, 1820-6, and 1820-7 may be output to third level compressors in column 71 (not shown in FIG. 18). Further, the sum outputs of second level 3:2 compressor pairs (1820-1, 1820-2), (1820-3, 1820-4) and (1820-5, 1820-6) may be input to third level 4:2 compressors 1830-1, 1830-2, and 1830-3, respectively. Each of compressors 1830-1, 1830-2, and 1830-3 may also receive late input from a third level 4:2 compressor in column 69 (not shown in FIG. 18), as well as inputs from second level 3:2 compressors in column 69.

Early outputs of third level 4:2 compressors 1830-1, 1830-2, and 1830-3 may be input to third level 4:2 compressors in column 71, while carry outputs of 4:2 compressors 1830-1, 1830-2, and 1830-3 may be input to fourth level 4:2 compressor in column 71 (not shown in FIG. 18). Further, sum outputs of 4:2 compressors 1830-1 and 1830-2 may be input to fourth level 4:2 compressor 1840-1, which also receives late input from fourth level 4:2 compressors in column 69, and inputs from third level 4:2 compressors in column 69.

The sum output of 3:2 compressor 1820-7 and the sum output of 4:2 compressor 1830-3 may be input to 4:2 compressor 1840-2, which also receives late input from fourth level 4:2 compressors in column 69, and inputs from third level 4:2 compressors in column 69.

The sum output of 4:2 compressor 1840-2 may also be input to fifth level 4:2 compressor 1850-1, which also receives, as input, late input from a fifth level compressor for column 69 and inputs from fourth level 4:2 compressors in column 69. Further, the sum output of 4:2 compressor 1840-1 is also input to 4:2 compressor 1850-1. The early output of 4:2 compressor 1850-1 is input to a fifth level compressor for column 71. The carry output of 4:2 compressor 1850-1 is input to column 71 of CLA 1080. In some embodiments, the 4:2 compressors may be implemented using circuits similar to the 4:2 compressor circuit shown in FIG. 11B.

In some embodiments, when integer 16-bit multiplies are being computed, the sum output of 3:2 compressor 1830-1 may be selected by multiplexer 1835 to form part of 16-bit results 1832 (e.g. AB12). Further, when integer 32-bit multiplies are being computed, the sum output of 4:2 compressor 1840-1 may be selected by multiplexer 1855 to form part of 32-bit results 1442 (e.g. ABCD1234).

Multiplexer 1835 may select 16-bit results 1832, which may be input to multiplexer 1845. Multiplexer 1845 may select one of 32-bit results 1842 or the input selected by multiplexer 1835. Further, multiplexer 1855 may select one of 64-bit results 1852 or the input selected by multiplexer 1845. The outputs of multiplexer 1855 may be combined with extra addition term 1857 by final full adder 1860-1. Multiplexers 1835, 1845, and 1855 may also receive carry outputs from other columns.

Sum output of full adder 1860-1 is input to 135 bit carry lookahead adder (CLA) for fixed point and integer operations 1085, while carry output is input to column 71 of CLA 1085. CLA 1085 also receives input from the final full adder for column 71 (not shown in FIG. 18). As discussed previously, appropriate break and propagate columns may be inserted in CLA 1085 based on the integer of fixed point being computed.

Sum output of 4:2 compressor 1850-1 is input to 128-bit carry lookahead adder for floating point additions 1080. CLA 1080 may also receive an input from fifth level 4:2 compressor for column 69.

Figure 19:
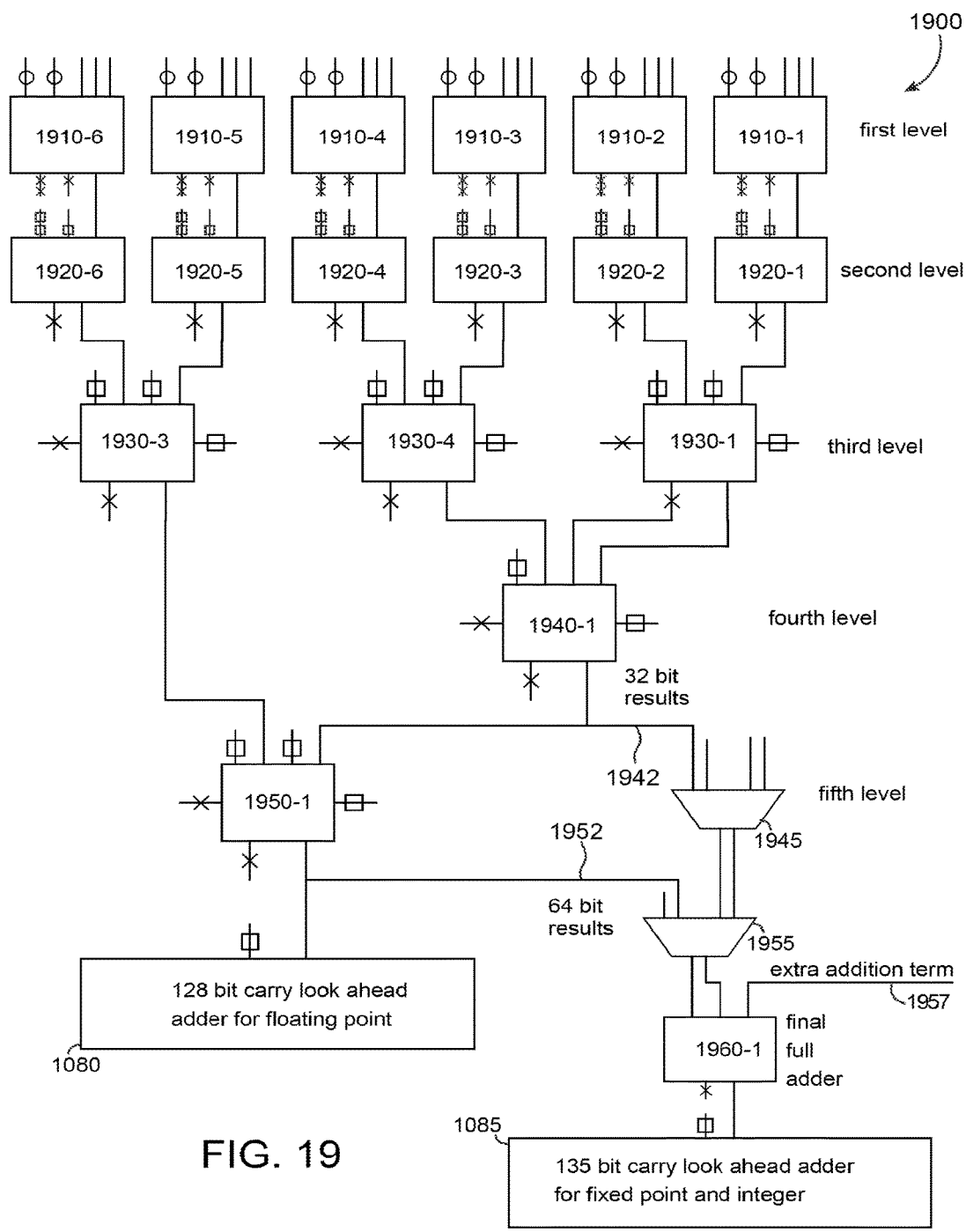

FIG. 19 shows exemplary circuit 1900 for computing the sum of bits in column 78 for partial product sets F1, E2, D3, C4, B5 and A6 in FIG. 8. In FIG. 19 at a first level, 5:3 compressors 1910-1, 1910-2, 1910-3, 1910-4, 1910-5, and 1910-6 compress thirty input signals for cells F1, E2, D3, C4, B5 and A6 to eighteen output signals. In some embodiments, the 5:3 compressors may be implemented using circuits similar to the 5:3 compressor circuit shown in FIG. 10B. As indicated in FIG. 19, each 5:3 compressor receives three signals from column 78, while two of the input signals (shown with circles on the wires) arrive from column 79.

The one's outputs of 5:3 compressors 1910-1, 1910-2, 1910-3, 1910-4, 1910-5, and 1910-6 are input to input to 3:2 compressors 1920-1, 1920-2, 1920-3, 1920-4, 1920-5, and 1920-6, respectively, at the second level. In addition, 3:2 compressors 1920-1, 1920-2, 1920-3, 1920-4, 1920-5, and 1920-6 each receive inputs from the corresponding two's output of first level 5:3 compressors (not shown in FIG. 19) in column 77 and the corresponding four's output of first level 5:3 compressors (not shown in FIG. 19) in column 76. In some embodiments, the 3:2 compressors may be implemented using circuits similar to the 3:2 compressor circuit shown in FIG. 10D. Further, the two's outputs of first level compressors 1910-1, 1910-2, 1910-3, 1910-4, 1910-5, and 1910-6 may be input to second level 3:2 compressors for column 79, while the four's outputs of compressors 1910-1, 1910-2, 1910-3, 1910-4, 1910-5, and 1910-6 may be input to second level 3:2 compressors for column 80.

Carry outputs of second level 3:2 compressors 1920-1, 1920-2, 1920-3, 1920-4, 1920-5, and 1920-6 may be output to third level compressors in column 79 (not shown in FIG. 19). Further, the sum outputs of second level 3:2 compressor pairs (1920-1, 1920-2), (1920-3, 1920-4) and (1920-5, 1920-6) may be input to third level 4:2 compressors 1930-1, 1930-2, and 1930-3, respectively. Each of compressors 1930-1, 1930-2, and 1930-3 may also receive late input from a third level 4:2 compressor in column 77 (not shown in FIG. 19), as well as inputs from second level 3:2 compressors in column 77.

Early outputs of third level 4:2 compressors 1930-1, 1930-2, and 1930-3 may be input to third level 4:2 compressors in column 79, while carry outputs of 4:2 compressors 1930-1, 1930-2, and 1930-3 may be input to fourth level 4:2 compressor in column 79 (not shown in FIG. 19).

Further, sum outputs of 4:2 compressors 1930-2 and 1930-3 may be input to fourth level compressor 4:2 1940-1, which also receives late input from fourth level 4:2 compressors in column 77, and inputs from third level 4:2 compressors in column 77.

The early output of fourth level 4:2 compressor 1940-1 may be input to fourth level compressor for column 79, while carry output of 4:2 compressor 1940-1 may be input to a fifth level 4:2 compressor for column 79. The sum output of 4:2 compressor 1940-1 may be input to fifth level 4:2 compressor 1950-1, which also receives, as input, the sum output of third level 4:2 compressor 1930-3. In addition, 4:2 compressor 1950-1 receives late input from a fifth level compressor for column 77 and inputs from fourth level 4:2 compressors in column 77.

The early output of 4:2 compressor 1950-1 is input to a fifth level compressor for column 79. The carry output of 4:2 compressor 1950-1 is input to column 79 of CLA 1080. In some embodiments, the 4:2 compressors may be implemented using circuits similar to the 4:2 compressor circuit shown in FIG. 11B.

In some embodiments, when integer 32-bit multiplies are being computed, the sum output of 4:2 compressor 1940-1 may be selected by multiplexer 1945 to form part of 32-bit results 1942 (e.g. ABCD1234 as shown in FIG. 7). Further, multiplexer 1955 may select one of 64-bit results 1952 or the input selected by multiplexer 1945. The outputs of multiplexer 1955 may be combined with extra addition term 1957 by final full adder 1960-1. Multiplexers 1935, 1945, and 1955 may also receive carry outputs from other columns Sum output of full adder 1960-1 is input to 135 bit carry lookahead adder (CLA) for fixed point and integer operations 1085, while carry output is input to column 79 of CLA 1085. CLA 1085 also receives input from the final full adder for column 77 (not shown in FIG. 19). As discussed previously, appropriate break and propagate columns may be inserted in CLA 1085 based on the integer or fixed point multiplies being computed.

Sum output of 4:2 compressor 1950-1 is input to 128-bit carry lookahead adder for floating point additions 1080. CLA 1080 may also receive an input from fifth level 4:2 compressor for column 77.

Figure 20:
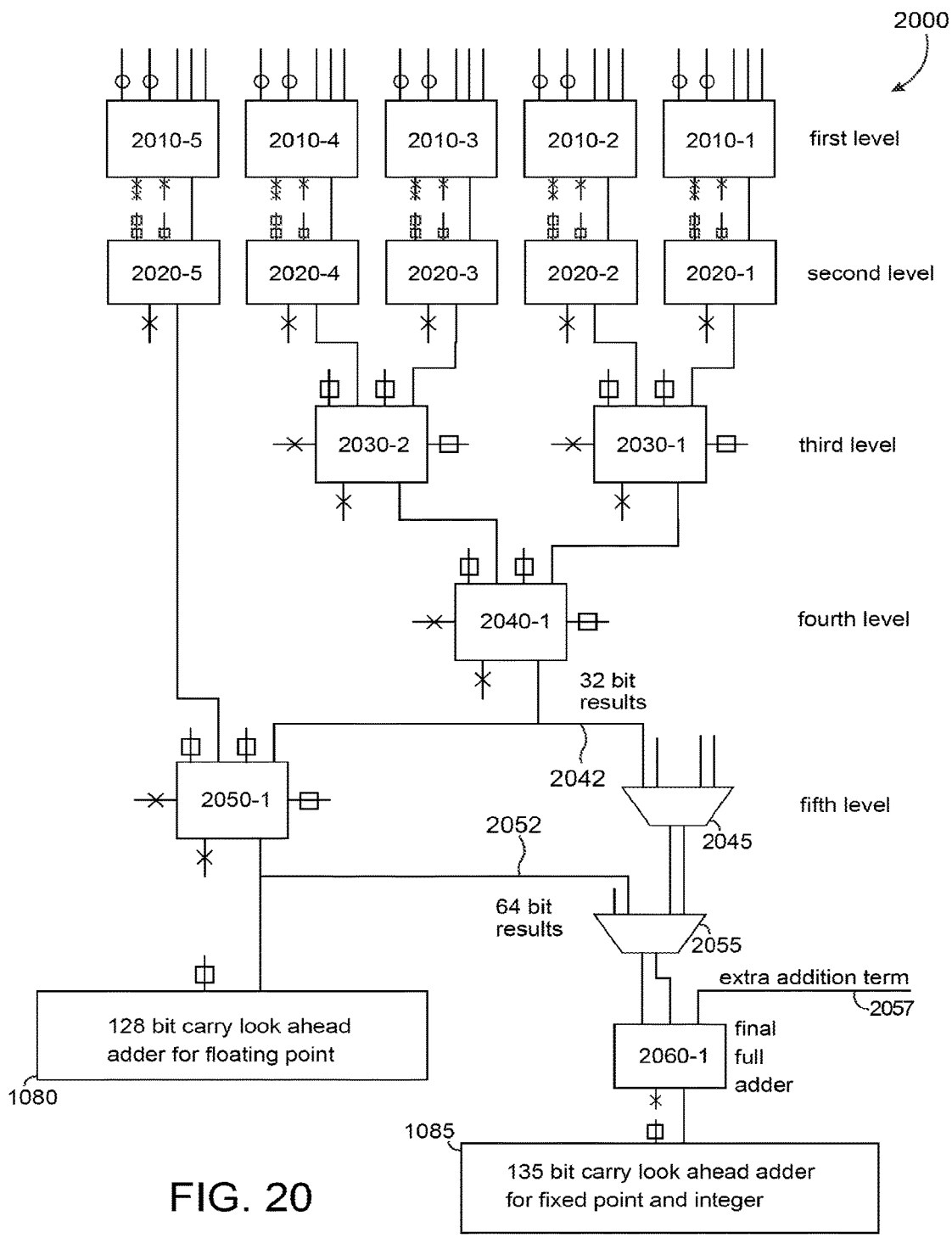

FIG. 20 shows exemplary circuit 2000 for computing the sum of bits in column 86 for partial product sets E1, D2, C3, B4 and A5 in FIG. 8. In FIG. 20, at a first level, 5:3 compressors 2010-1, 2010-2, 2010-3, 2010-4, and 2010-5 compress twenty-five modified Booth encoded input signals for cells E1, D2, C3, B4 and A5 to fifteen output signals. In some embodiments, the 5:3 compressors may be implemented using circuits similar to the 5:3 compressor circuit shown in FIG. 10B. As indicated in FIG. 20, each 5:3 compressor receives three signals from column 86, while two of the input signals (shown with circles on the wires) arrive from column 87.

The one's outputs of 5:3 compressors 2010-1, 2010-2, 2010-3, 2010-4, and 2010-5 are input to input to 3:2 compressors 2020-1, 2020-2, 2020-3, 2020-4 and 2020-5, respectively, at the second level. In addition, 3:2 compressors 2020-1, 2020-2, 2020-3, 2020-4, and 2020-5 each receive inputs from the corresponding two's output of first level 5:3 compressors (not shown in FIG. 20) in column 85 and the corresponding four's output of first level 5:3 compressors (not shown in FIG. 20) in column 84. In some embodiments, the 3:2 compressors may be implemented using circuits similar to the 3:2 compressor circuit shown in FIG. 10D. Further, the two's outputs of first level compressors 2010-1, 2010-2, 2010-3, 2010-4, and 2010-5 may be input to second level 3:2 compressors for column 87, while the four's outputs of compressors 2010-1, 2010-2, 2010-3, 2010-4, and 2010-5 may be input to second level 3:2 compressors for column 88.

Carry outputs of 3:2 compressors 2020-1, 2020-2, 2020-3, 2020-4, and 2020-5 may be output to third level compressors in column 87 (not shown in FIG. 20). Further, the sum output of second level 3:2 compressors 2020-1 and 2020-2 may be input to third level 4:2 compressor 2030-1, which may also receive late input from a third level 4:2 compressor in column 85 (not shown in FIG. 20), as well as inputs from second level 3:2 compressors in column 85. Similarly, the sum output of second level 3:2 compressors 2020-3 and 2020-4 may be input to third level 4:2 compressor 2030-2, which may also receive late input from a third level compressor in column 85 (not shown in FIG. 20), as well as inputs from second level 3:2 compressors in column 85.

Early outputs of third level 4:2 compressors 2030-1 and 2030-2 may be input to third level 4:2 compressors in column 87, while carry outputs of 4:2 compressors 2030-1 and 2030-2 may be input to fourth level 4:2 compressor in column 87 (not shown in FIG. 20). Further, sum outputs of 4:2 compressors 2030-1 and 2030-2 may be input to fourth level compressor 2040-1, which also receives late input from fourth level 4:2 compressor in column 85 and from third level 4:2 compressors in column 85.

The early output of fourth level 4:2 compressor 2040-1 may be input to fourth level compressor for column 87, while carry output of 4:2 compressor 2040-1 may be input to fifth level 4:2 compressor in column 87. Sum output of fourth level 4:2 compressor 2040-1, which may form part of 32-bit results 2042, is input to fifth level multiplexer 2050-1, which also receives late input from fifth level multiplexer in column 85, and input from fourth level multiplexers in column 85. In some embodiments, the 4:2 compressors may be implemented using circuits similar to the 4:2 compressor circuit shown in FIG. 11B.

In some embodiments, when 32-bit multiplies are being computed, the sum output of 4:2 compressor, which may form part of 32-bit results 2042 (e.g. ABCD1234 as shown in FIG. 7) may be selected by multiplexer 2045. Further, multiplexer 2055 may select one of 64-bit results 2052 or the input selected by multiplexer 2045. The outputs of multiplexer 2055 may be combined with extra addition term 2057 by final full adder 2060-1. Multiplexers 2045 and 2055 may also receive carry outputs from other columns.

Sum output of full adder 2060-1 is input to 135 bit carry lookahead adder (CLA) for fixed point and integer operations 1085, while carry output is input to column 87 of CLA 1085. CLA 1085 also receives input from the final full adder for column 85 (not shown in FIG. 20). As discussed previously, appropriate break and propagate columns may be inserted in CLA 1085 based on the integer or fixed point multiplies being computed.

Sum output of 4:2 compressor 2050-1 is input to 128-bit carry lookahead adder for floating point additions 1080. CLA 1080 may also receive an input from fifth level 4:2 compressor for column 85.

Figure 21:
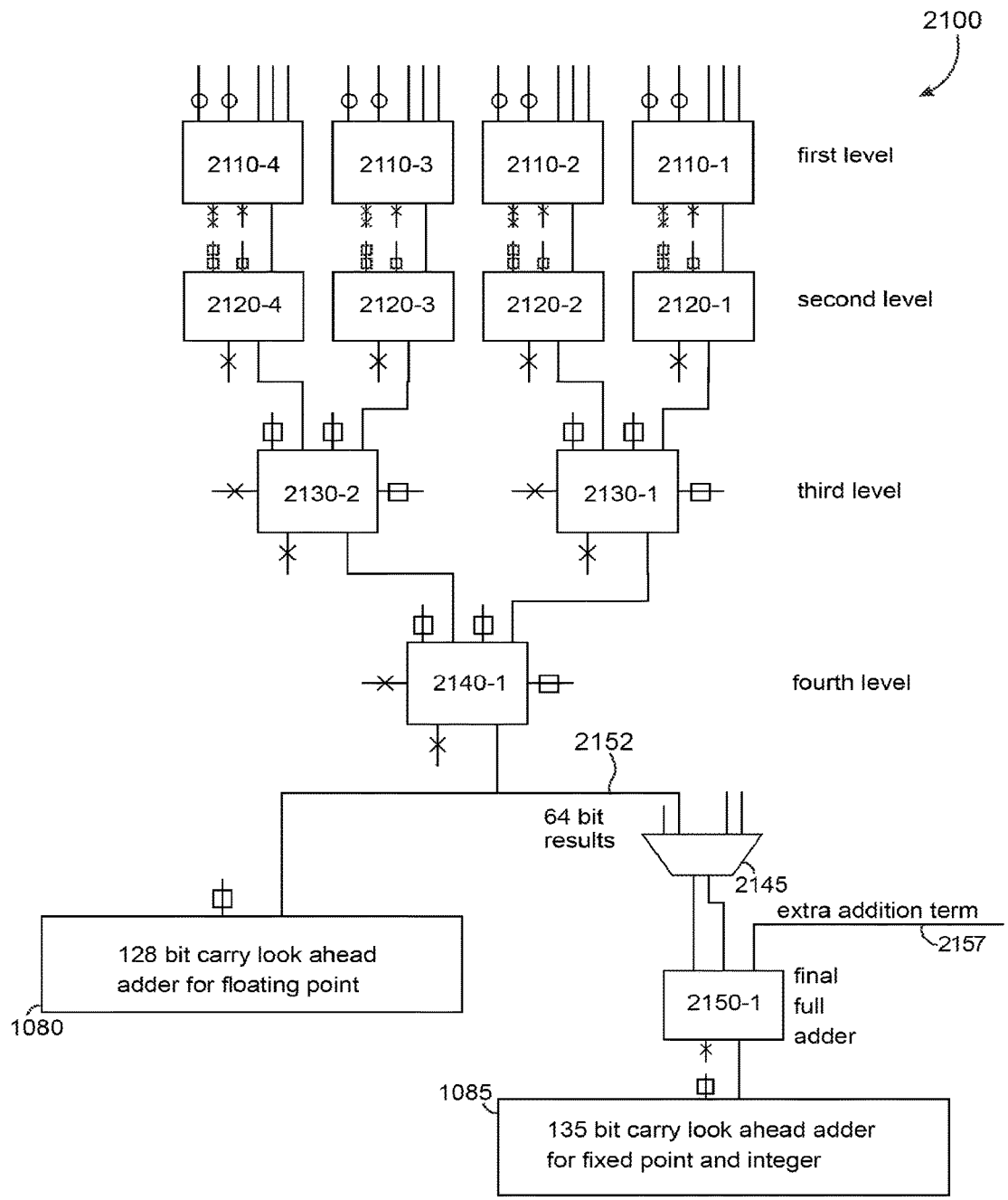

FIG. 21 shows exemplary circuit 2100 for computing the sum of bits in column 94 for partial product sets D1, C2, B3, and A4 in FIG. 8. In FIG. 21, at a first level, 5:3 compressors 2110-1, 2110-2, 2110-3 and 2110-4 compress twenty modified Booth encoded input signals for cells D1, C2, B3, and A4 to twelve output signals. In some embodiments, the 5:3 compressors may be implemented using circuits similar to the 5:3 compressor circuit shown in FIG. 10B. As indicated in FIG. 21, each 5:3 compressor receives three signals from column 94, while two of the input signals (shown with circles on the wires) arrive from column 95.

The one's outputs of 5:3 compressors 2110-1, 2110-2, 2110-3, and 2110-4 are input to input to 3:2 compressors 2120-1, 2120-2, 2120-3, and 2120-4, respectively, at the second level. In addition, 3:2 compressors 2120-1, 2120-2, 2120-3 and 2120-4 each receive inputs from the corresponding two's output of first level 5:3 compressors (not shown in FIG. 21) in column 93 and the corresponding four's output of first level 5:3 compressors (not shown in FIG. 21) in column 92. In some embodiments, the 3:2 compressors may be implemented using circuits similar to the 3:2 compressor circuit shown in FIG. 10D. Further, the two outputs of first level compressors 2110-1, 2110-2, 2110-3, and 2110-4 may be input to second level 3:2 compressors for column 95, while the four's outputs of compressors 2110-1, 2110-2, 2110-3, and 2110-4 may be input to second level 3:2 compressors for column 96.

Carry outputs of 3:2 compressors 2120-1, 2120-2, 2120-3 and 2120-4 may be output to third level compressors in column 95 (not shown in FIG. 21). Further, the sum output of second level 3:2 compressors 2120-1 and 2120-2 may be input to third level 4:2 compressor 2130-1, which may also receive late input from a third level compressor in column 93 (not shown in FIG. 21), as well as inputs from second level compressors in column 93. Similarly, the sum output of second level 3:2 compressors 2120-3 and 2120-4 may be input to third level 4:2 compressor 2130-2, which may also receive late input from a third level compressor in column 93 (not shown in FIG. 21), as well as inputs from second level compressors in column 93.

Early outputs of third level 4:2 compressors 2130-1 and 2130-2 may be input to third level 4:2 compressors in column 95, while carry outputs of 4:2 compressors 2130-1 and 2130-2 may be input to fourth level 4:2 compressor in column 95 (not shown in FIG. 21). Further, sum outputs of 4:2 compressors 2130-1 and 2130-2 may be input to fourth level 4:2 compressor 2140-1, which also receives late input from a fourth level 4:2 compressor in column 93, and inputs from third level 4:2 compressors in column 93.

The early output of fourth level 4:2 compressor 2140-1 may be input to fourth level compressor for column 95, while carry output of 4:2 compressor 2140-1 may be input to column 95 of CLA 1080. In some embodiments, the 4:2 compressors may be implemented using circuits similar to the exemplary 4:2 compressor circuit shown in FIG. 11B.

Multiplexer 2145 may select sum output of 4:2 compressor 2140-1, which may form part of 64-bit results 2152. The outputs of multiplexer 2145 may be combined with extra addition term 2157 by final full adder 2150-1. Multiplexer 2145 may also receive carry outputs from other columns.

Sum output of full adder 2150-1 is input to 135 bit carry lookahead adder (CLA) for fixed point and integer operations 1085, while carry output is input to column 95 of CLA 1085. CLA 1085 also receives, as input, the carry output from the final full adder for column 93 (not shown in FIG. 21).

Sum output of 4:2 compressor 2140-1 is input to 128-bit carry lookahead adder for floating point additions 1080. CLA 1080 may also receive, as input, carry output from fifth level 4:2 compressor for column 93.

Figure 22:
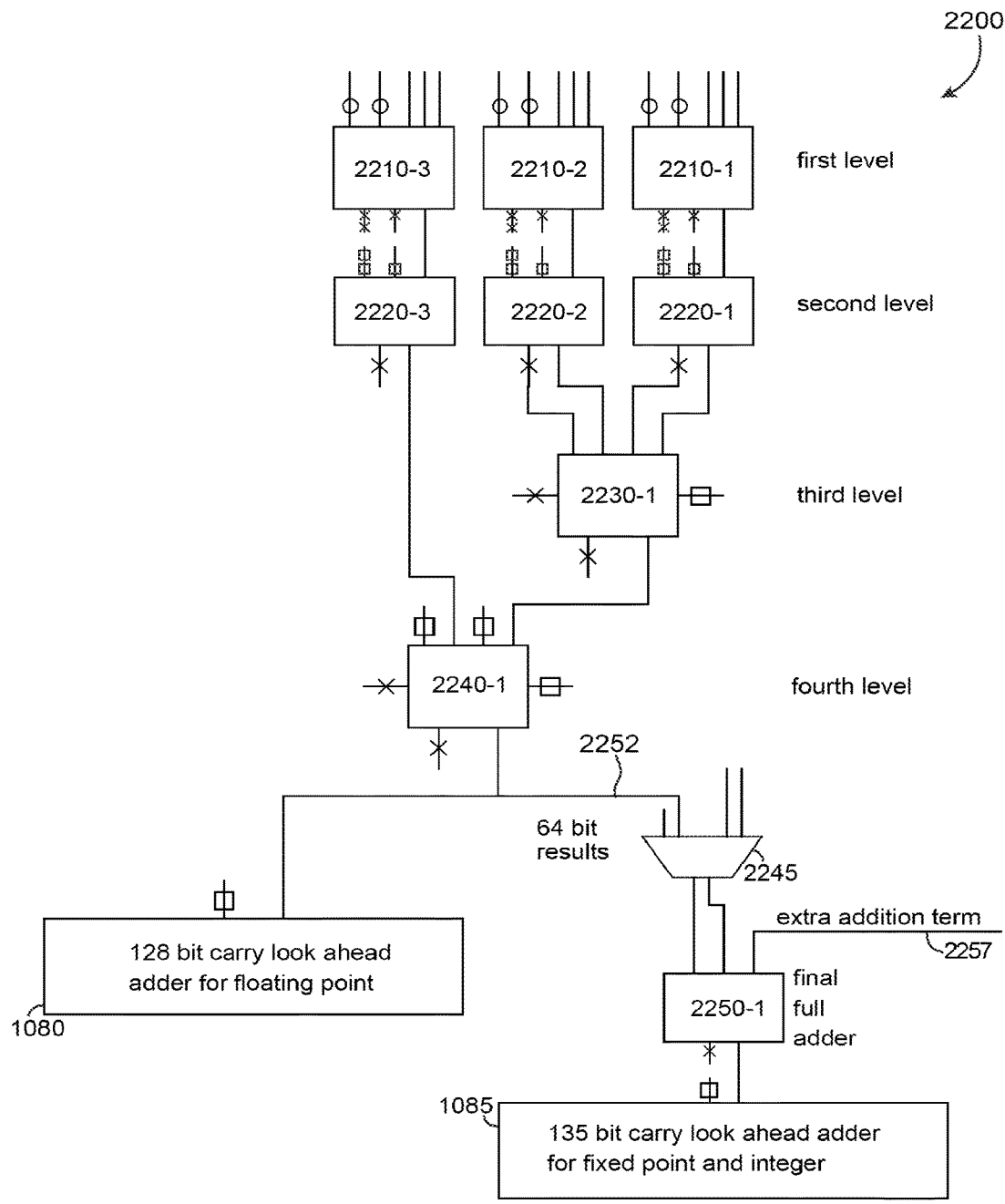

FIG. 22 shows exemplary circuit 2200 for computing the sum of bits in column 102 for partial product sets C1, B2, and A3, and A4 in FIG. 8. In FIG. 22, at a first level, 5:3 compressors 2210-1, 2210-2, and 2210-3 compress fifteen modified Booth encoded input signals for cells C1, B2, and A3 to nine output signals. In some embodiments, the 5:3 compressors may be implemented using circuits similar to the 5:3 compressor circuit shown in FIG. 10B. As indicated in FIG. 22, each 5:3 compressor receives three signals from column 102, while two of the input signals (shown with circles on the wires) arrive from column 103.

The one's outputs of 5:3 compressors 2210-1, 2210-2, and 2210-3 are input to input to 3:2 compressors 2220-1, 2220-2, and 2220-3, respectively, at the second level. In addition, 3:2 compressors 2220-1, 2220-2, and 2220-3 each receive inputs from the corresponding two's output of first level 5:3 compressors (not shown in FIG. 22) in column 101 and the corresponding four's output of first level 5:3 compressors (not shown in FIG. 22) in column 100. In some embodiments, the 3:2 compressors may be implemented using circuits similar to the 3:2 compressor circuit shown in FIG. 10D. Further, the two outputs of first level compressors 2210-1, 2210-2, and 2210-3 may be input to second level 3:2 compressors for column 103, while the four's outputs of compressors 2210-1, 2210-2, and 2210-3 may be input to second level 3:2 compressors for column 104.

Carry outputs of 3:2 compressors 2220-1, 2220-2 and 2220-3 may be output to third level compressors in column 103 (not shown in FIG. 22). Further, the sum output of second level 3:2 compressors 2220-1 and 2220-2 may be input to third level 4:2 compressor 2230-1, which may also receive late input from a third level compressor in column 101 (not shown in FIG. 22), as well as inputs from second level compressors in column 101.

Early outputs of third level 4:2 compressor 2230-1 may be input to third level 4:2 compressors in column 103, while carry outputs of 4:2 compressor 2230-1 may be input to fourth level 4:2 compressor in column 103 (not shown in FIG. 22). Further, sum outputs of 4:2 compressors 2230-1 may be input to fourth level 4:2 compressor 2240-1, which also receives late input from a fourth level 4:2 compressor in column 101, and inputs from third level 4:2 compressors in column 101. Further, the sum output of second level 3:2 compressors 2220-3 may also be input to fourth level 4:2 compressor 2240-1.

The early output of fourth level 4:2 compressor 2240-1 may be input to fourth level compressor for column 103, while carry output of 4:2 compressor 2240-1 may be input to column 103 of CLA 1080. In some embodiments, the 4:2 compressors may be implemented using circuits similar to the exemplary 4:2 compressor circuit shown in FIG. 11B.

Multiplexer 2245 may select sum output of 4:2 compressor 2140-1, which may form part of 64-bit results 2252. The outputs of multiplexer 2145 may be combined with extra addition term 2257 by final full adder 2250-1. Multiplexer 2245 may also receive carry outputs from other columns.

Sum output of full adder 2250-1 is input to 135 bit carry lookahead adder (CLA) for fixed point and integer operations 1085, while carry output is input to column 103 of CLA 1085. CLA 1085 also receives, as input, the carry output from the final full adder for column 101 (not shown in FIG. 22).

Sum output of 4:2 compressor 2240-1 is input to 128-bit carry lookahead adder for floating point additions 1080. CLA 1080 may also receive, as input, carry output from fifth level 4:2 compressor for column 101.

Figure 23:
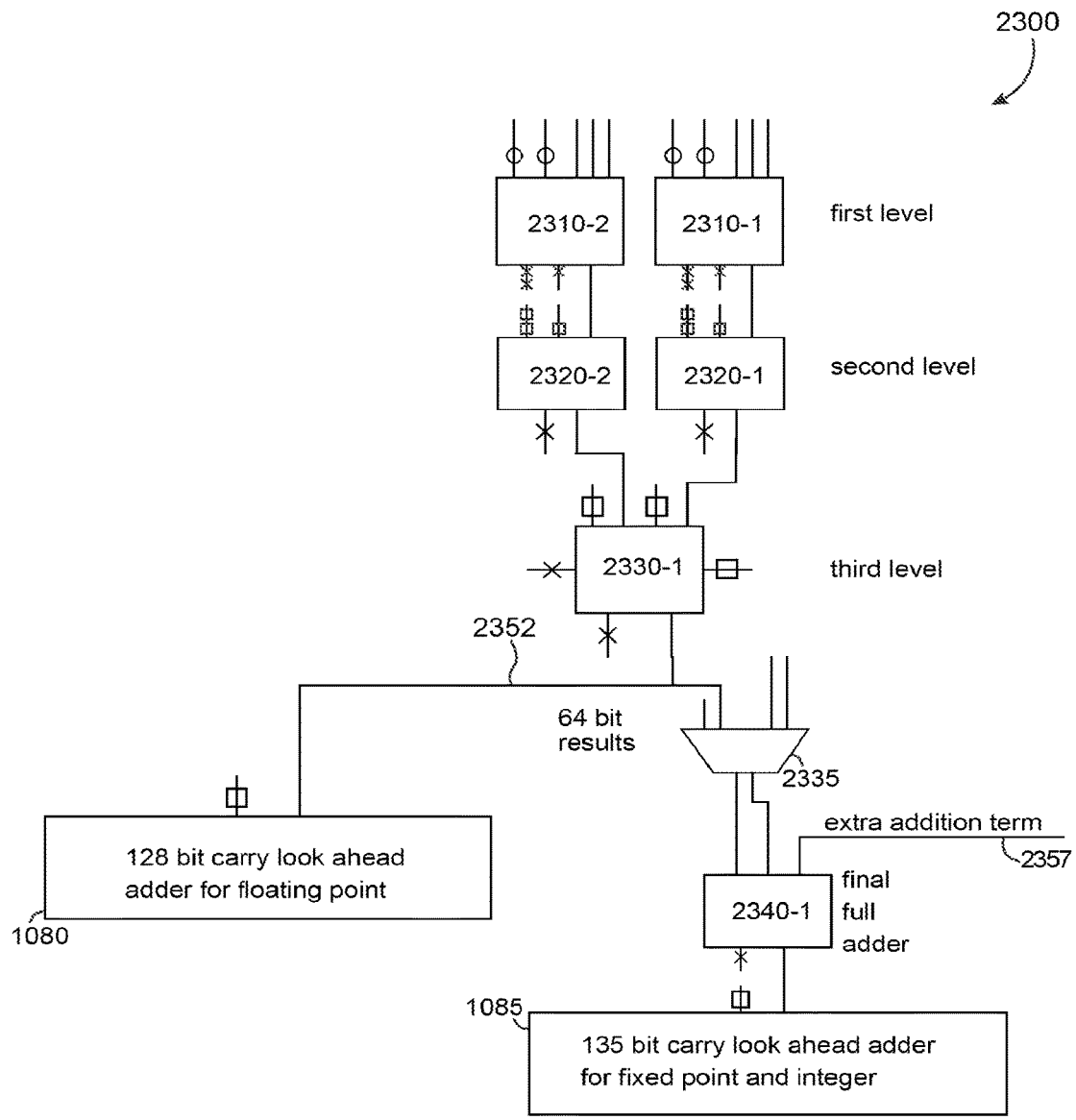

FIG. 23 shows exemplary circuit 2300 for computing the sum of bits in column 110 for partial product sets Bland A2 in FIG. 8. In FIG. 23, at a first level, 5:3 compressors 2310-1 and 2310-2 compress ten modified Booth encoded input signals for cells B1 and A2 to six output signals. In some embodiments, the 5:3 compressors may be implemented using circuits similar to the 5:3 compressor circuit shown in FIG. 10B. As indicated in FIG. 23, each first level 5:3 compressor receives three signals from column 110, while two of the input signals (shown with circles on the wires) arrive from column 111.

The one's outputs of 5:3 compressors 2310-1 and 2310-2 are input to input to 3:2 compressors 2320-1 and 2320-2, respectively, at the second level. In addition, 3:2 compressors 2320-1 and 2320-2 each receive inputs from the corresponding two's output of first level 5:3 compressors (not shown in FIG. 23) in column 109 and the corresponding four's output of first level 5:3 compressors (not shown in FIG. 23) in column 108. In some embodiments, the 3:2 compressors may be implemented using circuits similar to the 3:2 compressor circuit shown in FIG. 10D. Further, the two outputs of first level compressors 2310-1 and 2310-2 may be input to second level 3:2 compressors for column 111, while the four's outputs of compressors 2310-1 and 2310-2 may be input to second level 3:2 compressors for column 112.

Carry outputs of 3:2 compressors 2320-1 and 2320-2 may be output to third level compressors in column 111 (not shown in FIG. 23). Further, the sum output of second level 3:2 compressors 2320-1 and 2320-2 may be input to third level 4:2 compressor 2330-1, which may also receive late input from a third level compressor in column 109 (not shown in FIG. 23), as well as inputs from second level compressors in column 109.

Early outputs of third level 4:2 compressor 2330-1 may be input to third level 4:2 compressors in column 111, while carry outputs of 4:2 compressor 2330-1 may be input to column 111 of CLA 1080. CLA 1080 may also receive, as input, carry output from fifth level 4:2 compressor for column 109.

Multiplexer 2335 may select sum output of 4:2 compressor 2330-1, which may form part of 64-bit results 2352. The outputs of multiplexer 2335 may be combined with extra addition term 2357 by final full adder 2340-1. Multiplexers 2335 may also receive carry outputs from other columns.

Sum output of full adder 2340-1 is input to 135 bit carry lookahead adder (CLA) for fixed point and integer operations 1085, while carry output is input to column 111 of CLA 1085. CLA 1085 also receives, as input, the carry output from the final full adder for column 109 (not shown in FIG. 23).

Figure 24:
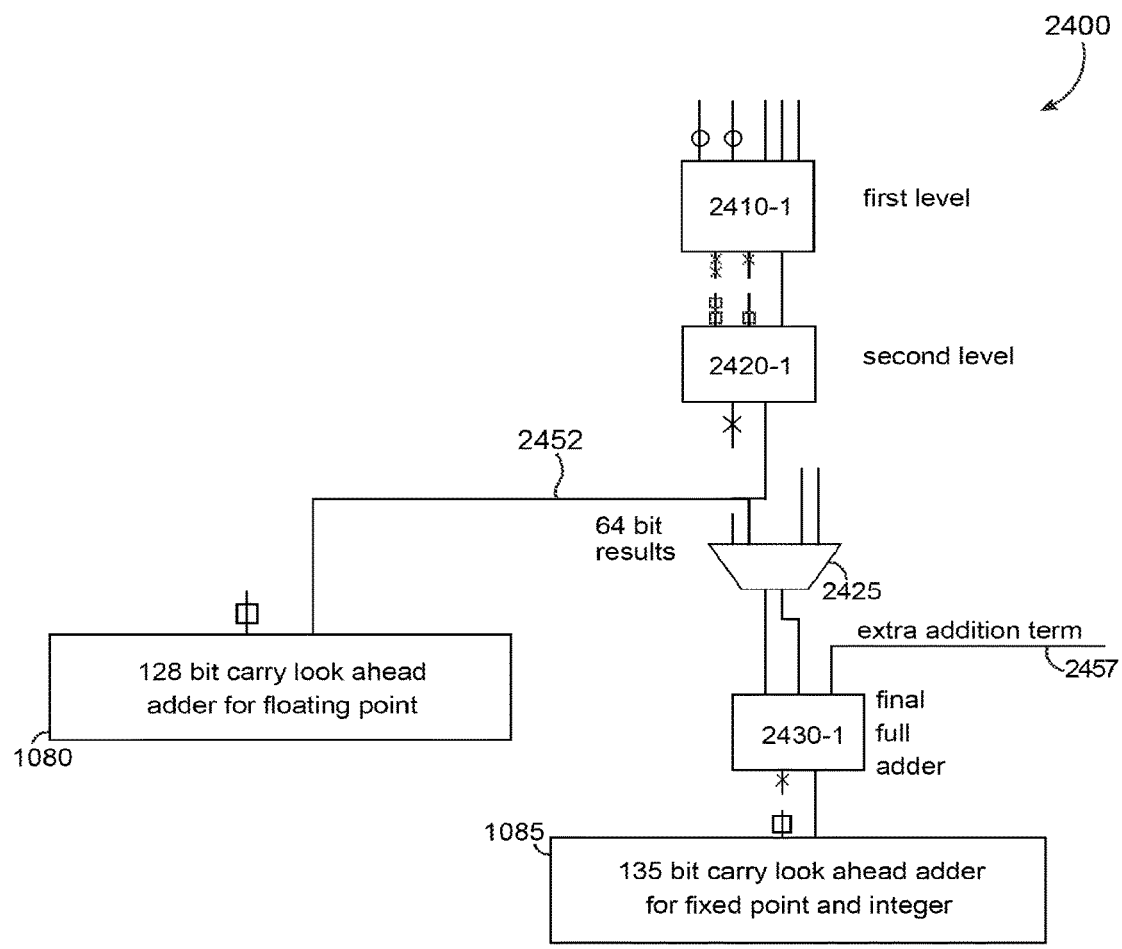

FIG. 24 shows exemplary circuit 2400 for computing the sum of bits in column 118 for partial product set A1 in FIG. 8. In FIG. 24, at a first level, 5:3 compressors 2410-1 compresses five modified Booth encoded input signals for cells A1 to three output signals. In some embodiments, the 5:3 compressors may be implemented using circuits similar to the 5:3 compressor circuit shown in FIG. 10B. As indicated in FIG. 24, first level 5:3 compressor 2410-1 receives three signals from column 118, while two of the input signals (shown with circles on the wires) arrive from column 119.

The one's outputs of 5:3 compressor 2410-1 is input to input to 3:2 compressors 2420-1 at the second level. In addition, 3:2 compressor 2420-1 receives inputs from the corresponding two's output of first level 5:3 compressor (not shown in FIG. 24) in column 117 and the corresponding four's output of first level 5:3 compressor (not shown in FIG. 24) in column 116. In some embodiments, the 3:2 compressors may be implemented using circuits similar to the 3:2 compressor circuit shown in FIG. 10D. Further, the two output of first level compressor 2410-1 may be input to second level 3:2 compressor for column 119, while the four's output of compressor 2410-may be input to second level 3:2 compressors for column 120.

Carry output of 3:2 compressor 2420-1 may be input to column 119 of CLA 1080. CLA 1080 may also receive, as input, carry output from second level 4:2 compressor for column 117. Sum output of 3:2 compressor 2420-1 may be input column 118 of CLA 1080.

Multiplexer 2425 may select sum output of 4:2 compressor 2420-1, which may form part of 64-bit results 2452. The outputs of multiplexer 2425 may be combined with extra addition term 2457 by final full adder 2430-1. Multiplexer 2425 may also receive carry outputs from other columns Sum output of full adder 2430-1 is input to 135 bit carry lookahead adder (CLA) for fixed point and integer operations 1085, while carry output is input to column 119 of CLA 1085. CLA 1085 also receives, as input, the carry output from the final full adder for column 117 (not shown in FIG. 24).

Figure 25:
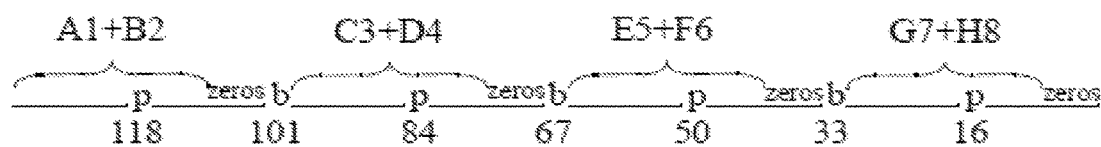
FIG. 25 shows the placement of additional columns to break or propagate carries for the sum of two 8 by 8 integer multiplies.

FIG. 25 shows the placement of break and propagate columns for the sum of two 8 by 8 integer multiplies. The four pairs of partial products to be added are shown as A1+B2, C3+D4, E5+F6 and G7+H8 in FIG. 25. As shown in FIG. 25, breaks occur at columns 33, 67, and 101, while propagate columns occur at bit positions 16, 50 and 118. The rightmost 8-bits for each computation are zeroes. The configuration of multiplexers is similar to that used for 16 by 16-bit multiplication but offset by 8-bits.

Figure 26:
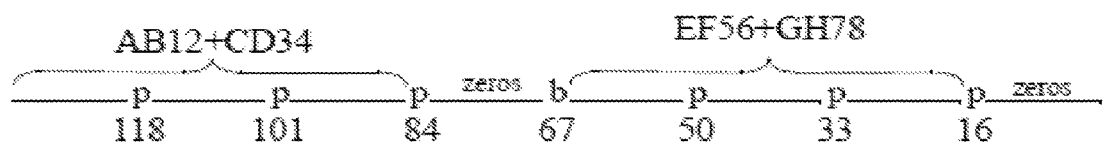
FIG. 26 shows the placement of additional columns to break or propagate carries for the sum of two 16 by 16 integer multiplies.

FIG. 26 shows the placement of break and propagate columns for the sum of two 16 by 16 integer multiplies. The two pairs of partial products to be added are shown as AB12+CD34, and DE56+GH78 in FIG. 26. As shown in FIG. 26, a break occurs at column 67 to prevent carry propagation between the first (AB12+CD34) and second (DE56+GH78) pair of partial products, while propagate columns occur at bit positions 16, 33, 50, 84, 101 and 118. The rightmost 16-bits for each computation are zeroes. The configuration of multiplexers is similar to that used for 32 by 32-bit multiplication but offset by 16-bits.

Figure 27:
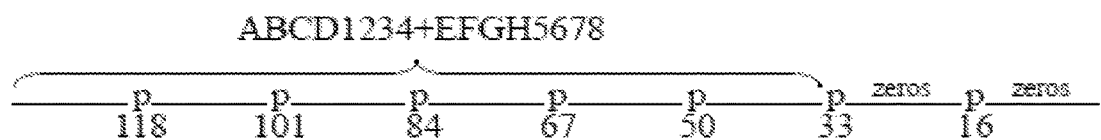
FIG. 27 shows the placement of additional columns to propagate carries for the sum of two 32 by 32 integer multiplies.

FIG. 27 shows the placement of break and propagate columns for the sum of two 32 by 32 integer multiplies. The pair of partial products to be added is shown as ABCD1234+DEFG5678 in FIG. 27. As shown in FIG. 27, there are no break columns, and propagate columns occur at bit positions 16, 33, 50, 67, 84, 101 and 118. The rightmost 32-bits for each computation are zeroes. The configuration of multiplexers is similar to that used for 64 by 64-bit multiplication but offset by 32-bits.

In some implementations, the term "module" may indicate circuitry that implements a function or functions attributed to that module. The term "circuitry" does not imply a single electrically connected set of elements or circuits, or that circuitry for implementing a particular function must be specific or assigned solely to performing that function. For example, circuitry may be fixed function, configurable, or programmable. In general, circuitry implementing a functional unit may be configurable, or may be more configurable than specifically assigned circuitry. For example, an Arithmetic Logic Unit (ALU) of a processor may use the same portion of circuitry in a variety of ways when performing different arithmetic or logic operations. As such, that portion of circuitry is effectively circuitry, or part of circuitry, for each different operation, when configured to perform or otherwise interconnected to perform each of the different operations. Such configuration may come from or be based on instructions, microcode, or state data, for example. For the various modules disclosed herein, circuitry implementing process(es) or function(s) disclosed with respect to those modules provides a means for performing such process(es) or function(s).

Different approaches to design of circuitry exist, for example, circuitry may be synchronous or asynchronous with respect to a clock. Circuitry may be designed to be static or be dynamic. In general, different circuit design approaches may be used to implement different functional units or parts thereof. Absent some context-specific basis, "circuitry" encompasses all such design approaches. Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes or technologies may be used in circuitry implementing a given functional module, such as optical, nanotubes, micro-electrical mechanical elements, quantum switches or memory storage, magnetoresistive logic elements, and so on. Although a choice of technology used to construct circuitry or functional units according to the technology may change over time, this choice is an implementation decision to be made in accordance with a then-current state of technology Further, although the description includes illustrative examples in connection with specific embodiments, the disclosure is not limited thereto. Various adaptations and modifications may be made without departing from the scope. Therefore, the spirit and scope of the appended claims should not be limited to the foregoing description.

What is claimed is:

1. A processor comprising a multiplication unit, the multiplication unit comprising:
   a modified booth encoder configured to:
      receive one or more multipliers and one or more multiplicands;
      for each of the one or more multiplicands, partition the bits in the multiplicand into overlapping groups of bits; and
      generate a plurality of partial products by determining a plurality of partial product rows, wherein each of the partial product rows corresponds to a partial product as a multiplication of one of the one or more multipliers with one of the groups of bits;
   a carry save adder comprising a plurality of first-level 5:3 compressors and a plurality of second-level 3:2 compressors, the carry save adder being configured to:
      receive the plurality of partial products generated by the modified booth encoder; and
      use the received partial products to obtain a first partial result and a second partial result; and
   an adder configured to:
      receive the first partial result and the second partial result;
      use the received first and second partial results to determine one or more output values; and
      output the one or more output values.

2. The processor of claim 1 wherein each of the first-level 5:3 compressors is configured to:
   receive five input bits from five respective partial product rows, wherein a first input bit, a second input bit and a third input bit are from a first column of bits representing a one's bit position in three partial product rows, and wherein a fourth input bit and a fifth input bit are from a second column of bits representing a two's bit input position in two further partial product rows; and output three output bits including a first output bit at the one's bit position, a second output bit at the two's bit position and a third output bit at the four's bit position.

3. The processor of claim 2 wherein each of the first-level 5:3 compressors comprises:
a first XOR gate arranged to receive the fourth and fifth input bits;
a second XOR gate arranged to receive the first and second input bits;
a third XOR gate arranged to receive the third input bit and an output from the second XOR gate;
a majority determining unit configured to receive the first, second and third input bits and to provide a bit matching the majority value of the first, second and third input bits;
a fourth XOR gate arranged to receive an output from the first XOR gate and the bit provided by the majority determining unit; and
a multiplexer arranged to receive the fourth input bit at a first data input and to receive the bit provided by the majority determining unit at a second data input, wherein the multiplexer is controlled in dependence on the output of the first XOR gate,
wherein the first output bit is the output from the third XOR gate, the second output bit is the output from the fourth XOR gate, and the third output bit is the output from the multiplexer.

4. The processor of claim 2 wherein each of the second-level 3:2 compressors is configured to:
receive three input bits from three respective first-level 5:3 compressors, wherein a first input bit is the first output bit from a first first-level 5:3 compressor, a second input bit is the second output bit from a second first-level 5:3 compressor, and a third input bit is the third output bit from a third first-level 5:3 compressor; and
output two output bits including a sum output bit and a carry output bit,
wherein the carry save adder is configured to obtain the first partial result and the second partial result based on the outputted sum output bits and the outputted carry output bits.

5. The processor of claim 4 wherein each of the second-level 3:2 compressors comprises:
a first XOR gate arranged to receive the first and second input bits;
a second XOR gate arranged to receive the third input bit and an output from the first XOR gate; and
a multiplexer arranged to receive the second input bit at a first data input and to receive the third input bit at a second data input, wherein the multiplexer is controlled in dependence on the output of the first XOR gate,
wherein the sum output bit is the output from the second XOR gate, and the carry output bit is the output from the multiplexer.

6. The processor of claim 1 wherein the carry save adder comprises one or more further levels of 4:2 compressors.

7. The processor of claim 1 wherein each partial product row is offset from an immediately preceding partial product row by two bits.

8. The processor of claim 1 wherein each overlapping group of bits comprises three bits.

9. The processor of claim 1 wherein each of the multipliers comprises 8 bits, and each of the multiplicands comprises 8 bits.

10. The processor of claim 9 wherein there are five overlapping groups of bits per multiplicand.

11. The processor of claim 1 wherein said one or more multipliers comprises eight multipliers and said one or more multiplicands comprises eight multiplicands.

12. The processor of claim 1 wherein each of the multipliers comprises 16 bits, and each of the multiplicands comprises 16 bits.

13. The processor of claim 12 wherein there are nine overlapping groups of bits per multiplicand.

14. The processor of claim 1 wherein each of the one or more output values is the product of one of the one or more multiplier operands and one of the one or more multiplicand operands.

15. The processor of claim 1 wherein the first partial result comprises a sequence of partial sum bits and the second partial result comprises a sequence of carry bits.

16. The processor of claim 1 wherein the adder is configured to include one or more additional columns of bits between at least some of the output values, wherein each of the additional columns is either:
a break column which prevents propagation of carries across the additional column, or
a propagate column which allows propagation of carries across the additional column.

17. A non-transitory computer-readable medium comprising executable instructions to describe a processor comprising a multiplication unit, the multiplication unit comprising:
a modified booth encoder configured to:
receive one or more multipliers and one or more multiplicands;
for each of the one or more multiplicands, partition the bits in the multiplicand into overlapping groups of bits; and
generate a plurality of partial products by determining a plurality of partial product rows, wherein each of the partial product rows corresponds to a partial product as a multiplication of one of the one or more multipliers with one of the groups of bits;
a carry save adder comprising a plurality of first-level 5:3 compressors and a plurality of second-level 3:2 compressors, the carry save adder being configured to:
receive the plurality of partial products generated by the modified booth encoder; and
use the received partial products to obtain a first partial result and a second partial result; and
an adder configured to:
receive the first partial result and the second partial result;
use the received first and second partial results to determine one or more output values; and
output the one or more output values.

18. The computer-readable medium of claim 17 wherein each of the first-level 5:3 compressors is configured to receive five input bits from five respective partial product rows, wherein a first input bit, a second input bit and a third input bit are from a first column of bits representing a one's bit position in three partial product rows, and wherein a fourth input bit and a fifth input bit are from a second column of bits representing a two's bit input position in two further partial product rows, each of the first-level 5:3 compressors being configured to output three output bits including a first output bit at the one's bit position, a second output bit at the two's bit position and a third output bit at the four's bit position, wherein each of the first-level 5:3 compressors comprises:
a first XOR gate arranged to receive the fourth and fifth input bits;

a second XOR gate arranged to receive the first and second input bits;
a third XOR gate arranged to receive the third input bit and an output from the second XOR gate;
a majority determining unit configured to receive the first, second and third input bits and to provide a bit matching the majority of the first, second and third input bits;
a fourth XOR gate arranged to receive an output from the first XOR gate and the bit provided by the majority determining unit; and
a multiplexer arranged to receive the fourth input bit at a first data input and to receive the bit provided by the majority determining unit at a second data input, wherein the multiplexer is controlled in dependence on the output of the first XOR gate,
wherein the first output bit is the output from the third XOR gate, the second output bit is the output from the fourth XOR gate, and the third output bit is the output from the multiplexer.

19. The computer-readable medium of claim 18 wherein each of the second-level 3:2 compressors is configured to receive three input bits from three respective first-level 5:3 compressors, wherein a first input bit is the first output bit from a first first-level 5:3 compressor, a second input bit is the second output bit from a second first-level 5:3 compressor, and a third input bit is the third output bit from a third first-level 5:3 compressor, each of the second-level 3:2 compressors being configured to output two output bits including a sum output bit and a carry output bit, wherein each of the second-level 3:2 compressors comprises:
a first XOR gate arranged to receive the first and second input bits;
a second XOR gate arranged to receive the third input bit and an output from the first XOR gate; and
a multiplexer arranged to receive the second input bit at a first data input and to receive the third input bit at a second data input, wherein the multiplexer is controlled in dependence on the output of the first XOR gate,
wherein the sum output bit is the output from the second XOR gate, and the carry output bit is the output from the multiplexer.

20. A method of performing multiplication in a computer system, the method comprising:
receiving one or more multipliers and one or more multiplicands at a modified booth encoder of the computer system;
for each of the one or more multiplicands, partitioning the bits in the multiplicand into overlapping groups of bits;
the modified booth encoder generating a plurality of partial products by determining a plurality of partial product rows, wherein each of the partial product rows corresponds to a partial product as a multiplication of one of the one or more multipliers with one of the groups of bits;
using the plurality of partial products at a carry save adder of the computer system to obtain a first partial result and a second partial result, the carry save adder comprising a plurality of first-level 5:3 compressors and a plurality of second-level 3:2 compressors;
using the first and second partial results at an adder of the computer system to determine one or more output values; and
outputting the one or more output values.

* * * * *